US012617881B2

(12) United States Patent
Kang et al.

(10) Patent No.: US 12,617,881 B2
(45) Date of Patent: May 5, 2026

(54) METALLOCENE COMPOUND, CATALYST COMPOSITION COMPRISING THE SAME, AND METHOD FOR PREPARING OLEFIN POLYMER USING THE SAME

(71) Applicant: LG CHEM, LTD., Seoul (KR)

(72) Inventors: Minyoung Kang, Daejeon (KR); Seyoung Kim, Daejeon (KR); Insun Lee, Daejeon (KR); Seok Hwan Kim, Daejeon (KR); Byung Seok Kim, Daejeon (KR); Yoonchul Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 728 days.

(21) Appl. No.: 17/921,267

(22) PCT Filed: Oct. 1, 2021

(86) PCT No.: PCT/KR2021/013528
§ 371 (c)(1),
(2) Date: Oct. 25, 2022

(87) PCT Pub. No.: WO2022/075669
PCT Pub. Date: Apr. 14, 2022

(65) Prior Publication Data

US 2023/0174692 A1 Jun. 8, 2023

(30) Foreign Application Priority Data

Oct. 8, 2020 (KR) ........................ 10-2020-0130132

(51) Int. Cl.
*C08F 110/14* (2006.01)
*C07F 17/00* (2006.01)

(52) U.S. Cl.
CPC ............ *C08F 110/14* (2013.01); *C07F 17/00* (2013.01)

(58) Field of Classification Search
None
See application file for complete search history.

(56) References Cited

U.S. PATENT DOCUMENTS

| | | | | |
|---|---|---|---|---|
| 6,184,402 | B1 | 2/2001 | Yamazaki et al. | |
| 9,266,910 | B2 | 2/2016 | McCullough | |
| 10,280,240 | B2 | 5/2019 | Hagadorn et al. | |
| 2009/0239999 | A1* | 9/2009 | Canich | C08F 10/06 526/170 |
| 2011/0257348 | A1* | 10/2011 | Yang | C08F 4/65925 526/348.4 |
| 2013/0116394 | A1* | 5/2013 | Resconi | C08F 4/65912 526/351 |
| 2014/0018506 | A1 | 1/2014 | Resconi et al. | |
| 2014/0206819 | A1 | 7/2014 | Hafner et al. | |
| 2015/0119539 | A1 | 4/2015 | McCullough | |
| 2015/0344596 | A1 | 12/2015 | Resconi et al. | |
| 2016/0115266 | A1 | 4/2016 | Toltsch et al. | |
| 2016/0168285 | A1 | 6/2016 | Resconi et al. | |
| 2016/0168287 | A1 | 6/2016 | Reichelt et al. | |
| 2017/0342175 | A1* | 11/2017 | Hagadorn | C08F 210/16 |
| 2018/0223009 | A1* | 8/2018 | Kim | B01J 27/24 |
| 2018/0305534 | A1 | 10/2018 | Kalfus et al. | |
| 2019/0292282 | A1 | 9/2019 | Yang et al. | |
| 2020/0199265 | A1* | 6/2020 | Small | C08F 4/65927 |
| 2020/0369861 | A1* | 11/2020 | Gahleitner | C08L 23/16 |

FOREIGN PATENT DOCUMENTS

| | | | |
|---|---|---|---|
| CN | 111153941 | A | 5/2020 |
| EP | 2532687 | A2 | 12/2012 |
| JP | 2019-099556 | A | 6/2019 |
| KR | 2001-0030814 | A | 4/2001 |
| KR | 2015-0037631 | A | 4/2015 |
| KR | 2019-0095956 | A | 8/2019 |
| WO | 2011/135004 | A2 | 11/2011 |
| WO | 2012/084961 | A1 | 6/2012 |
| WO | 2012/134719 | A2 | 10/2012 |
| WO | 2013/007650 | A1 | 1/2013 |
| WO | 2013/007664 | A1 | 1/2013 |
| WO | 2014/096166 | A1 | 6/2014 |
| WO | 2014/198677 | A1 | 12/2014 |
| WO | 2015/011134 | A1 | 1/2015 |
| WO | 2015/014632 | A1 | 2/2015 |
| WO | 2015/065681 | A1 | 5/2015 |
| WO | 2017/116516 | A1 | 7/2017 |
| WO | 2018/122134 | A1 | 7/2018 |

OTHER PUBLICATIONS

Extended European Search Report dated Jan. 29, 2024, issued in corresponding European Patent Application No. 21877921.3.
International Search Report (with translation) and Written Opinion dated Jan. 19, 2022, issued in corresponding International Patent Application No. PCT/KR2021/013528.
Ryabov et al., "Palladium-Catalyzed Cross-Coupling Reactions of Bromo-Substituted Group 4 Metallocenes," Organometallics, 2009, vol. 28, No. 13, pp. 3614-3617.
Izmer et al., "ansa-Metallocenes Bearing 4-(N-Azolyl)-2-methylindenyl and Related Ligands: Development of Highly Isoselective Catalysts for Propene Polymerization at Higher Temperatures," Organometallics, 2019, vol. 38, No. 24, pp. 4645-4657.

* cited by examiner

*Primary Examiner* — Satya B Sastri
(74) *Attorney, Agent, or Firm* — Morgan, Lewis & Bockius LLP

(57) ABSTRACT

This invention relates to a novel metallocene compound, a catalyst composition comprising the metallocene compound, and a method for preparing olefin polymer using the catalyst composition.

14 Claims, No Drawings

METALLOCENE COMPOUND, CATALYST COMPOSITION COMPRISING THE SAME, AND METHOD FOR PREPARING OLEFIN POLYMER USING THE SAME

CROSS-REFERENCE TO RELATED APPLICATION(S)

This application claims the benefit of Korean Patent Application No. 10-2020-0130132 filed on Oct. 8, 2020 with the Korean Intellectual Property Office, the disclosures of which are herein incorporated by reference in their entirety.

TECHNICAL FIELD

This invention relates to a novel metallocene compound, a catalyst composition comprising the metallocene compound, and a method for preparing an olefin polymer using the catalyst composition. More specifically, this invention relates to a novel metallocene compound that has high activity in a polymerization reaction, and can control the molecular weight and fine structure of prepared olefin-based polymer, a catalyst composition comprising the metallocene compound, and a method for preparing an olefin polymer using the catalyst composition.

BACKGROUND ART

Olefin polymerization systems are divided into Ziegler Natta and metallocene catalyst systems, and these two highly active catalyst systems have been developed corresponding to each characteristic. The Ziegler Natta catalyst has been widely applied in the existing commercial processes since it was invented in the fifties, but since it is a multi-site catalyst with several active sites, it is characterized by wide molecular weight distribution of polymer, and is limited in terms of securing of desired properties due to non-uniform composition distribution of comonomers.

Meanwhile, the metallocene catalyst consists of a main catalyst, of which main component is a transition metal compound, and a cocatalyst, which is an organometal compound including aluminum as the main component, and such a catalyst is a homogeneous complex catalyst and a single site catalyst, obtains polymer with narrow molecular weight distribution and uniform comonomer composition distribution according to the properties of the single site catalyst, and can change the stereoregularity, copolymerization property, molecular weight, crystallinity, etc. according to the modification of the ligand structure of the catalyst and change of polymerization conditions.

Meanwhile, polyolefin resin for injection molding is required to have excellent long-term durability and processability. High pressure resistance can be generally exhibited in high density polyethylene region, because modulus increases and force withstanding high pressure increases as crystallinity in polyolefin resin is higher. However, if density is high, resistance to brittle fracture may be lowered, and thus, long-term pressure resistance may be lowered. And, if molecular weight is low or molecular weight distribution is narrow, sagging (melt sagging) may be generated during processing of injection molded products, thus rendering processing difficult, and thus, polyolefin resin having high molecular weight and very wide molecular weight distribution should be applied so as to solve the problems.

Although methods of controlling molecular weight distribution by synthesizing various supported metallocene catalysts have been developed so as to improve such problems, in case an olefin polymer is prepared using the existing metallocene catalyst, due to insufficient catalyst activity, economic efficiency may be lowered, or molecular weight distribution of prepared polymer may be narrow, thus rendering it difficult to prepare aimed polymer.

Thus, there is a continued demand for a method for preparing a metallocene catalyst that has excellent activity, and can easily control the properties of olefin-based polymer.

DETAILED DESCRIPTION OF THE INVENTION

Technical Problem

It is an object of the invention to provide a novel metallocene compound, a catalyst composition comprising the metallocene compound, and a method for preparing an olefin polymer using the catalyst composition.

Technical Solution

There is provided a metallocene compound represented by the following Chemical Formula 1:

[Chemical Formula 1]

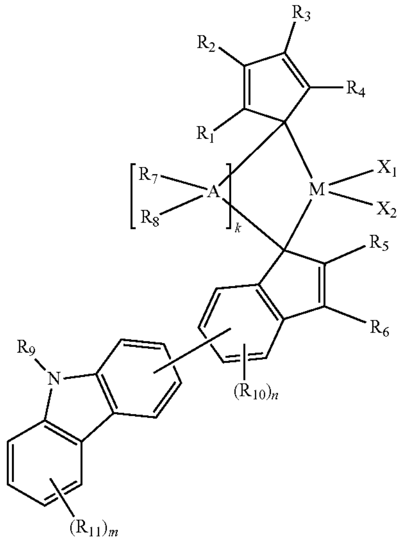

in the Chemical Formula 1,

M is Group 4 transition metal,

A is carbon or silicon, $X_1$ and $X_2$ are each independently, hydrogen, halogen, or substituted or unsubstituted $C_{1-30}$ alkyl; $R_1$ to $R_4$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and among them, two neighboring substituents may be bonded to each other to form a substituted or unsubstituted $C_{5-30}$ fused ring;

$R_5$ and $R_6$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl;

$R_7$ and $R_5$ are each independently, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and $R_7$ and $R_8$ may be bonded to each other to form a substituted or unsubstituted $C_{5-30}$ spiro ring;

$R_9$ is substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl;

each $R_{10}$ is independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and among them, two neighboring substituents may be bonded to each other to form a substituted or unsubstituted $C_{5-30}$ fused ring, $R_{11}$ is hydrogen, substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl, m is an integer of 1 to 4, n is an integer of 1 to 3, and k is 0 or 1.

There is also provided a catalyst compound comprising the metallocene compound represented by the above Chemical Formula 1;

a carrier; and one or more cocatalyst compounds selected from the group consisting of compounds represented by the following Chemical Formula 2 and Chemical Formula 3:

$$-[Al(R_{12})-O]_a- \quad \text{[Chemical Formula 2]}$$

in the Chemical Formula 2, each $R_{12}$ is independently halogen, $C_{1-20}$ alkyl or $C_{1-20}$ haloalkyl;

a is an integer of 2 or more;

$$J(R_{13})_3 \quad \text{[Chemical Formula 3]}$$

in the Chemical Formula 3, each $R_{13}$ is independently, halogen, $C_{1-20}$ alkyl or $C_{1-20}$ haloalkyl; and J is aluminum or boron.

There is also provided a method for preparing an olefin polymer, comprising a step of polymerizing olefin monomers, in the presence of the above catalyst composition.

Advantageous Effects

The novel metallocene compound of the invention is a compound having a novel structure that has not been known in the prior art, and an olefin polymer prepared using the same may have high SCB (Short chain branch) content and exhibit wide molecular weight distribution.

And, the catalyst composition comprising the metallocene compound of the invention exhibits catalytic activity equivalent or more excellent that those of the existing catalyst compositions, during an olefin polymerization, and an olefin polymer prepared using the catalyst composition of the invention has wide molecular weight distribution and high SCB (Short chain branch) content, thus increasing tie-molecule content, thereby improving mechanical properties, and particularly, improving long-term durability of the final product.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, the invention will be explained in detail.

(Explanations of Terms)

First, as used herein,  and  mean bonds connected to other substituents.

As used herein, the term "substituted or unsubstituted" means substituted with one or more substituents selected from the group consisting of deuterium, halogen; nitrile; nitro; hydroxy; carbonyl; ester; imide; amino; phosphine oxide; alkoxy, aryloxy; alkylthioxy; arylthioxy; alkylsulfoxy; arylsulfoxy; silyl; boron; alkyl; cycloalkyl; alkenyl; aryl; aralkyl; aralkenyl; alkylaryl; alkylamine; aralkylamine; heteroarylamine; arylamine; arylphosphine; or heterocyclic group comprising one or more selected from N, O and S, or unsubstituted; or substituted with a substituent formed by linking of two or more substituents among the above illustrated substituents, or unsubstituted. For example, the "substituent formed by linking of two or more substituents" may be biphenyl. Namely, a biphenyl group may be an aryl group, or it may be interpreted as a substituent formed by linking of two phenyl groups.

Halogen may be fluorine (F), chlorine (Cl), bromine (Br) or iodine (I).

$C_{1-30}$ alkyl may be linear, branched or cyclic alkyl. Specifically, $C_{1-30}$ alkyl may be $C_{1-30}$ linear alkyl; $C_{1-20}$ linear alkyl; $C_{1-10}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, $C_{1-30}$ alkyl may be a methyl, ethyl, n-propyl, iso-propyl, n-butyl, iso-butyl, tert-butyl, n-pentyl, iso-pentyl, or cyclohexyl group, and the like.

$C_{2-30}$ alkenyl may be linear, branched or cyclic alkenyl. Specifically, the $C_{2-30}$ alkenyl may be $C_{2-30}$ linear alkenyl, $C_{2-20}$ linear alkenyl, $C_{2-10}$ linear alkenyl, $C_{2-5}$ linear alkenyl, $C_{3-30}$ branched alkenyl, $C_{3-20}$ branched alkenyl, $C_{3-15}$ branched alkenyl, $C_{3-10}$ branched alkenyl, $C_{5-30}$ cyclic alkenyl, $C_{5-20}$ cyclic alkenyl or $C_{5-10}$ cyclic alkenyl. More specifically, the $C_{2-30}$ alkenyl may be ethenyl, propenyl, butenyl, pentenyl or cyclohexenyl, and the like.

$C_{1-30}$ alkoxy may be linear, branched or cyclic alkoxy. Specifically, the $C_{1-30}$ alkoxy may be $C_{1-30}$ linear alkoxy; $C_{1-20}$ linear alkoxy; $C_{1-10}$ linear alkoxy; $C_{1-5}$ linear alkoxy; $C_{3-30}$ branched or cyclic alkoxy; $C_{3-20}$ branched or cyclic alkoxy; $C_{3-15}$ branched or cyclic alkoxy; or $C_{3-10}$ branched or cyclic alkoxy. More specifically, the $C_{1-30}$ alkoxy may be a methoxy, ethoxy, n-propoxy, iso-propoxy, n-butoxy, iso-butoxy, tert-butoxy, n-pentoxy, iso-pentoxy, neo-pentoxy, or cyclohexyl group, and the like.

$C_{2-30}$ alkoxyalkyl is a structure comprising $—R_y—O—R_z$, wherein one or more hydrogen of alkyl($-R_y$) may be substituted with alkoxy($-O—R_z$). The $C_{2-30}$ alkoxyalkyl has a total carbon number included in $R_y$ and $R_z$ of 2 to 30, and specifically, may be a methoxymethyl, methoxyethyl, ethoxymethyl, iso-propoxymethyl, iso-propoxyethyl, iso-propoxyhexyl, tert-butoxymethyl, tert-butoxyethyl, or tert-butoxyhexyl group, and the like.

$C_{2-30}$ aryl means monocyclic, bicyclic or tricyclic aromatic hydrocarbon. Specifically, $C_{2-30}$ aryl may be a phenyl, naphthyl or anthracenyl group, and the like, A $C_{5-30}$ fused ring may mean $C_{6-30}$ aryl comprising a fused structure, $C_{5-30}$ heteroaryl comprising a fused structure (heteroatom: N, O, S), or $C_{5-30}$ cycloalkane comprising a fused structure.

A $C_{5-30}$ spiro ring may mean $C_{5-30}$ cycloalkane comprising a spiro linking structure.

As Group 4 transition metal, titanium, zirconium, hafnium, and the like may be mentioned.

A hydrocarbyl group means a monovalent hydrocarbon compound, and comprises an alkyl, alkenyl, aryl, alkylaryl, arylalkyl group, and the like.

(Novel Metallocene Compound)

The carbazolyl group substituted in the ligand of the metallocene compound according to one embodiment of the invention exhibits larger electron donating effect than other aryl groups, thus increasing electron density around metal, and thereby, the metallocene compound may exhibit high activity during an olefin polymerization. Through various forms of bonding and structural effect due to the bonding direction of bulky carbazolyl group along with electron donating effect, it has wide molecular weight distribution and relatively large weight average molecular weight, and can prepare olefin polymer with increased α-olefin percentage, when conducting copolymerization with α-olefin. Particularly, in medium-large molecular weight olefin polymer, wide molecular weight and high short chain branching (SCB) content increase interactions such as entanglement between olefin polymers. Thus, the content of tie-molecule connecting between crystalline regions across non-crystalline region increases, and consequently, bond between olefin polymers is strengthened. Such strengthening of bond not only increases mechanical properties, but also delays damage of polymer due to external impact or crack, and the like, and when such polymer is applied for a product, long-term durability may be improved.

Specifically, the metallocene compound according to one embodiment of the invention is represented by the following Chemical Formula 1:

[Chemical Formula 1]

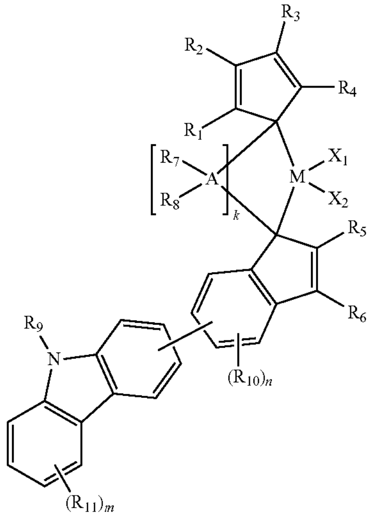

in the Chemical Formula 1,

M is Group 4 transition metal,

A is carbon or silicon, $X_1$ and $X_2$ are each independently, hydrogen, halogen, or substituted or unsubstituted $C_{1-30}$ alkyl;

$R_1$ to $R_4$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and among them, two neighboring substituents may be bonded to each other to form a substituted or unsubstituted $C_{5-30}$ condensed ring;

$R_5$ and $R_6$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl;

$R_7$ and $R_5$ are each independently, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and $R_7$ and $R_8$ may be bonded to each other to form a substituted or unsubstituted $C_{5-30}$ spiro ring;

$R_9$ is substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl;

each $R_{10}$ is independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl, and among them, two neighboring substituents may be bonded to each other to form a substituted or unsubstituted $C_{5-30}$ condensed ring, $R_{11}$ is hydrogen, substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl, m is an integer of 1 to 4, n is an integer of 1 to 3, and k is 0 or 1.

In the metallocene compound represented by the above Chemical Formula 1, k is 0 or 1, and in case k is 0, the bridge structure of -A- does not exist. Thus, the metallocene compound represented by the Chemical Formula is represented by the following Chemical Formula 1-1 or 1-2:

[Chemical Formula 1-1]

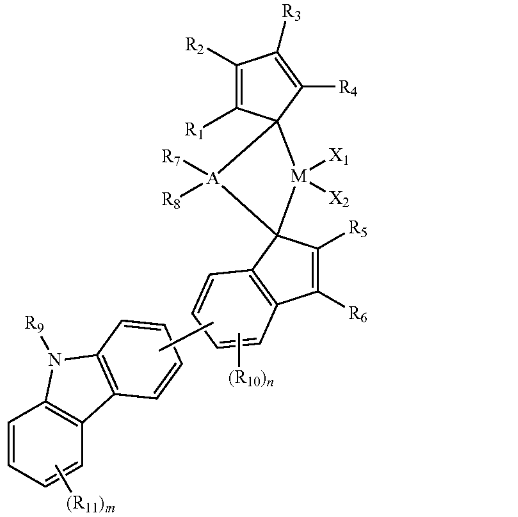

[Chemical Formula 1-2]

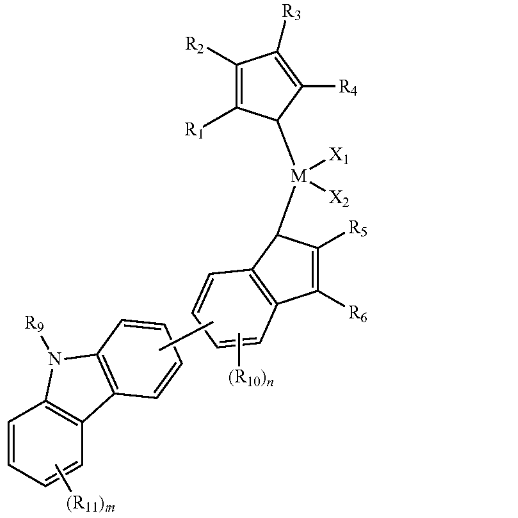

In the Formulas,

M, $X_1$, $X_2$, A, $R_1$ to $R_{11}$, m and n are as defined above.

As the center metal of the metallocene compound represented by the Chemical Formula 1, Group 4 transition metal may be used, and preferably, in the Chemical Formula 1, M is zirconium (Zr) or hafnium (Hf).

Preferably, in the Chemical Formula 1, $X_1$ and $X_2$ are each independently, chloro or $C_{1-5}$ alkyl. More preferably, $X_1$ and $X_2$ are each independently, chloro or methyl.

Preferably, in the Chemical Formula 1, $R_1$ to $R_4$ are each independently, hydrogen, $C_{1-10}$ alkyl, $C_{2-10}$ alkenyl, $C_{2-10}$ alkoxyalkyl, or a fused ring selected from the group consisting of the followings formed by bonding of two neighboring substituents with each other, and in case there are two fused rings, they may be identical to or different from each other:

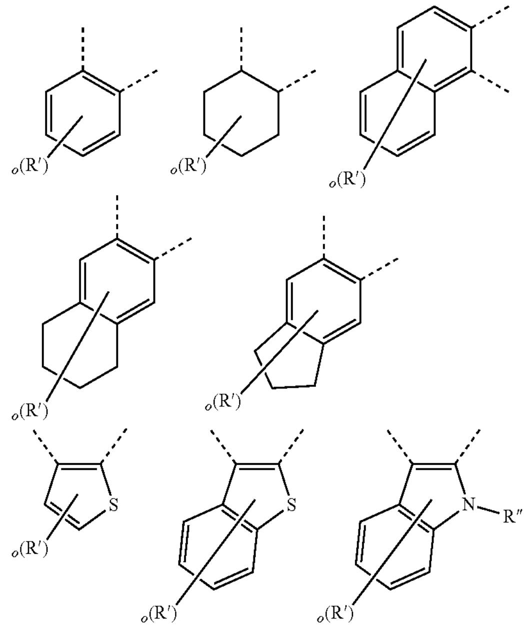

wherein, each R' is independently, $C_{1-10}$ alkyl, substituted or unsubstituted phenyl, 9-($C_{1-10}$ alkyl)-9H-carbazolyl, 9-($C_{2-10}$ alkoxyalkyl)-9H-carbazolyl or 9-phenyl-9H-carbazolyl, R" is $C_{1-10}$ alkyl, and each o is independently an integer of 0 to 4.

Preferably, each R' is independently, hydrogen, methyl, ethyl, isopropyl, butyl, tert-butyl, tert-butoxyhexyl, phenyl unsubstituted or substituted with one or two tert-butyl, 9-methyl-9H-carbozolyl, 9-ethyl-9H-carbazolyl, 9-propyl-9H-carbazolyl, 9-butyl-9H-carbazolyl, 9-(tert-butoxyethyl)-9H-carbazolyl, 9-(tert-butoxyhexyl)-9H-carbazolyl, or 9-phenyl-9H-carbazolyl.

Preferably, R" is methyl.

Preferably, in the Chemical Formula 1, $R_5$ and $R_6$ are each independently, hydrogen, $C_{1-10}$ alkyl, $C_{2-10}$ alkenyl or $C_{2-10}$ alkoxyalkyl.

More preferably, $R_5$ and $R_6$ are each independently, hydrogen, methyl, ethyl, propyl, isopropyl, butyl, tert-butyl, ethenyl, pentenyl, butenyl or tert-butoxyhexyl.

Preferably, In the Chemical Formula 1, $R_7$ and $R_8$ are each independently, $C_{1-10}$ alkyl, $C_{2-10}$ alkenyl or $C_{2-10}$ alkoxyalkyl, phenyl unsubstituted or substituted with $C_{2-10}$ alkoxyalkyl, or spiro $C_{5-10}$ cycloalkane formed by bonding of $R_7$ and $R_8$ with each other.

More preferably, $R_7$ and $R_8$ are each independently, methyl, ethyl, propyl, isopropyl, butyl, tert-butyl, ethenyl, pentenyl, butenyl, tert-butoxyhexyl, or spiro cyclopentane or spiro cyclohexane formed by bonding of $R_7$ and $R_8$ with each other.

Preferably, In the Chemical Formula 1, $R_9$ is $C_{1-10}$ alkyl or $C_{2-10}$ alkoxyalkyl.

More preferably, $R_9$ is methyl, ethyl, propyl, isopropyl, butyl, tert-butyl, tert-butoxyhexyl, or tert-butoxyethyl.

Preferably, In the Chemical Formula 1, each $R_{10}$ is independently, hydrogen, $C_{1-10}$ alkyl or $C_{2-10}$ alkoxyalkyl, or fused $C_{5-10}$ cycloalkane formed by bonding of two neighboring $R_{10}$'s.

More preferably, each $R_{10}$ is independently, hydrogen, methyl, ethyl, propyl, isopropyl, butyl, tert-butyl, tert-butoxyhexyl, tert-butoxyethyl, or fused cyclopentane formed by bonding of two neighboring $R_{10}$'s.

Preferably, In the Chemical Formula 1, each $R_{11}$ is independently, hydrogen, $C_{1-10}$ alkyl or $C_{2-10}$ alkoxyalkyl.

More preferably, each $R_{11}$ is independently, hydrogen, methyl, ethyl, propyl, isopropyl, butyl, tert-butyl, tert-butoxyhexyl or tert-butoxyethyl.

Preferably, the metallocene compound of the Chemical Formula 1 is one selected from the group consisting of the following compounds.

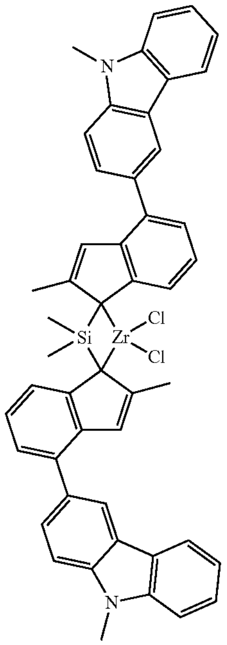

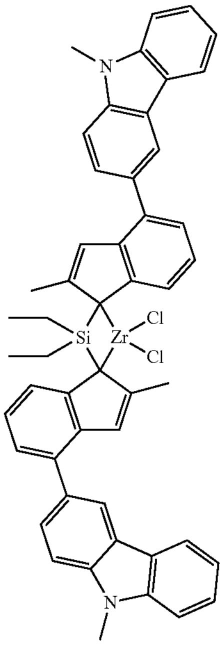

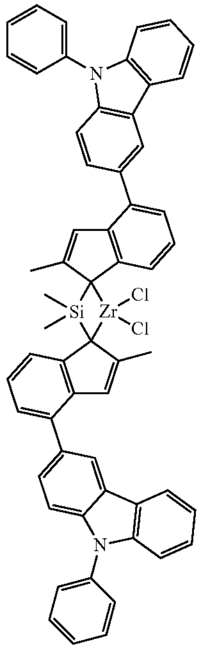

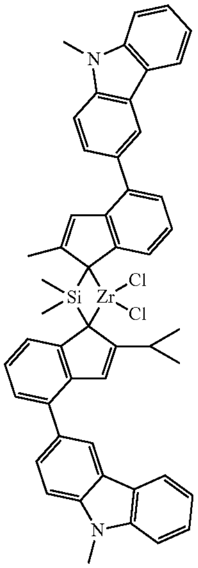

-continued

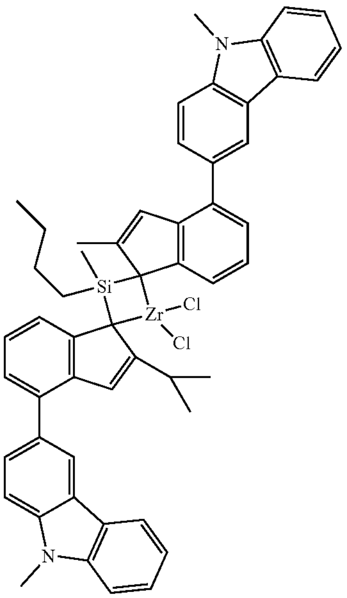

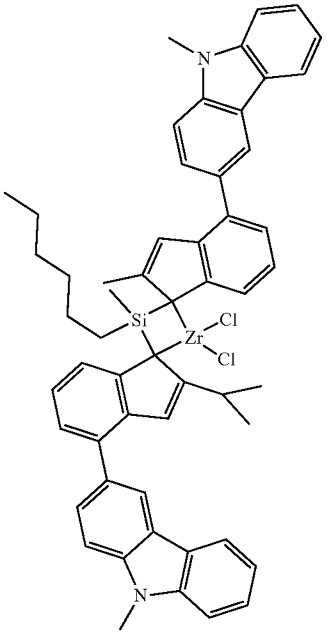

-continued
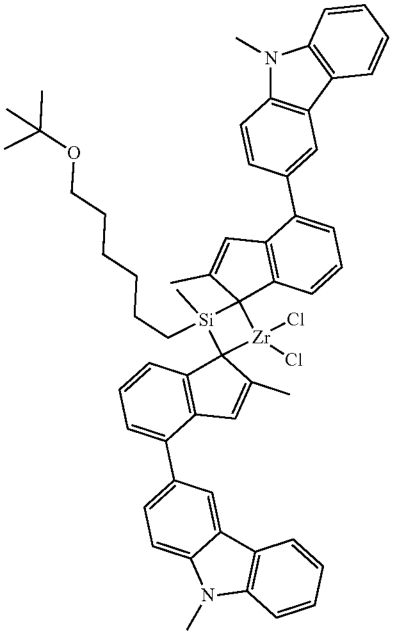
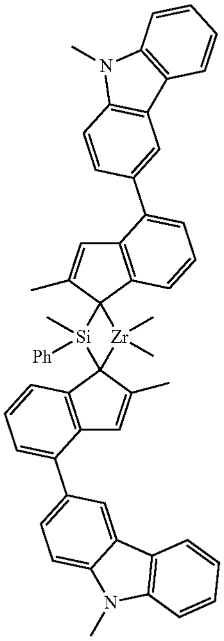
-continued
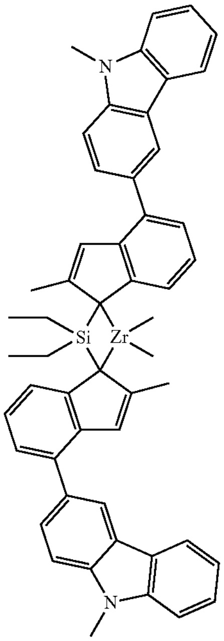
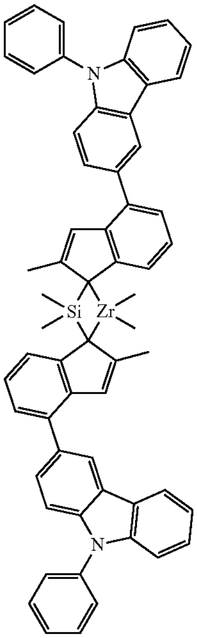
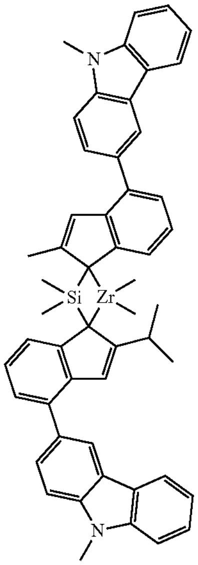

-continued
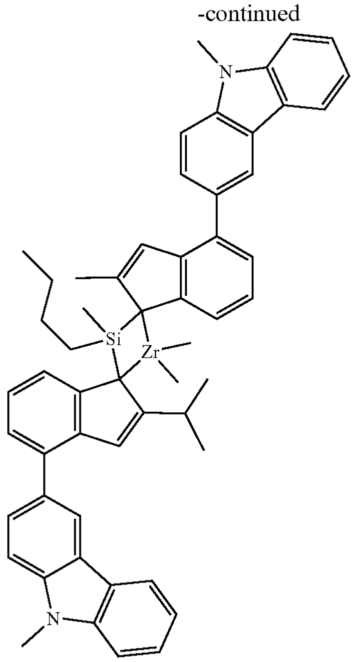
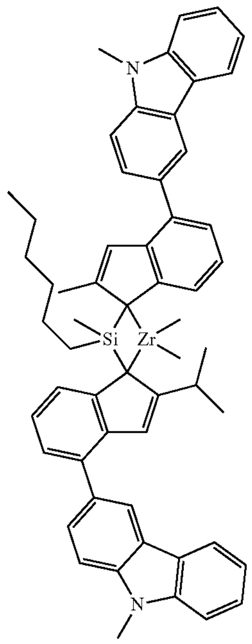
-continued
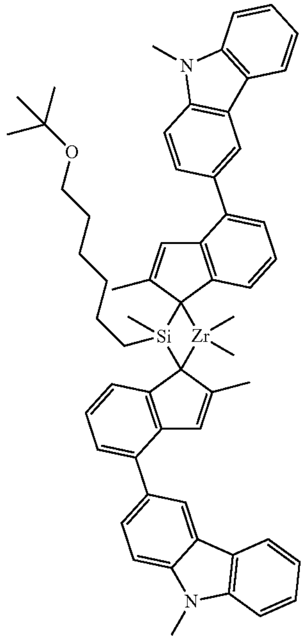
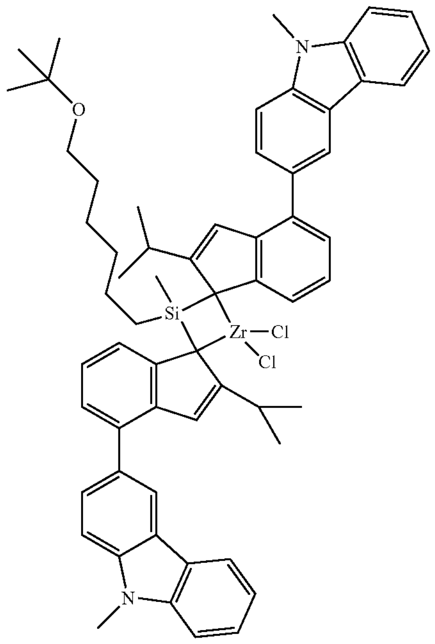

-continued
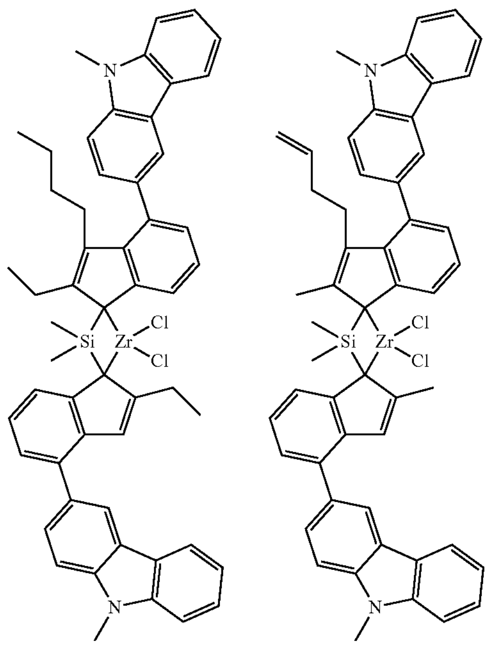
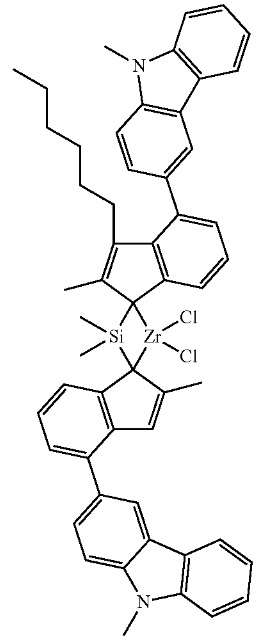
-continued
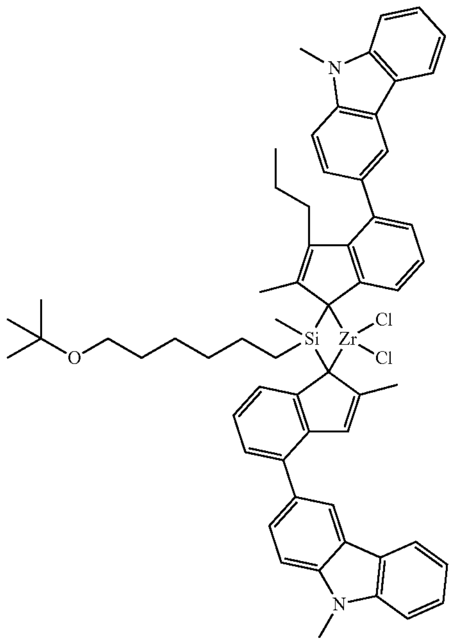
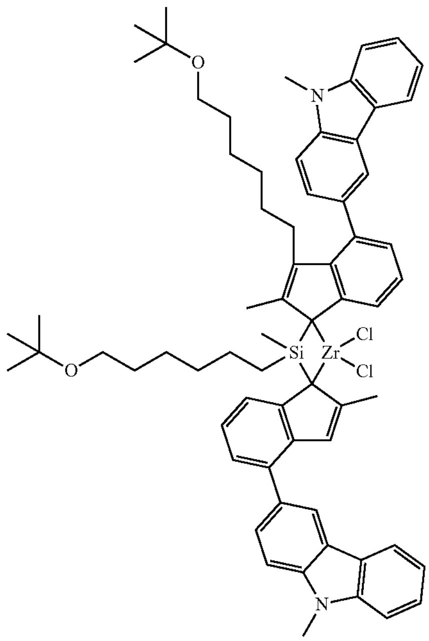

-continued
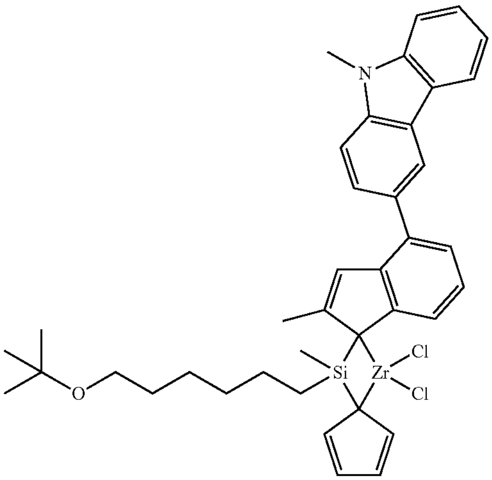
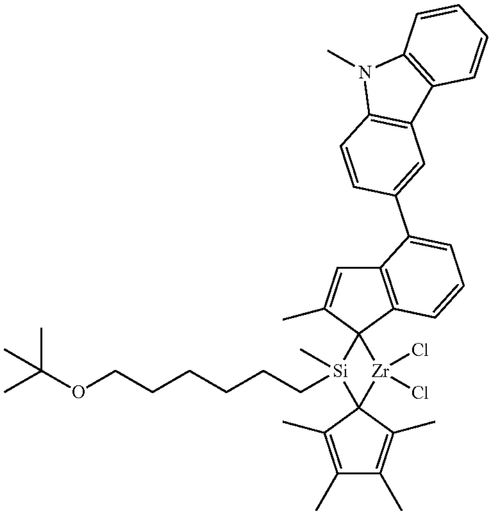
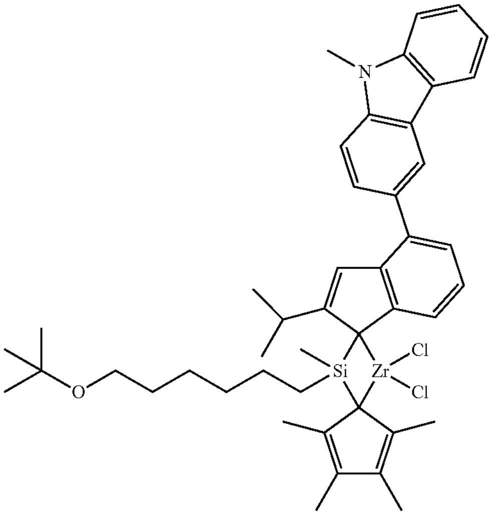
-continued
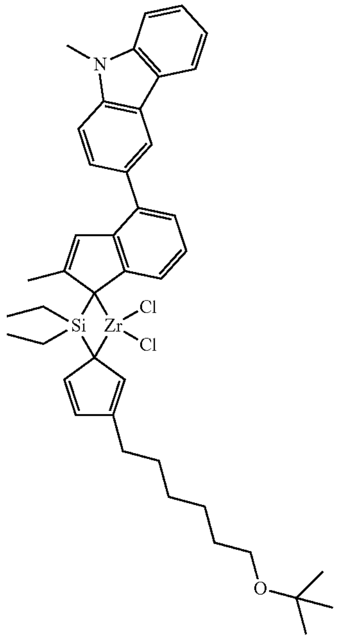
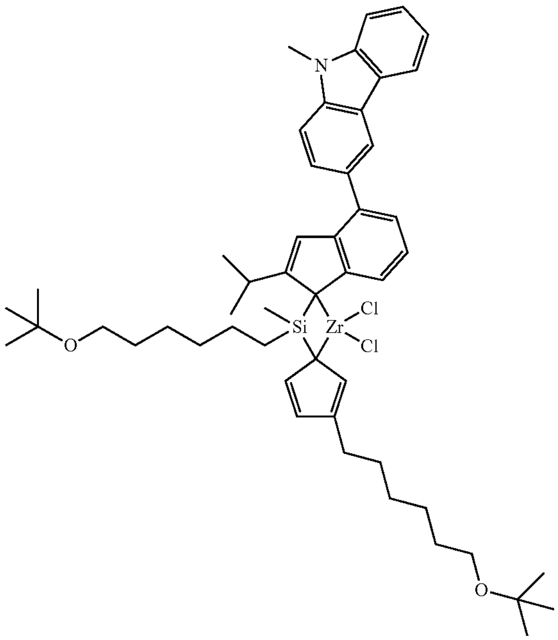

-continued
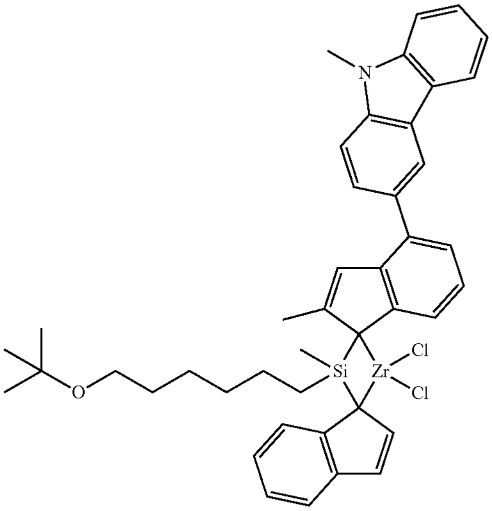
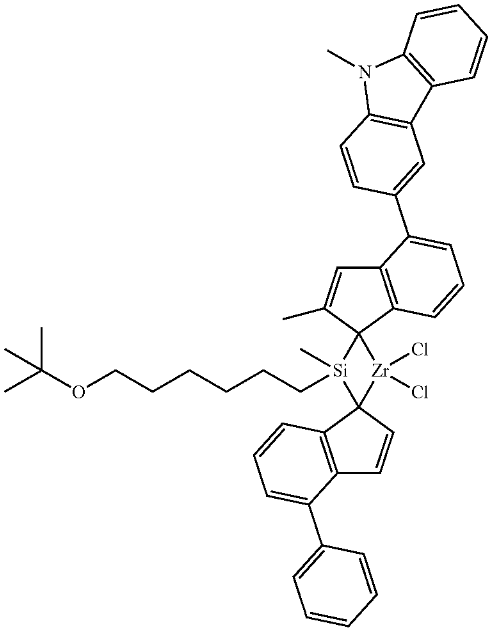
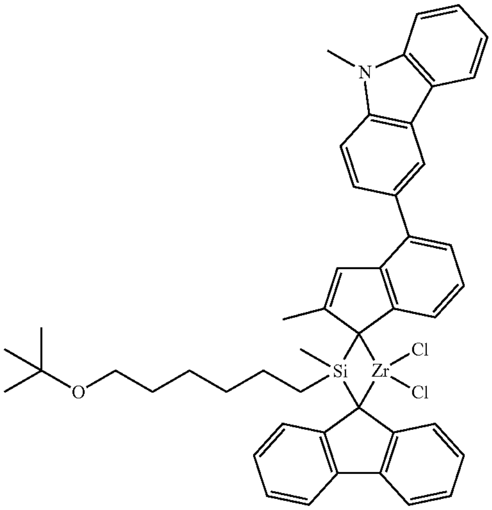
-continued
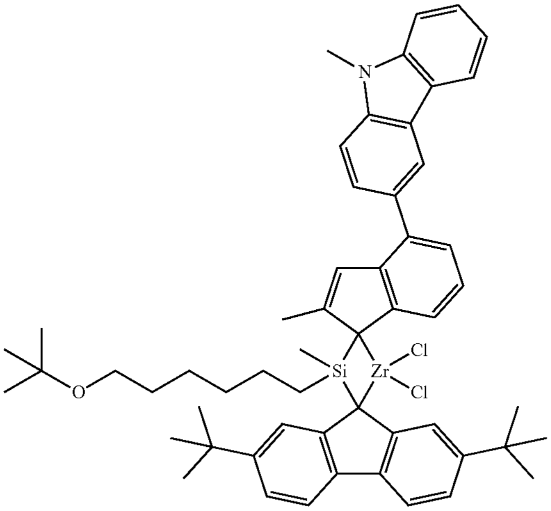
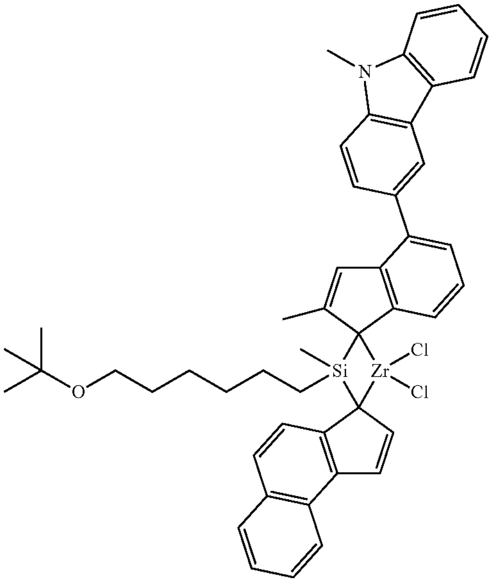
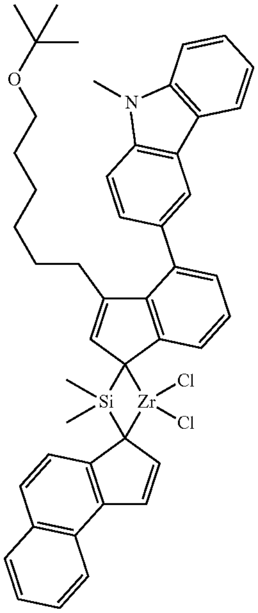

-continued
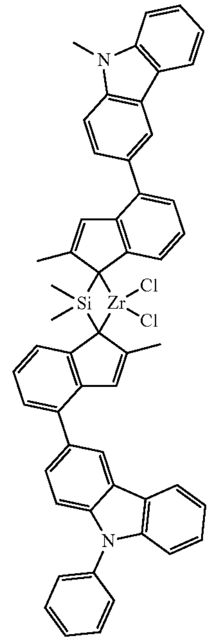
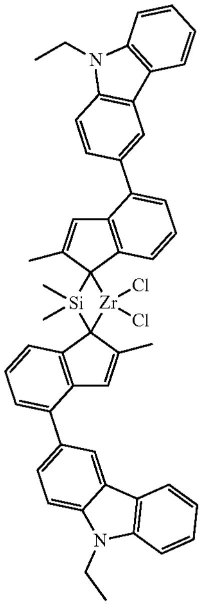
-continued
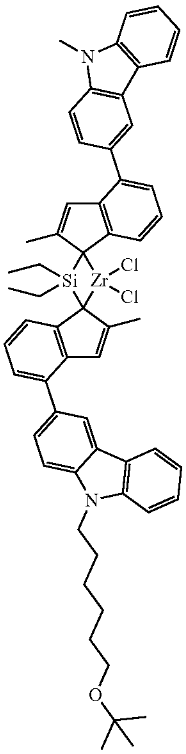
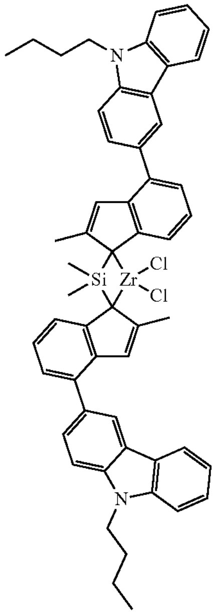
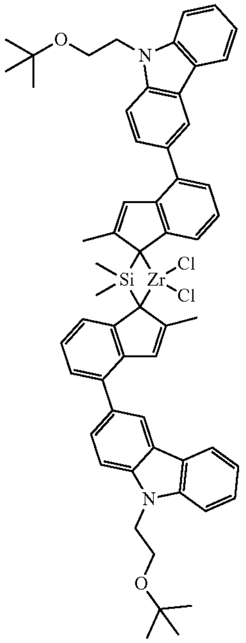
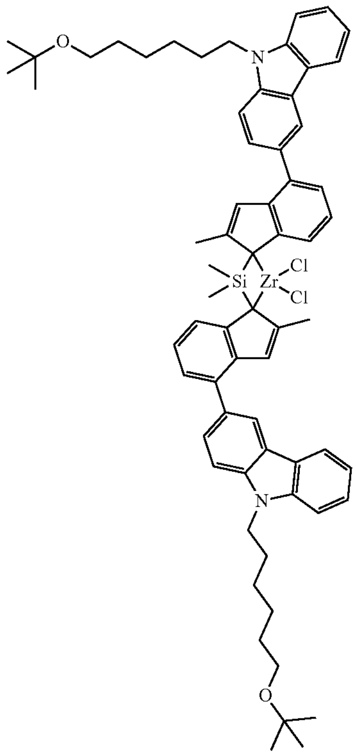

-continued
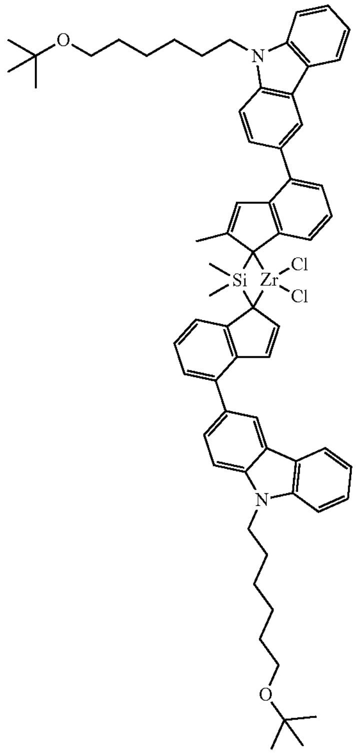
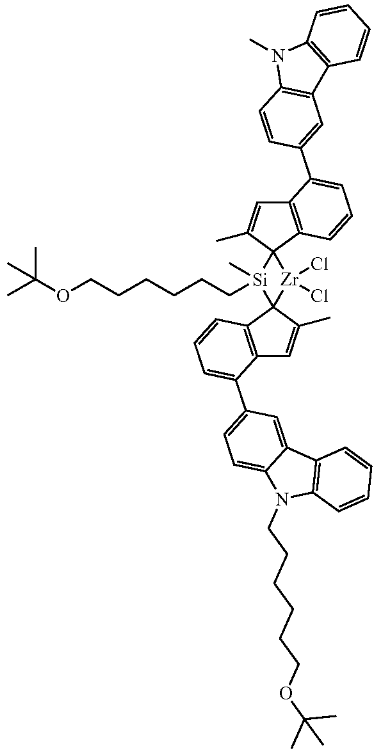
-continued
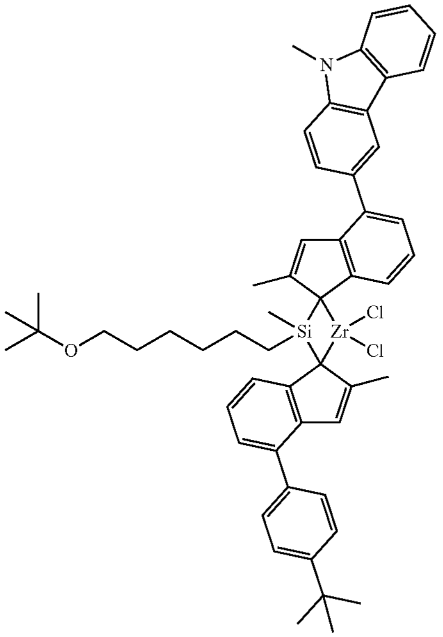
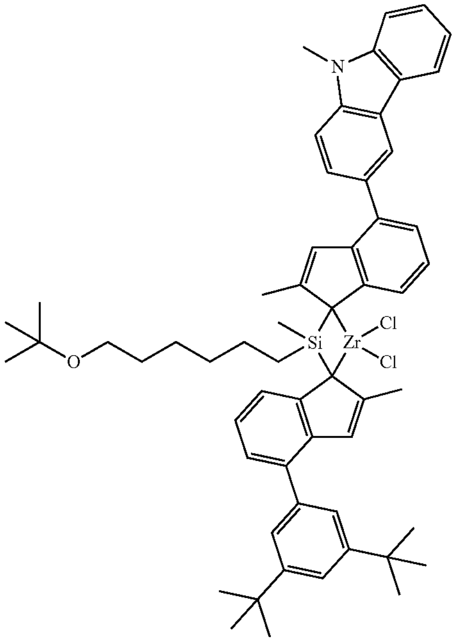

-continued
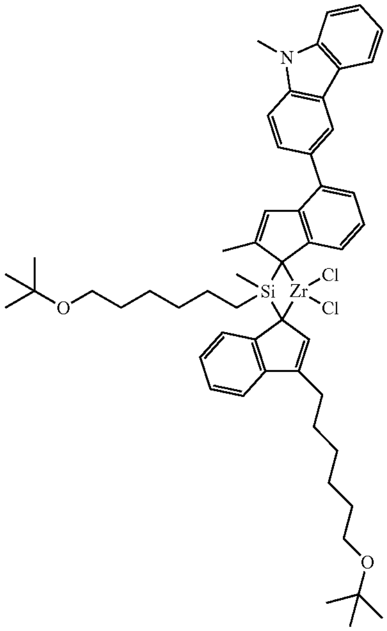
-continued
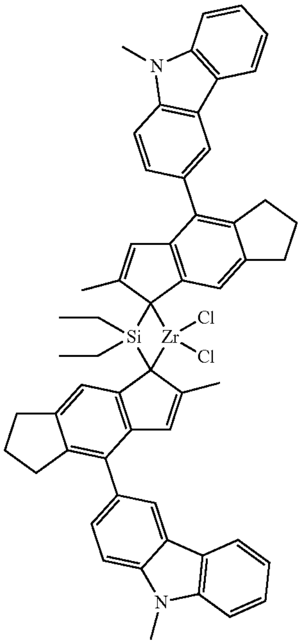
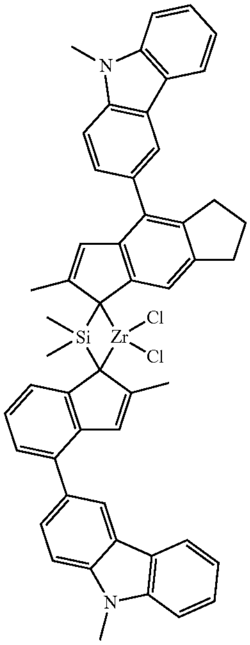
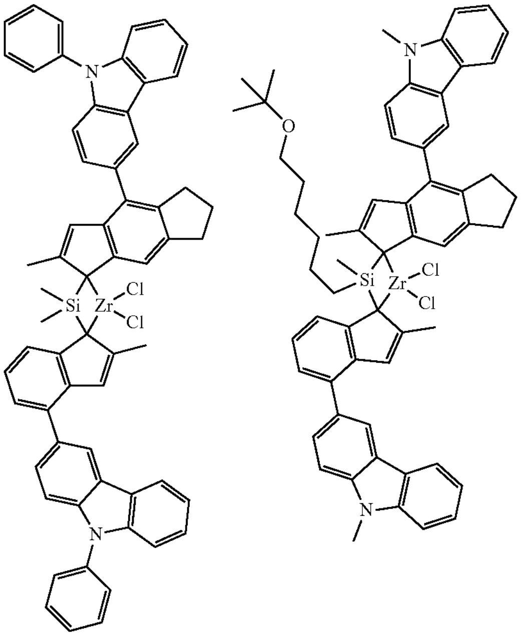

-continued
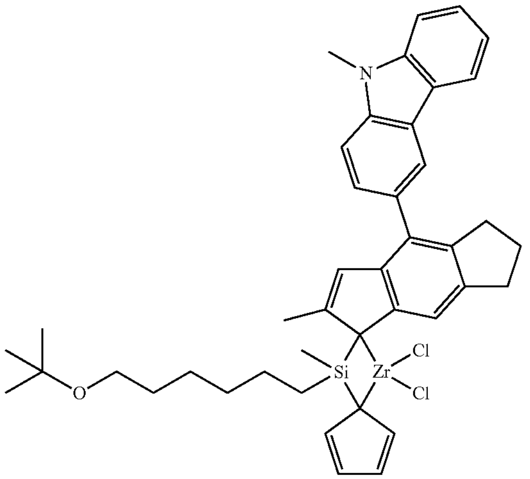
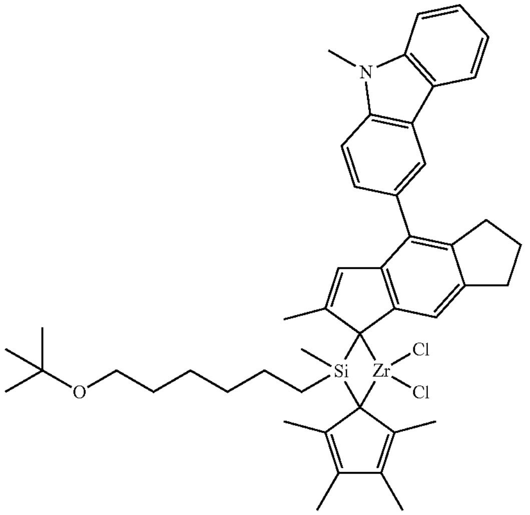
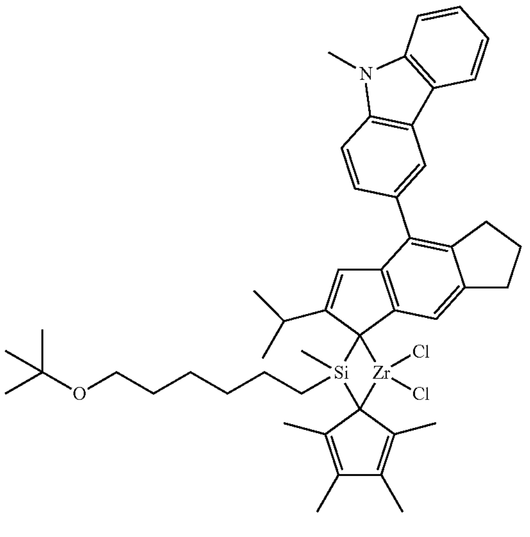
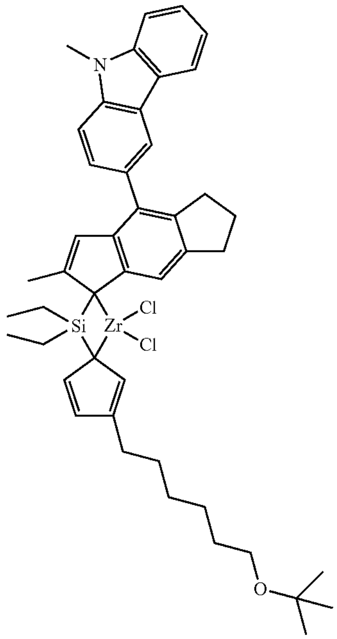
-continued
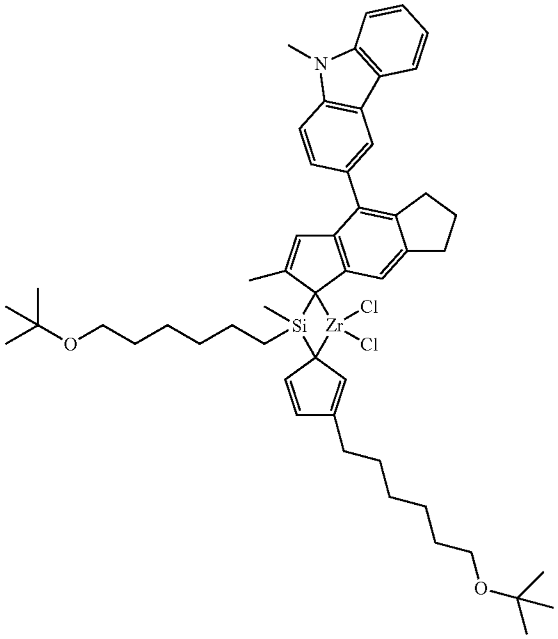

-continued
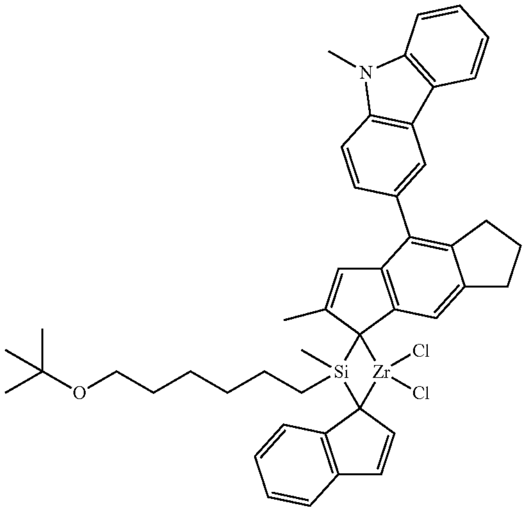
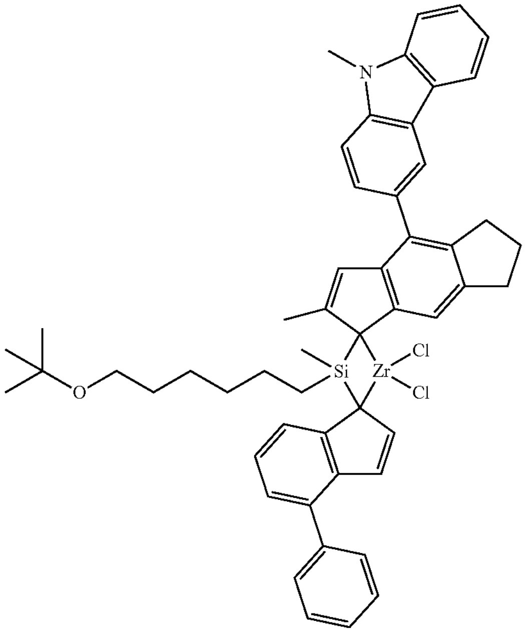
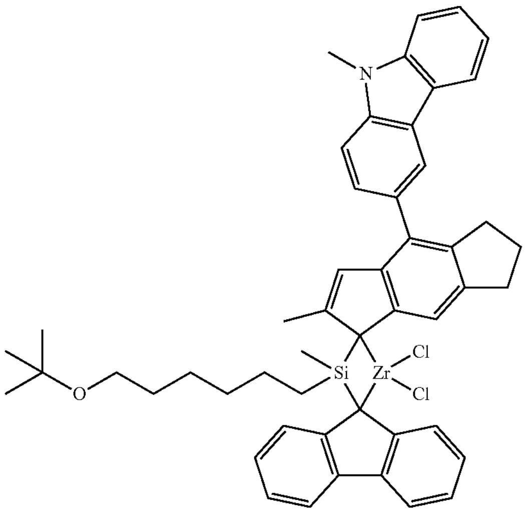
-continued
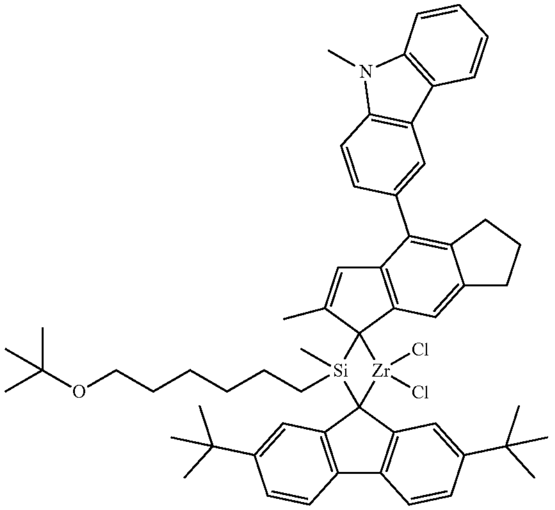
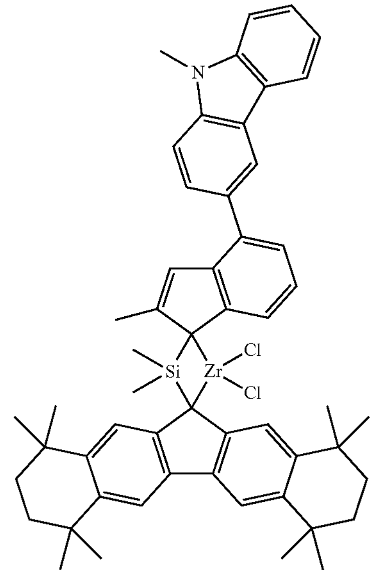
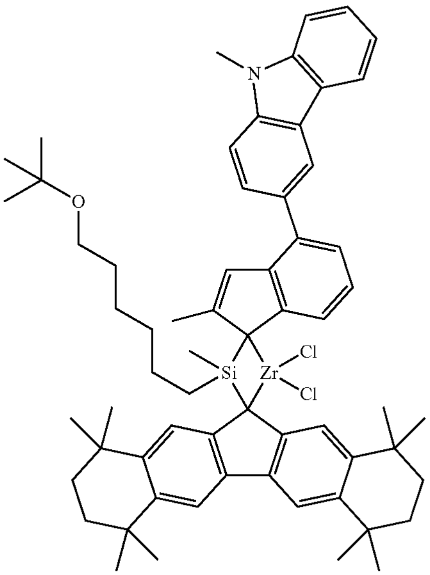

-continued
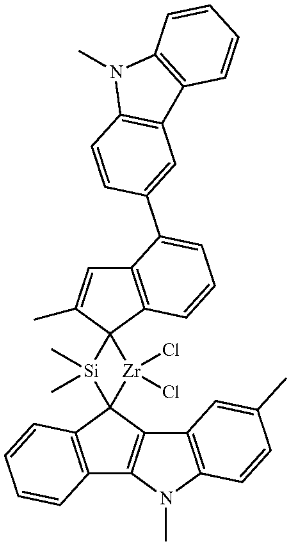
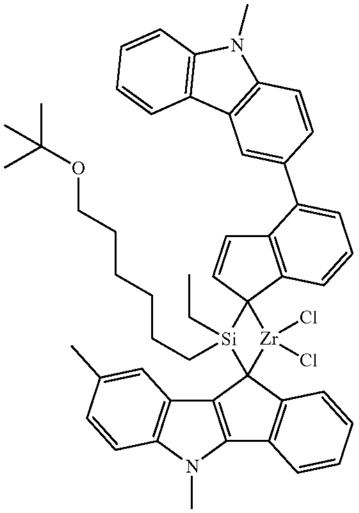
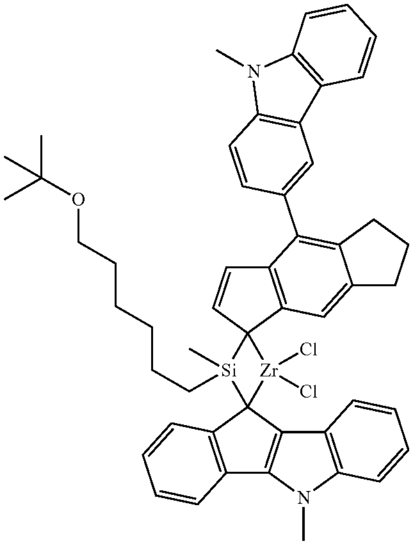
-continued
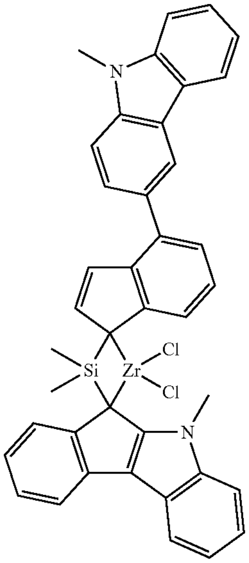
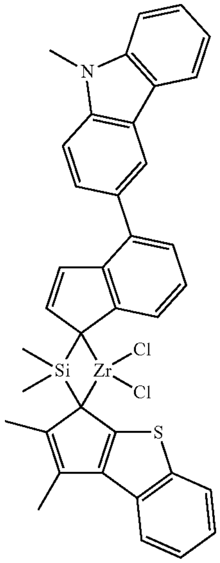
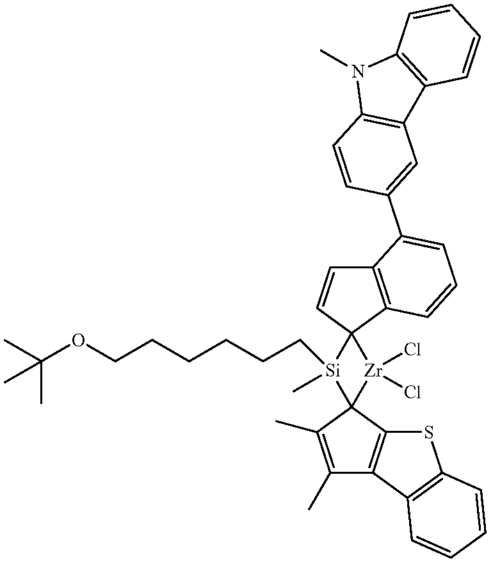
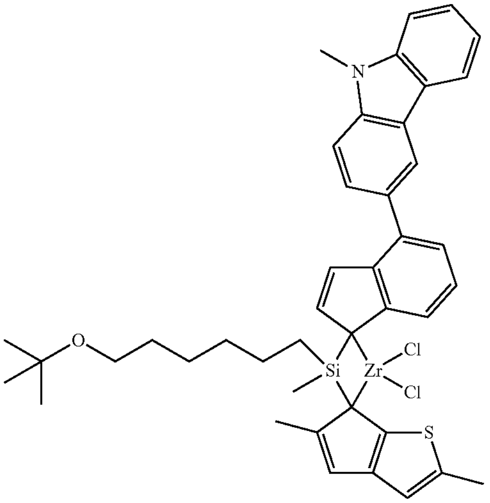

-continued
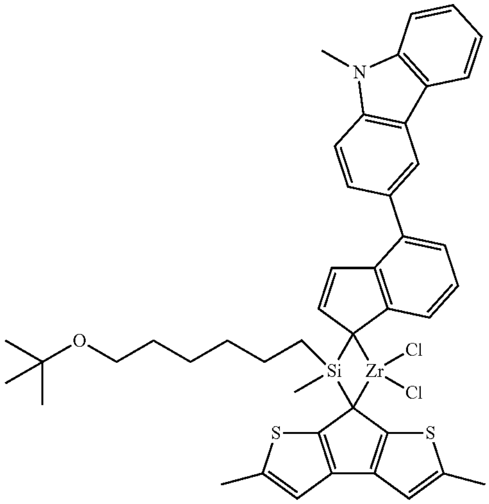
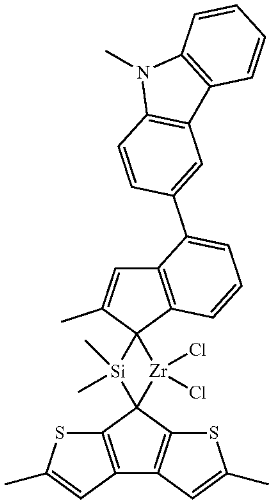
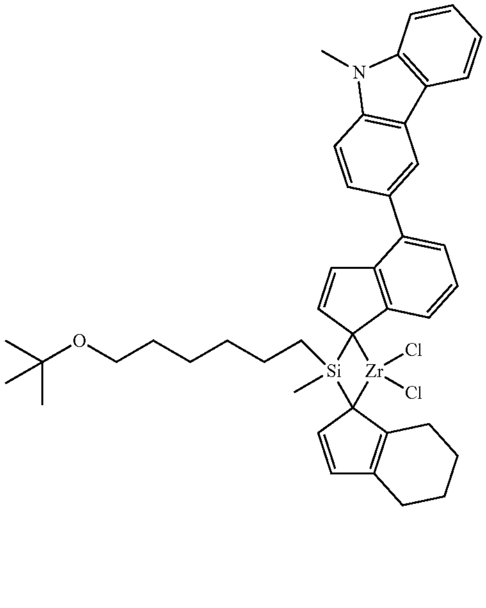
-continued
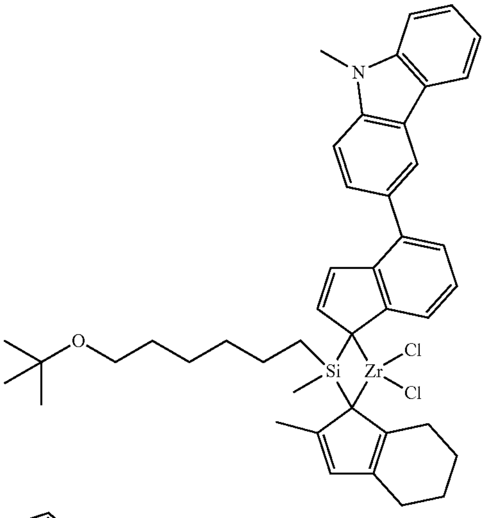
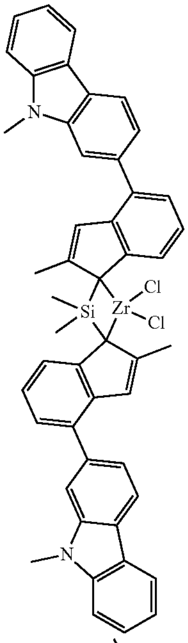
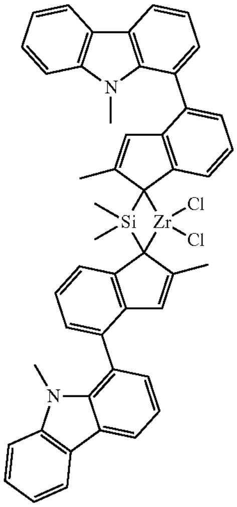
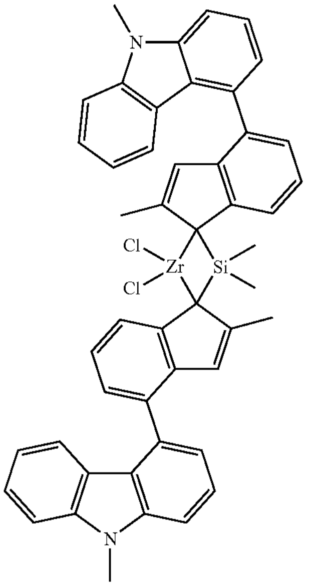

-continued
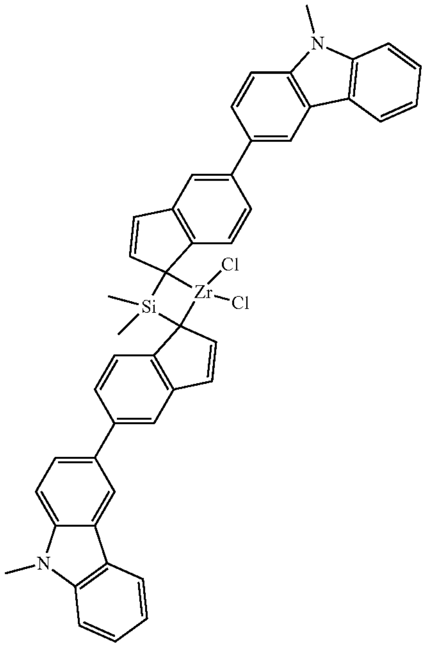
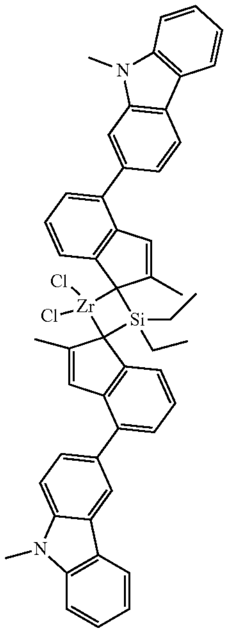
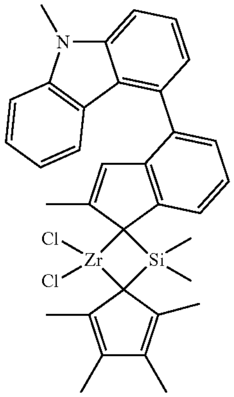
-continued
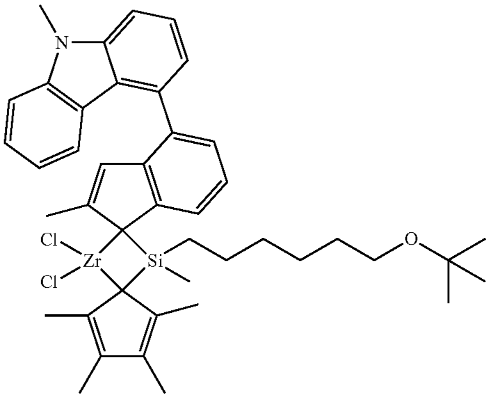
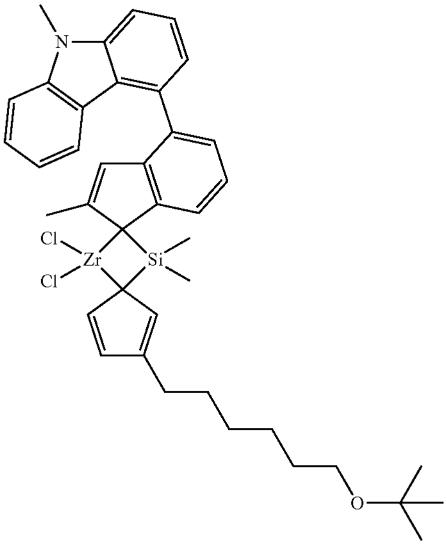
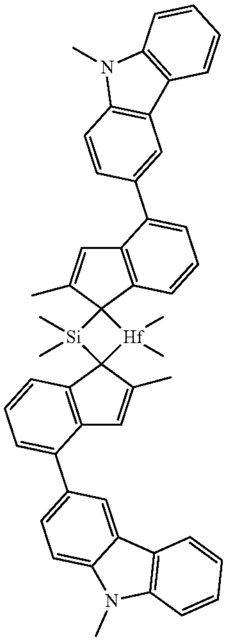
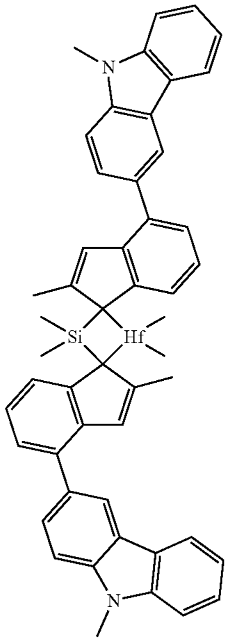

-continued
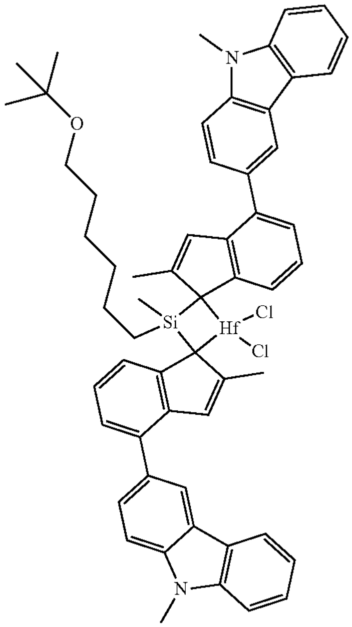
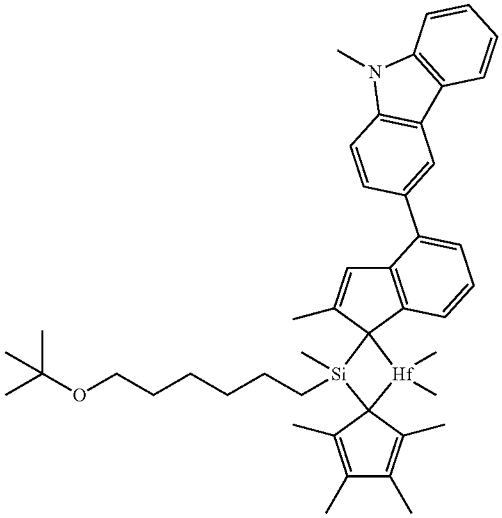
-continued
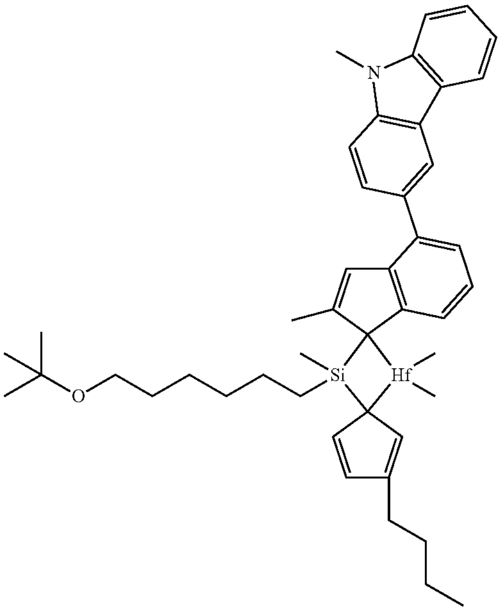
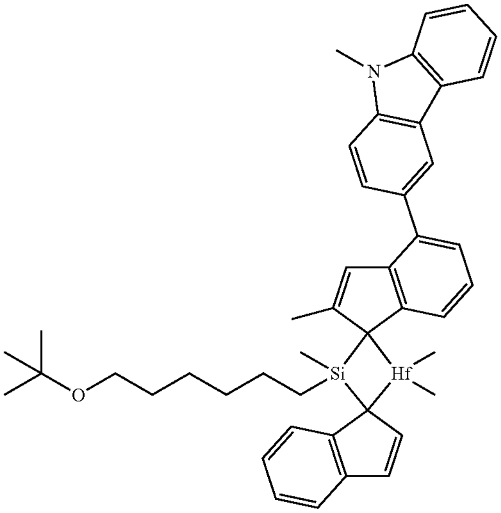
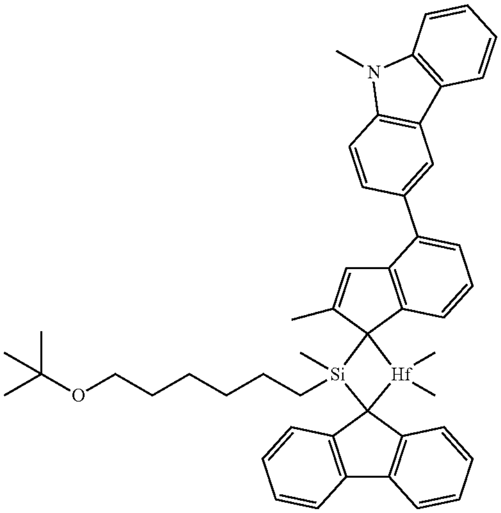

-continued
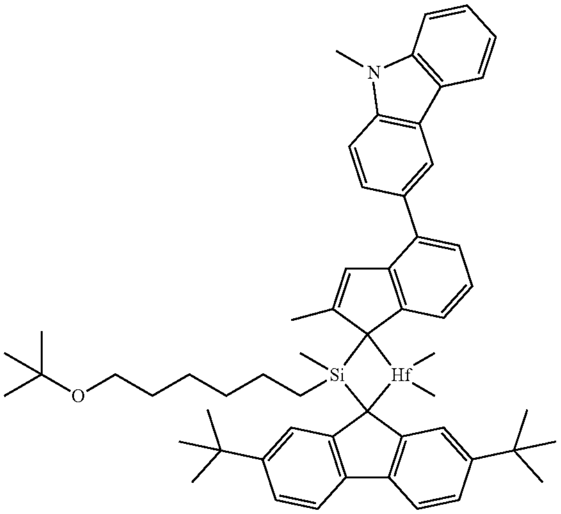
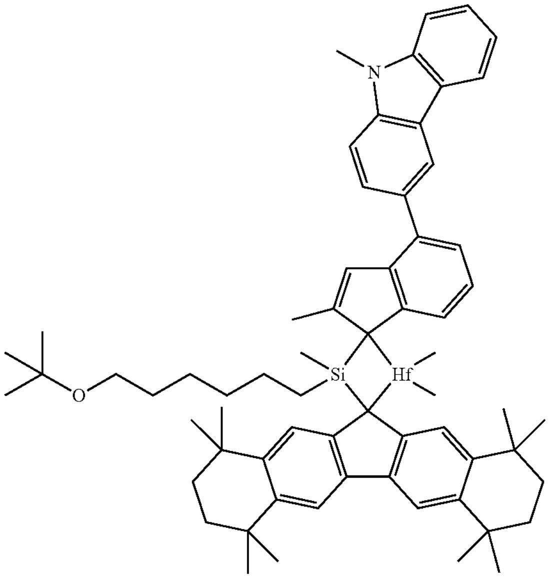
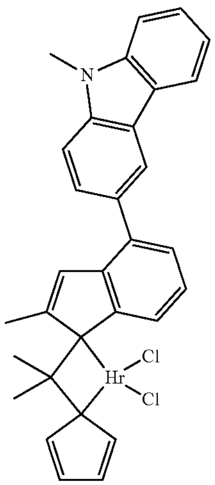
-continued
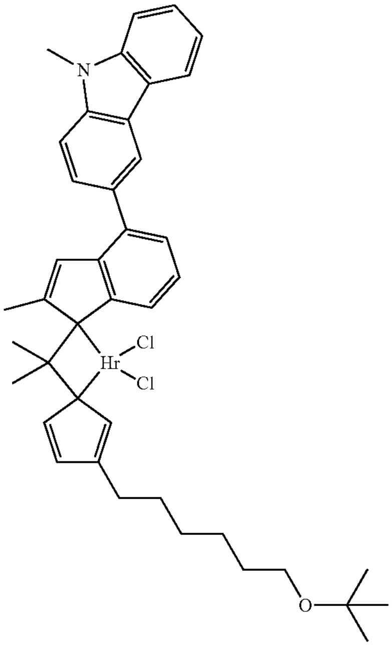
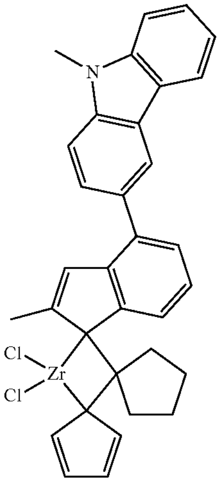
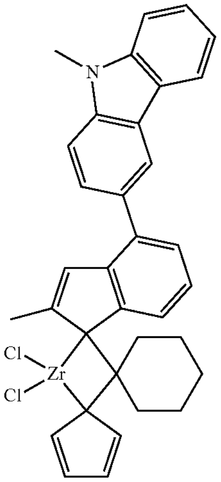
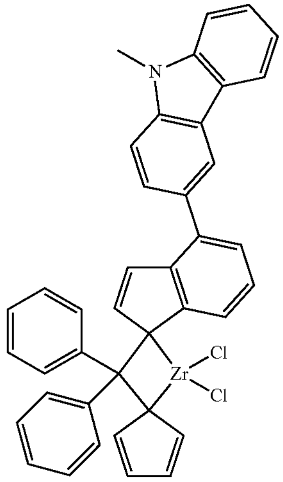

-continued
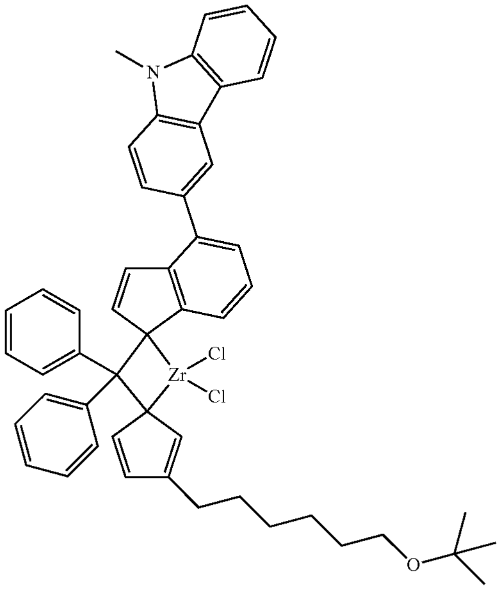
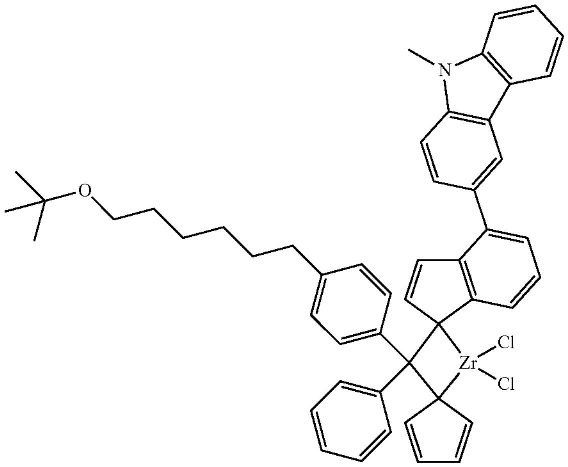
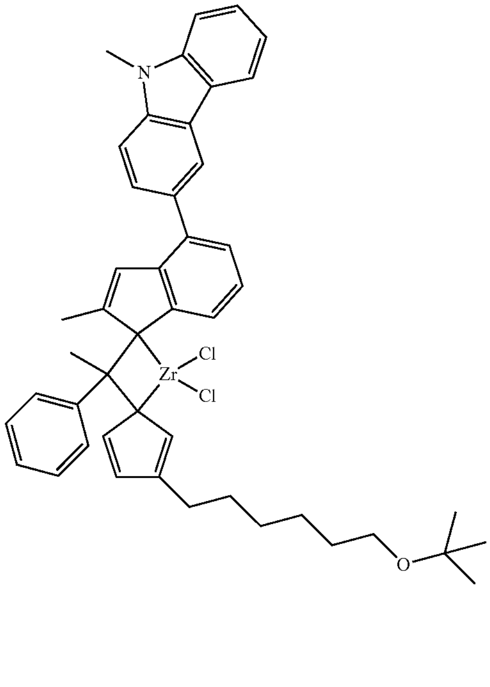
-continued
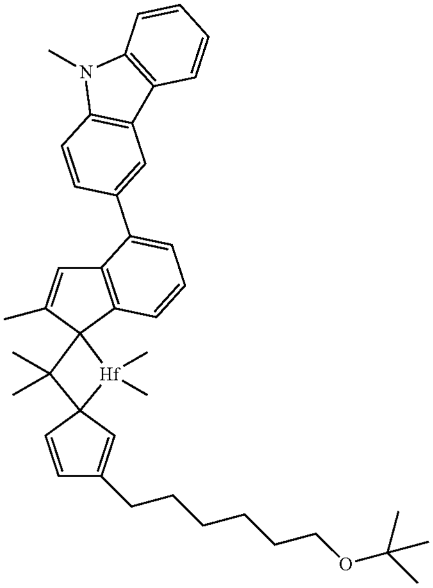
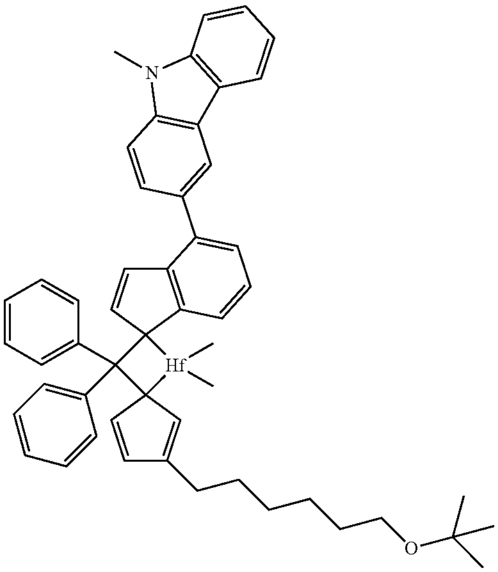
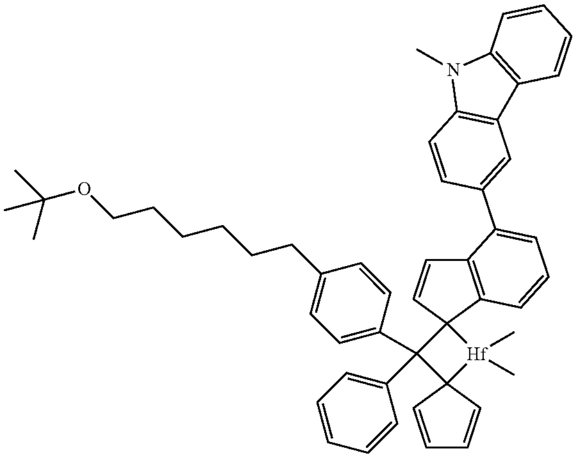

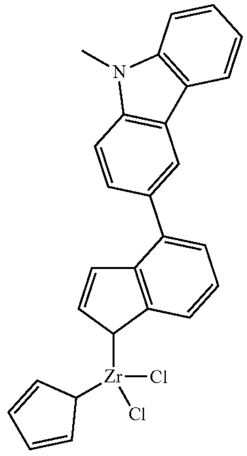
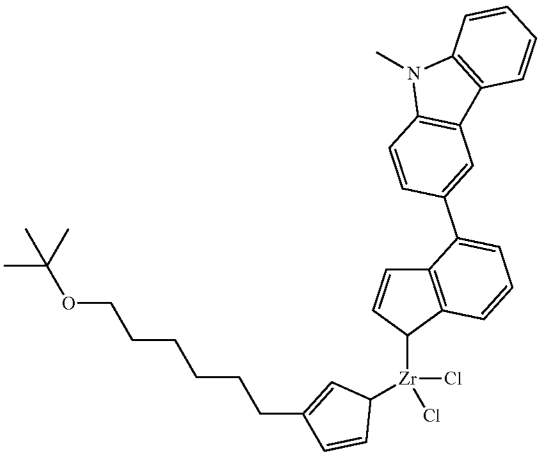
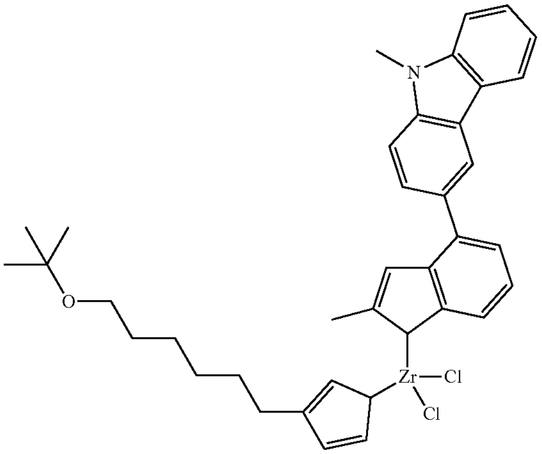
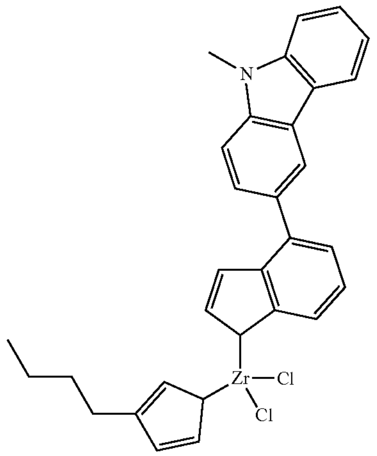
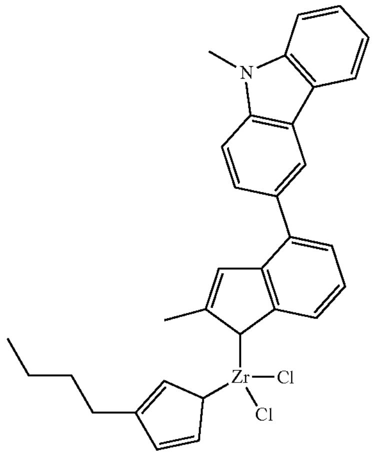
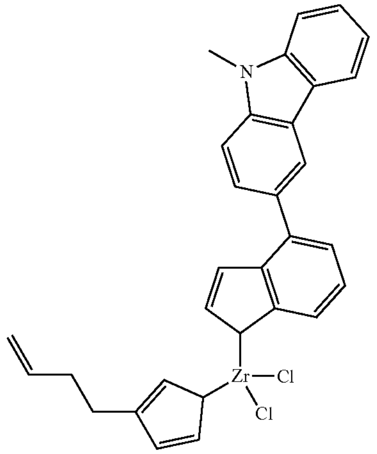

-continued
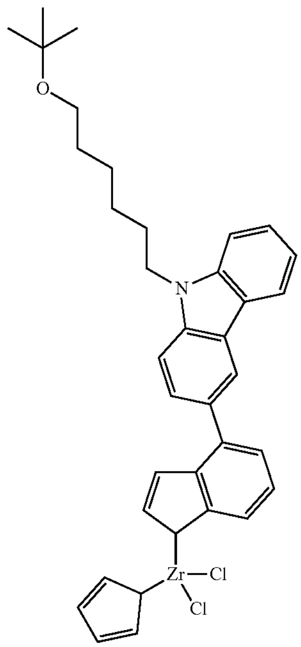
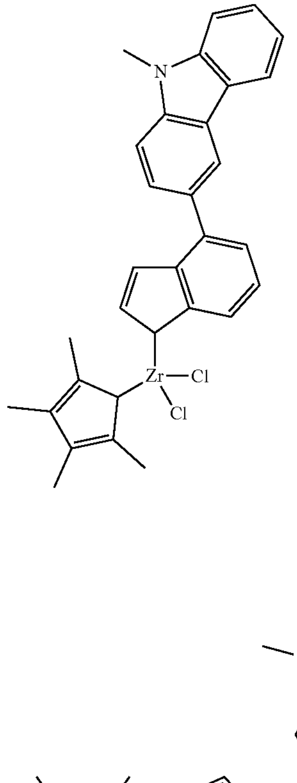
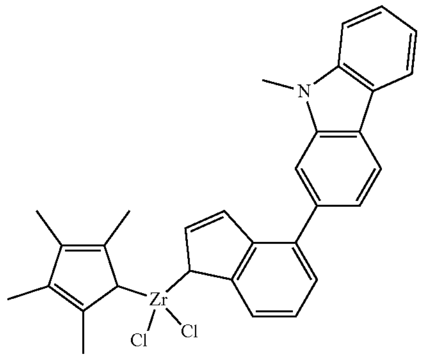
-continued
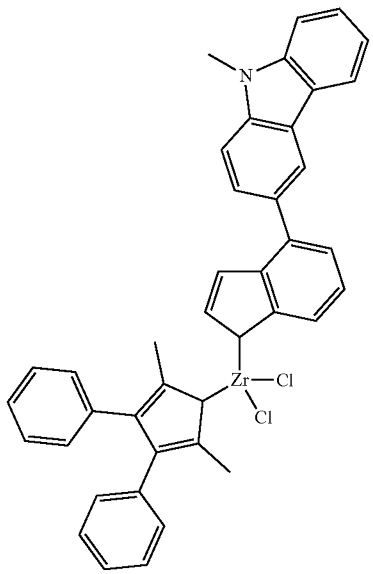
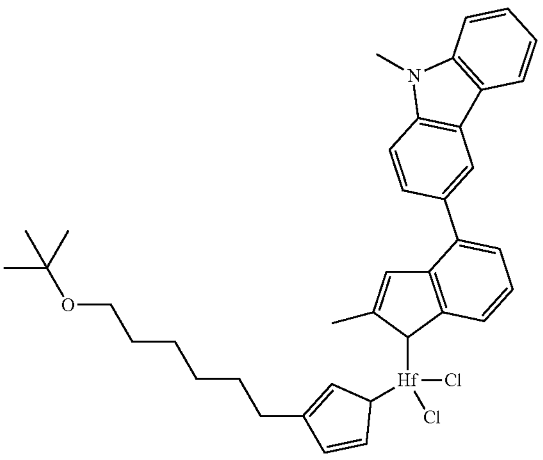
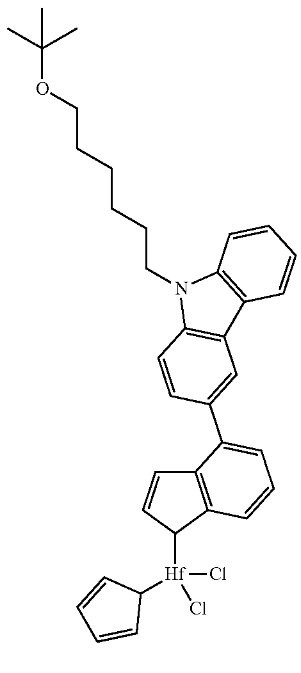

-continued
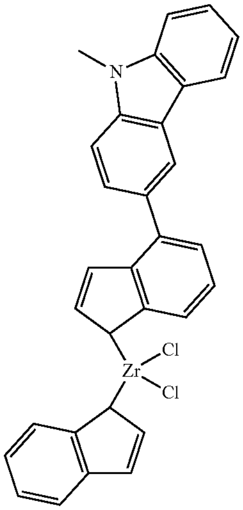
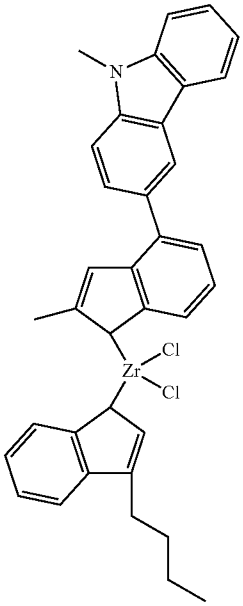
-continued
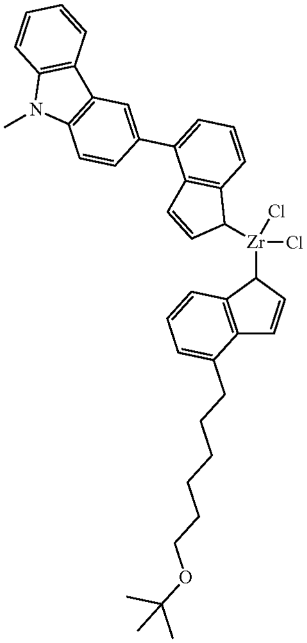
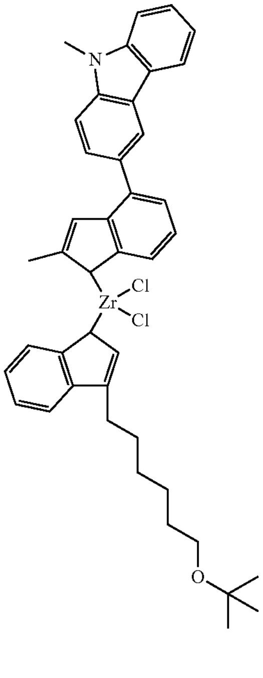
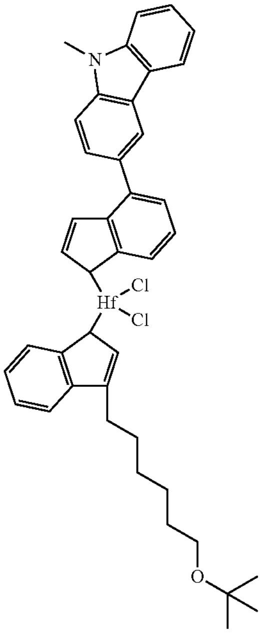

-continued

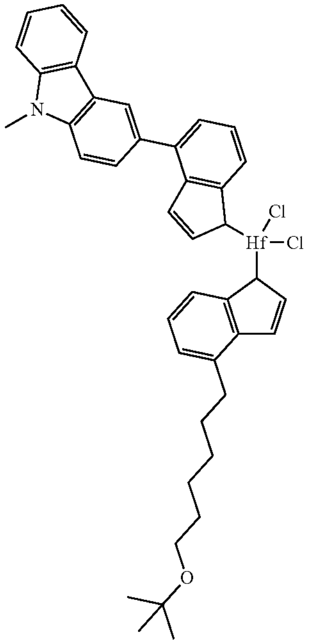

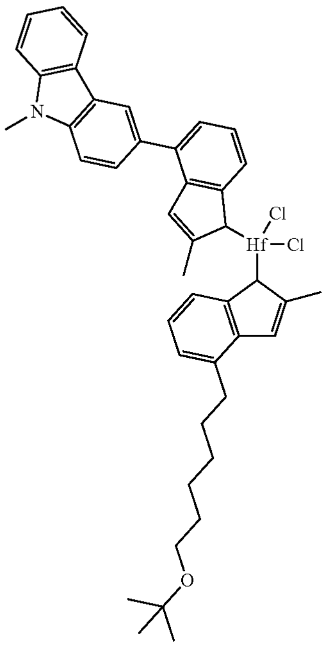

-continued

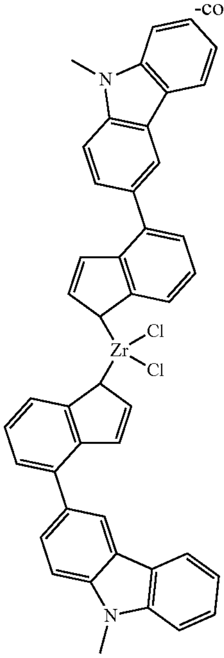

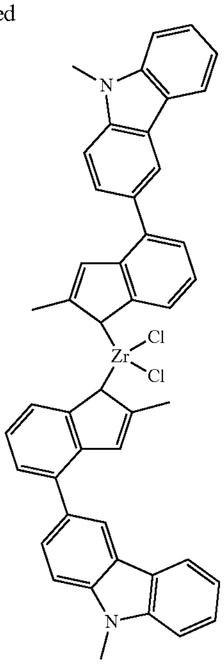

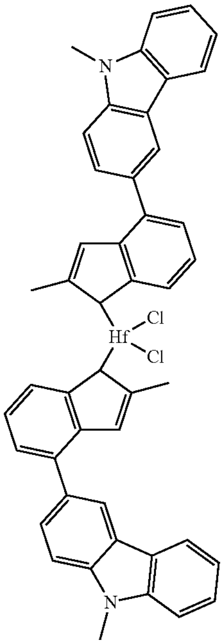

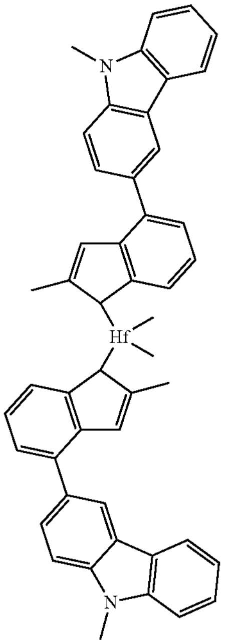

The metallocene compound represented by the Chemical Formula 1 may be prepared by any known preparation methods of organic compounds and metallocene compounds. The preparation method will be explained in more detail in Preparation Examples later.

(Catalyst Composition)

According to another embodiment of the invention, there is provided a catalyst composition comprising the metallocene compound represented by the Chemical Formula 1; a carrier; and a cocatalyst. The catalyst composition according to the invention may comprise a carrier; and one or more cocatalyst compounds selected from the group consisting of compounds represented by the following Chemical Formula 2 and Chemical Formula 3, in addition to the metallocene compound represented by the Chemical Formula 1.

$$—[Al(R_{12})—O]_a— \quad \text{[Chemical Formula 2]}$$

in the Chemical Formula 2, each $R_{12}$ is independently halogen, $C_{1-20}$ alkyl or $C_{1-20}$ haloalkyl;

a is an integer of 2 or more;

$J(R_{13})_3$ [Chemical Formula 3]

in the Chemical Formula 3, each $R_{13}$ is independently, halogen, $C_{1-20}$ alkyl or $C_{1-20}$ haloalkyl; and J is aluminum or boron.

As the carrier for supporting the metallocene compound represented by the Chemical Formula 1, carriers having highly reactive hydroxy groups, silanol groups or siloxane groups on the surface may be used, and for this purpose, those wherein surface is modified by calcination, or surface moisture is removed by drying, may be used.

Preferably, silica prepared by calcination of silica gel, silica dried at high temperature, silica-alumina, and silica-magnesia, and the like may be used, and they may commonly contain oxide, carbonate, sulfate and nitrate components such as $Na_2O$, $K_2CO_3$, $BaSO_4$, and $Mg(NO_3)_2$.

Preferably, the compound represented by the Chemical Formula 2 that is used as a cocatalyst compound is not specifically limited as long as it is alkylaluminoxane, but for example, aluminoxane-based compounds such as methylaluminoxane, ethylaluminoxane, isobutylaluminoxane, or butylaluminoxane, and the like may be mentioned, and one of them or mixtures thereof may be used.

Preferably, as examples of the compound represented by the Chemical Formula 3 that is used as a cocatalyst compound, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethyl boron, triethyl boron, triisobutyl boron, tripropyl boron, tributyl boron, and the like are included, and more specifically, it may be selected from trimethylaluminum, triethylaluminum, and triisobutylaluminum.

The catalyst composition according to one embodiment of the invention may be prepared by a method comprising steps of: supporting a cocatalyst in a carrier; and supporting a metallocene compound in the carrier in which the cocatalyst is supported.

In the preparation method, support conditions are not specifically limited, and may be those well known in the art. For example, support may be progressed appropriately using high temperature support and low temperature support, and for example, a support temperature may be −30° C. to 150° C., preferably 50° C. to 98° C., or 50° C. to 95° C. A support time may be appropriately controlled according to the amount of a metallocene compound to be supported. The supported catalyst may be used as it is after filtering or decompression distilling the reaction solvent to remove, and if necessary, Soxhlet-filtered with aromatic hydrocarbon such as toluene.

And, the preparation of the supported catalyst may be conducted under solvent or no-solvent. If a solvent is used, solvents known to be usable in organic metal catalysts may be used without specific limitations, and for example, aliphatic hydrocarbon solvents such as pentane, hexane, heptane, nonane, decane, and isomers thereof; aromatic hydrocarbon solvents such as toluene, xylene, benzene; or chloro-substituted hydrocarbon solvents such as dichloromethane, chlorobenzene, and the like may be used, and the content of the solvent used in the catalyst composition may be appropriately controlled according to the properties of the catalyst composition and the conditions of the preparation process of olefin polymer, and the like.

In the preparation method of a metallocene compound or supported catalyst, an equivalent (eq) means molar equivalent (eq/mol).

(Method for Preparing an Olefin Polymer)

Meanwhile, there is provided a method for preparing an olefin polymer comprising a step of polymerizing olefin monomers, in the presence of a catalyst composition comprising the above metallocene compound.

In one embodiment of the invention, the polymerization reaction may be conducted while introducing hydrogen gas in the content of 1500 ppm or less, 1000 ppm or less, or 850 ppm or less, and 200 ppm or more, 250 ppm or more, 300 ppm or more, based on the monomer content.

In one embodiment of the invention, the polymerization reaction may be conducted at 10 to 150° C., preferably 60 to 130° C. If the polymerization reaction temperature is too low, reactivity of olefin monomers may not be high, and thus, it may be difficult to synthesize an olefin polymer, and if the polymerization reaction temperature is too high, olefin monomers may be thermally decomposed.

In one embodiment of the invention, the polymerization reaction may be conducted in the pressure range of 1 to 20 bar, preferably 5 to 10 bar.

The polymerization reaction of olefin monomers may be progressed by a continuous solution polymerization process, bulk polymerization process, suspension polymerization process or emulsion polymerization process, but preferably, it may be progressed by solution polymerization that is continuously conducted in a single reactor.

The catalyst composition may be dissolved or diluted in a $C_{5-12}$ aliphatic hydrocarbon solvent appropriate for an olefin polymerization process, such as pentane, hexane, heptane, nonane, decane, and isomers thereof; an aromatic hydrocarbon solvent such as toluene, benzene; a chloro-substituted hydrocarbon solvent such as dichloromethane, chlorobenzene, and the like, and introduced. It is preferable that the solvent used is treated with a small amount of alkylaluminum to remove a small amount of water or air acting as a catalyst poison, and a cocatalyst may be additionally used.

As examples of olefin-based monomers that can be polymerized using the organic metal compounds and cocatalyst, ethylene, alpha-olefin, cyclic olefin, and the like may be mentioned, and diene olefin-based monomers or triene olefin-based monomers, and the like having two or more double bonds can be also polymerized. As specific examples of the monomers, ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, and the like may be mentioned, and two or more kinds of these monomers may also be mixed and copolymerized.

In case the olefin polymer is terpolymer prepared from ethylene, alpha olefin and diene-based monomer, as the diene-based monomer, non-conjugated diene-based monomer may be used. As specific examples, 5-1,4-hexadiene, 1,5-heptadiene, 1,6-octadiene, 1,7-nonadiene, 1,8-decadiene, 1,12-tetradecadiene, 3-methyl-1,4,-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5,-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, ethylidene-2-norbornene, 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl) norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1, 2, 3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, or 2-propenyl-2,2-norbornadiene, and the like may be mentioned, and one or more kinds of diene-based monomers selected therefrom may be used.

The metallocene catalyst having the above composition according to the invention exhibits very high activity for an olefin polymerization, and prepares olefin having wide molecular weight distribution and high molecular weight, thus increasing tie-molecules capable of connecting between crystalline regions of polymer. And, it has high short chain branching (SCB), thus enabling tie-molecules to easily penetrate into crystalline regions.

In the general structure of an olefin polymer, crystalline regions and non-crystalline regions are distributed like a matrix. To the boundary between the non-crystalline region and crystalline region, load between long molecular chain and another chain is transferred, and since the boundary exits between a crystalline region that is energy-stable and anon-crystalline region that is relatively unstable, it receives stress internally, and is also vulnerable to external impact.

Using the metallocene catalyst composition according to the invention, due to abundant tie-molecules, mechanical strength and durability of an olefin polymer may be increased.

Specifically, a tie-molecule refers to a specific long molecular chain, and the chain becomes a part of a crystalline region across a non-crystalline region or extended from a crystalline region and ended in a non-crystalline region. Otherwise, it is extended from a crystalline region to a non-crystalline region and the end sometimes returns to a crystalline region again. Through such entanglement, it functions for connecting boundary between regions. Since such a tie-molecule is fixed to two crystalline regions, the shape of a boundary vulnerable to impact may be maintained, and the growth of defects may be prevented.

Meanwhile, in the polymerization process, the metallocene catalyst composition of the invention may exhibit high catalytic activity. For example, the catalytic activity of the metallocene catalyst composition may be 3.0 kg PE/g·cat·hr or more, 4.0 kg PE/g·cat·hr or more, 6.0 kg PE/g·cat·hr or more, and 50 kg PE/g·cat·hr or less, 40 kg PE/g·cat·hr or less, 35 kg PE/g·cat·hr or less, when calculated as the weight of olefin polymer produced (kgPE) per the weight (g) of supported catalyst used, per unit time (h).

(Olefin Polymer)

Meanwhile, according to another aspect of the invention, there is provided an olefin polymer prepared by the preparation method of an olefin polymer.

The prepared polymer may have weight average molecular weight measured by GPC using PS standard, of 100,000 g/mol to 1,500,000 g/mol or 200,000 g/mol to 1,000,000 g/mol. And, it may have PDI of 4.0 to 15.0 or 5.5 to 13.0.

The measurement method of number average molecular weight and weight average molecular weight of the polymer is as follows. It is measured under GPC (gel permeation chromatography, PL GPC220, Agilent Technologies) analysis conditions as follows:

Column: PL MiniMixed B×2

Solvent: TCB (1,2,4-Trichlorobenzene)

Flow rate: 1.0 ml/min

Sample concentration: 1.0 mg/ml

Introduction amount: 10 µl

Column temperature: 160° C.

Detector: Agilent RI detector

Standard: Polystyrene (calibrated by cubic function)

Data processing: ChemStation

Hereinafter, the actions and effects of the invention will be explained in more detail through specific examples. However, these examples are presented only as the illustrations of the invention, and the scope of the right of the invention is not determined thereby.

The following Examples and Comparative Examples were conducted using standard Schlenk and glove-box under nitrogen atmosphere blocking contact with air and moisture, and organic solvents used in the reaction were purified by a standard method. Synthesized ligands and catalysts were confirmed using 500 MHz NMR and MS Detector.

<Preparation of Metallocene Compound>

Preparation Example 1: Preparation of Compound 1

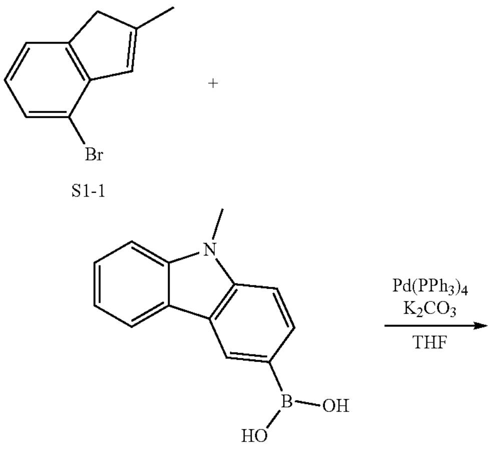

S1-1

S1-2

-continued

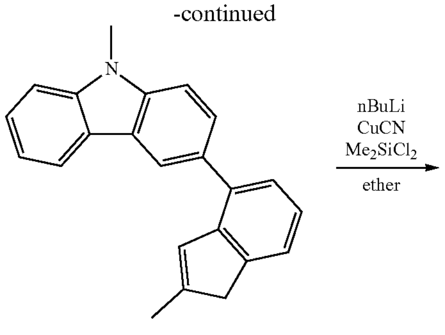

P1-1

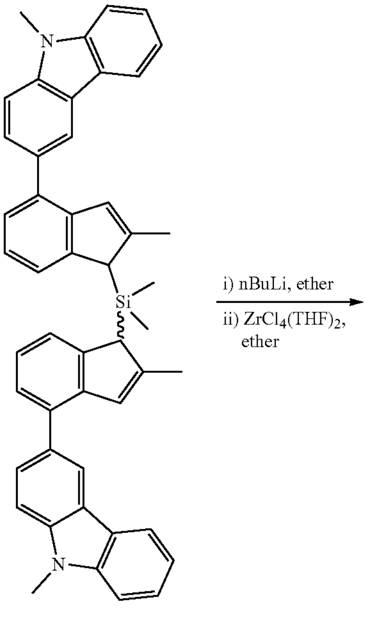

P1-2

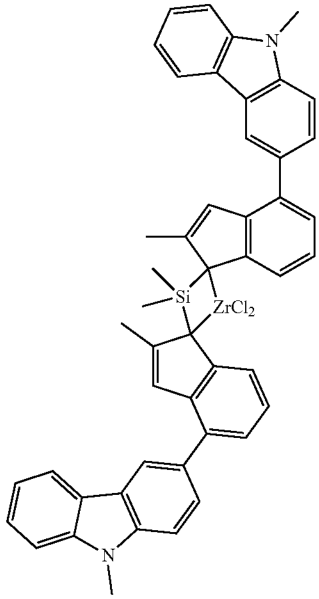

Compound 1

(Preparation of P1-1)

Under argon atmosphere, S1-1 (10 g, 47.8 mmol) and S1-2 (10.8 g, 47.8 mmol) were introduced in 100 ml of tetrahydrofuran, and the mixture was stirred and refluxed. And then, potassium carbonate (19.8 g, 143.5 mmol) was dissolved in 20 ml of water and introduced, and the mixture was sufficiently stirred, and then, tetrakistriphenyl-phosphinopalladium (1.7 g, 1.4 mmol) was introduced. After reaction for 3 hours, the temperature was decreased to room temperature, and an organic layer and an aqueous layer were separated, and then, the organic layer was distilled. It was introduced in hexane (20×, 296 mL) and dissolved again, washed with water twice, and then, an organic layer was separated, magnesium sulfate anhydrous was introduced, it was stirred and then filtered, and the filtrate was decompression distilled. The concentrated compound was purified through a silica column using hexane and ethyl acetate to obtain a light yellow solid compound P1-1 (8 g, 54%, MS: $[M+H]^+=310.4$)

(Preparation of P1-2)

Under argon atmosphere, P1-1 (5 g, 16.2 mmol) was dissolved in 150 ml of diethylether:THF 3:1 anhydrous solution, the mixture was cooled to −78° C., n-BuLi (7.1 ml, 17.78 mmol) was introduced, and the mixture was stirred at room temperature for 4 hours. Copper cyanide (CuCN, 0.74 g, 8.24 mmol) was added thereto, the mixture was stirred at room temperature for 2 hours, and then, cooled to −78° C. again. Dimethyldichlorosilane (1.04 ml, 8.56 mmol) was added thereto, and then, the temperature was raised to room temperature, and the mixture was stirred for 12 hours. After confirming the completion of reaction, it was quenched with 1 ml of water, and sodium sulfate anhydrous was introduced to remove water, followed by filtering through celite, and additional washing with methyl tert-butyl ether, and then, the filtrate was decompression distilled. The concentrated compound was purified through a silica column using hexane and ethyl acetate to obtain a yellow solid compound P1-2 (3.1 g, 57%, MS: $[M+H]^+=675.3$).

(Preparation of Compound 1)

Under argon atmosphere, P1-2 (3 g, 4.44 mmol) was dissolved in 90 ml of diethyl ether, and then, the mixture was cooled to −78° C., and n-butyl lithium (3.73 ml, 9.33 mmol) was added dropwise thereto, and then, the mixture was stirred at room temperature for 12 hours. $ZrCl_4(THF)_2$ (1.7 g, 4.44 mmol) was added thereto, and the mixture was stirred at room temperature for 24 hours, and then, filtered through celite, and the filtrate was decompression distilled to obtain yellow solid. It was recrystallized in hexane to prepare a compound 1 (2.95 g, 80%).

$^1H$ NMR (500 MHz, $CDCl_3$): δ 8.24 (m, 4H), 8.13 (m, 4H), 7.97-8.03 (m, 4H), 7.89 (m, 4H), 7.75 (m, 4H), 7.54 (m, 4H), 7.19-7.44 (m, 16H), 6.29 (S, 1H), 6.13 (s, 1H), 3.66 (s, 6H), 2.42 (s, 6H), 1.31 (s, 3H), 1.12 (s, 3H)

Preparation Example 2: Preparation of Compound 2

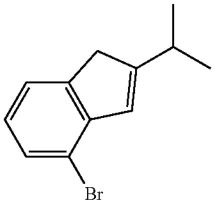

+

S4-1

-continued

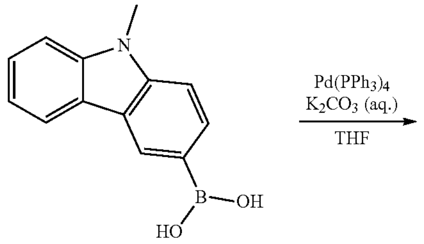

S1-2

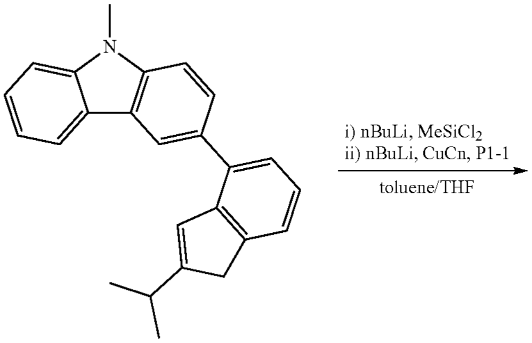

P2-1

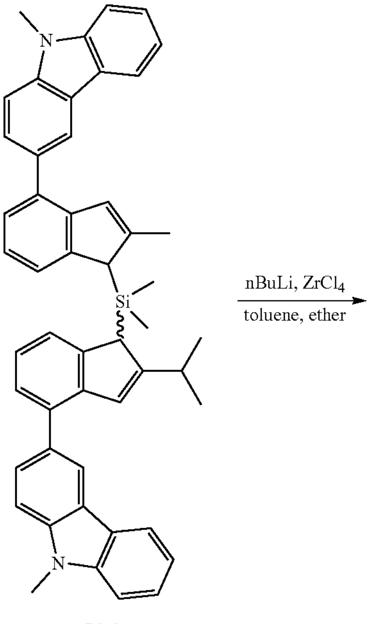

P2-2

-continued

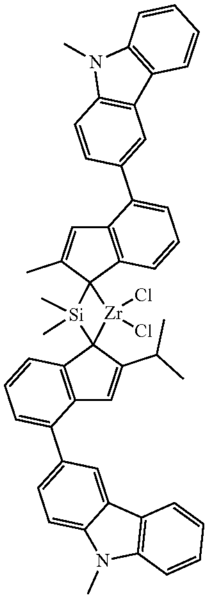

Compound 2

(Preparation of P2-1)

Under argon atmosphere, S4-1 (10 g, 42.2 mmol) and S1-2 (9.5 g, 42.2 mmol) were introduced in 200 ml of tetrahydrofuran, and the mixture was stirred and refluxed. And then, potassium carbonate (17.5 g, 126.5 mmol) was dissolved in 17 ml of water and introduced, and the solution mixture was sufficiently stirred, and then, tetrakistriphenylphosphinopalladium (1.5 g, 1.3 mmol) was introduced. After reaction for 2 hours, the temperature was decreased to room temperature, and an organic layer and an aqueous layer were separated, and then, the organic layer was distilled. It was introduced in hexane (20×, 285 mL) and dissolved again, washed with water twice, and then, an organic layer was separated, magnesium sulfate anhydrous was introduced, it was stirred and then filtered, and the filtrate was decompression distilled. The concentrated compound was purified through a silica column using hexane and ethyl acetate to obtain a yellow solid compound P4-1 (10.8 g, 76%, MS: $[M+1-1]^+$=338.5)

(Preparation of P2-2)

Under argon atmosphere, P4-1 (5 g, 14.82 mmol) was dissolved in 30 ml of toluene/tetrahydrofuran (10/1), and then, at −78° C., 6.2 ml of n-BuLi was slowly added dropwise, and the mixture was stirred at room temperature for 3 hours. And then, dimethyldichlorosilane (1.89 ml, 15.56 mmol) was introduced at −10° C., and the mixture was stirred at room temperature overnight. In another reactor, P1-1 (4.58 g, 14.82 mmol) was put and dissolved in 22 ml of toluene/tetrahydrofuran (5/1), and then, 6.2 ml of n-BuLi was slowly added dropwise at −78° C., and the mixture was stirred at room temperature for 3 hours. Copper cyanide (0.03 g, 0.3 mmol) was added thereto, and then, the reactant of P2-1 was introduced. And then, the mixture was stirred at room temperature overnight, and worked-up with water and dried to prepare a compound P2-2 (7.2 g, 69%, MS: $[M+1-1]^+$=703.3).

(Preparation of Compound 2)

Under argon atmosphere, P2-2 (5 g, 7.11 mmol) was dissolved in toluene/diethyl ether (2/1) 13 ml, and then, 3 ml of n-BuLi was slowly added dropwise at −78° C., and the mixture was stirred at room temperature for 5 hours. And then, zirconium chloride(IV) (1.66 g, 7.11 mmol) slurry in 42 ml of toluene was introduced, and then, the mixture was stirred at room temperature overnight. After confirming the completion of reaction by NMR, the solvent was vacuum dried and dichloromethane was introduced again, and LiCl was removed by filtration through Glass frit under nitrogen, and then, the filtrate was vacuum dried. The obtained solid was recrystallized with hexane, dichloromethane, and then, the produced solid was filtered to prepare a compound 2 (2.6 g, 42%).

$^1$H NMR (500 MHz, $CDCl_3$): δ 8.27 (m, 4H), 8.15 (m, 4H), 7.98-8.00 (m, 4H), 7.87 (m, 4H), 7.72 (m, 4H), 7.50 (m, 4H), 7.16-7.41 (m, 16H), 6.24 (S, 1H), 6.12 (s, 1H), 3.65 (s, 6H), 2.36 (q, 1H), 1.66 (d, 6H), 1.29 (s, 3H), 1.10 (s, 3H)

Preparation Example 3: Preparation of Compound 3

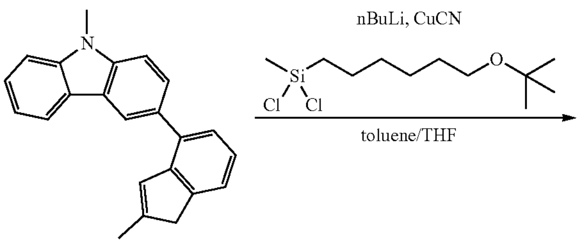

P1-1

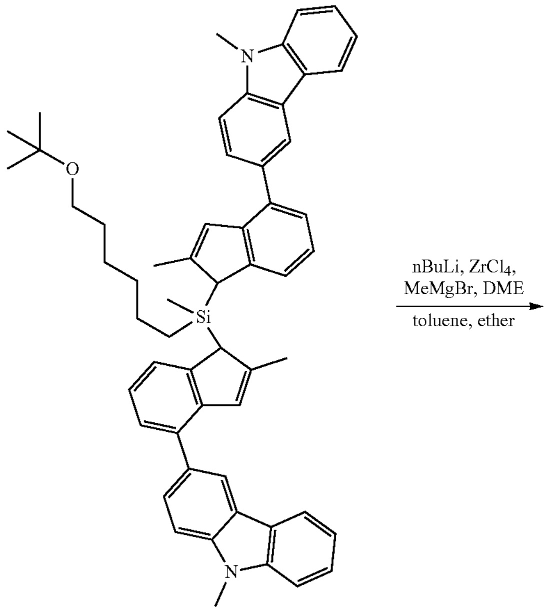

P3-1

-continued

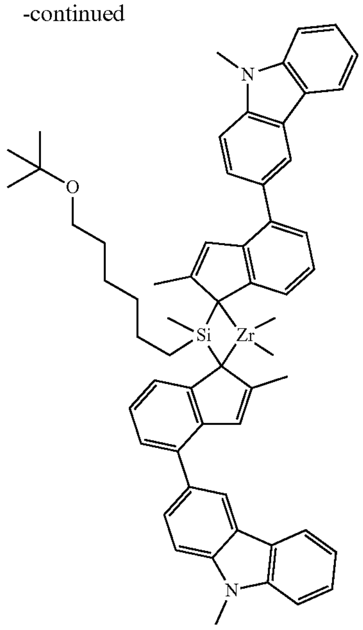

Compound 3

(Preparation of P3-1)

Under argon atmosphere, P1-1 (5 g, 16.16 mmol) was dissolved in 32 ml of toluene/tetrahydrofuran (10/1), and then, n-butyllithium (6.8 ml, 16.97 mmol) was slowly added thereto at −78° C., and the mixture was stirred at room temperature for 3 hours. Copper cyanide (0.03 g, 0.32 mmol) was added thereto at room temperature, and the mixture was stirred for 2 hours, and then, dichloro methyl (6-(tert-butoxy)hexyl) silane (2.19 g, 8.08 mmol) was added. And then, the mixture was stirred at room temperature overnight, and worked-up with water and dried to prepare a compound P3-1 (7.6 g, 67%, MS: $[M+1-1]^+$=817.5).

(Preparation of Compound 3)

Into a dried schlenk flask, P3-1 (3.5 g, 4.28 mmol) was introduced, and the flask was filled with argon, and 44 ml of toluene/diethylether (10/1) was introduced to dissolve, and then, the mixture was cooled to −78° C. 3.6 ml of 2.5M n-butyllithium was slowly added thereto, the temperature was raised to room temperature, and then, the mixture was stirred for 12 hours. And then, zirconium chloride(IV) (1.02 g, 4.37 mmol) slurry in 5 ml of toluene was introduced, and then, the mixture was stirred at room temperature overnight. After confirming the completion of reaction by NMR, the temperature was decreased to −78° C., and methylmagnesium bromide, 3.0M solution in diethylether (3.57 ml, 10.71 mmol) was slowly added thereto. The temperature was raised to room temperature, and the mixture was stirred overnight. After confirming the completion of reaction by NMR, the solvent was vacuum dried, and dichloromethane was introduced again, and then, 1,2-dimethoxyethane (1.34 ml, 12.85 mmol) was introduced, and the mixture was stirred at room temperature overnight. Inorganic substances were removed by filtration under nitrogen condition, and then, the filtrate was vacuum dried to prepare a compound 3 (2.4 g, yield: 59%)

$^1$H NMR (500 MHz, $CDCl_3$): rac/meso mix δ 8.38-8.31 (m, 6H), 8.25 (m, 2H), 8.16 (m, 1H), 8.14 (m, 1H), 8.06-8.03 (m, 2H), 7.99 (m, 2H), 7.72-7.66 (m, 7H), 7.62 (m, 3H), 7.42 (m, 6H), 7.35 (m, 6H), 7.23 (m, 2H), 7.21 (m, 2H), 6.37 (S, 2H), 6.33 (S, 2H), 3.79 (s, 6H), 3.75 (s, 6H), 3.37 (t, 2H), 3.34 (t, 2H), 1.8 (s, 6H), 1.75 (s, 6H), 1.51-1.20 (m, 16H), 1.15 (s, 9H), 1.11 (s, 9H), 0.62 (m, 2H), 0.58 (m, 2H), 0.23 (s, 3H), 0.18 (s, 3H), −0.87 (s, 6H), −0.93 (s, 3H), −1.03 (s, 3H)

Preparation Example 4: Preparation of Compound 4

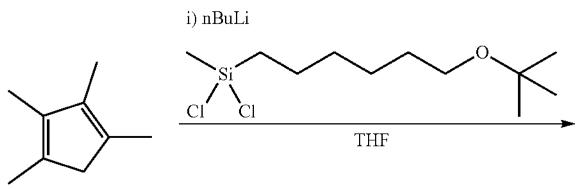

Exact Mass:
122.11
Molecular Weight:
122.21
S4-1

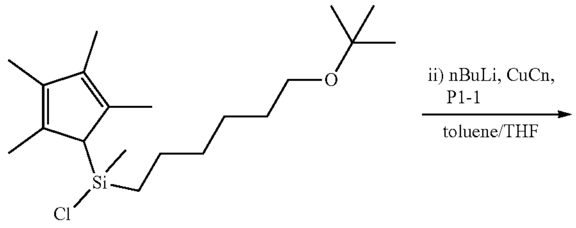

P4-1

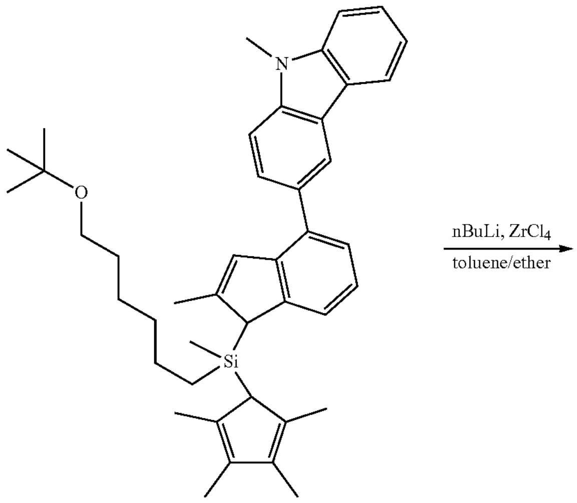

P4-2

-continued

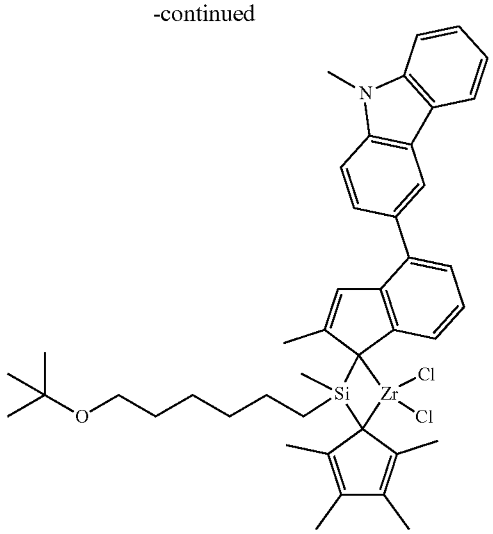

Compound 4

(Preparation of P4-2)

Under argon atmosphere, S4-1 (2 g, 16.37 mmol) was dissolved in 33 ml of tetrahydrofuran, and then, 6.9 ml of 2.5 M n-butyllithium was slowly added dropwise at −78° C., and then, the mixture was stirred at room temperature for 3 hours. And then, dichloro methyl(6-(tert-butoxy)hexyl) silane (4.73 ml, 17.18 mmol) was introduced at −10° C., and then, the mixture was stirred at room temperature overnight. In another reactor, P1-1 (5.06 g, 16.37 mmol) was introduced and dissolved in 25 ml of toluene/tetrahydrofuran (5/1), and then, 6.9 ml of 2.5 M n-butyllithium was slowly added dropwise at −78° C., and the mixture was stirred at room temperature for 3 hours. Copper cyanide (0.03 g, 0.33 mmol) was introduced at room temperature, and the mixture was stirred for 30 minutes, and then, the reactant of P4-1 was introduced. And then, the mixture was stirred at room temperature overnight, and worked-up with water and dried to prepare a compound P4-2 (6.7 g, 65%, MS: $[M+H]^+=$ 630.4).

(Preparation of Compound 4)

Under argon atmosphere, P4-2 (6 g, 9.52 mmol) was dissolved in 18 ml of toluene/diethylether (2/1), and 4 ml of 2.5 M n-butyllithium was slowly added dropwise at −78° C., and then, the mixture was stirred at room temperature for 5 hours. And then, zirconium chloride(IV) (2.22 g, 9.52 mmol) slurry in 56 ml of toluene was introduced, and then, the mixture was stirred at room temperature overnight. After confirming the completion of reaction by NMR, the solvent was vacuum dried, dichloromethane was introduced again, and LiCl was removed by filtration through glass frit under nitrogen condition, and then, the filtrate was vacuum dried. The obtained solid was introduced in pentane, and the mixture was stirred for 12 hours, and then, remaining solid was filtered to prepare a compound 4 (6.4 g, 85%).

$^1H$ NMR (500 MHz, $CDCl_3$): δ 8.3 (dd, 1H), 8.19 (dd, 1H), 8 (d, 1H), 7.92 (s, 1H), 7.81 (d, 1H), 7.63 (m, 1H), 7.51-7.35 (m, 4H), 6.40 (s, 1H), 3.80 (s, 3H), 3.38 (t, 2H), 2.16 (s, 6H), 1.81 (s, 6H), 1.79 (s, 3H), 1.53-1.25 (m, 8H), 1.15 (s, 9H), 0.64 (m, 2H), 0.24 (s, 3H)

Preparation Example 5: Preparation of Compound 5

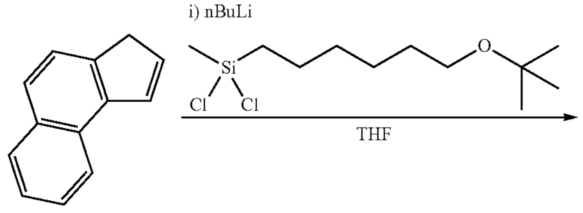

S5-1

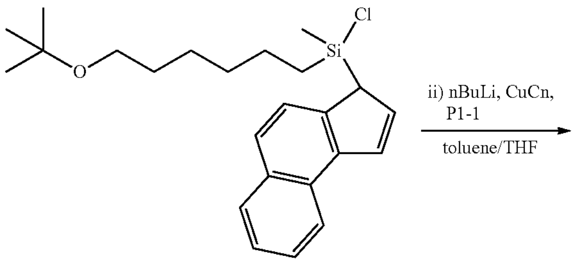

P5-1

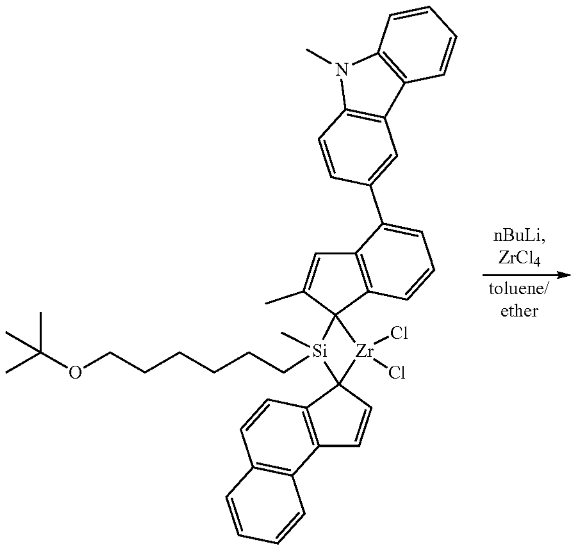

P5-2

-continued

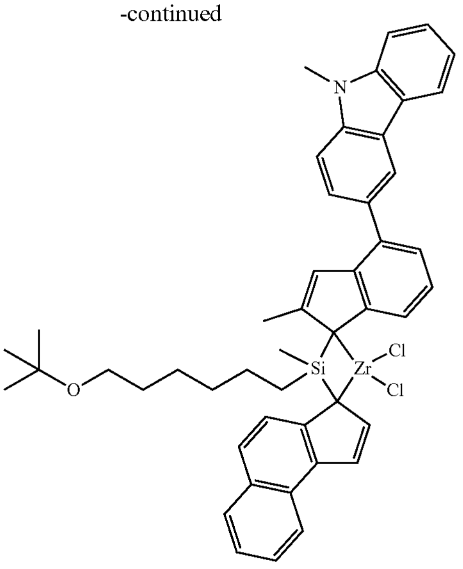

Compound 5

(Preparation of P5-2)

Under argon atmosphere, S5-1 (3 g, 18.05 mmol) was dissolved in 36 ml of tetrahydrofuran, and 7.6 ml of 2.5 M n-butyllithium was slowly added dropwise at −78° C., and then, the mixture was stirred at room temperature for 3 hours. And then, dichloro methyl(6-(tert-butoxy)hexyl) silane (5.21 ml, 18.95 mmol) was added at −10° C., and the mixture was stirred at room temperature overnight. In another reactor, P1-1 (5.58 g, 18.05 mmol) was put and dissolved in 27 ml of toluene/tetrahydrofuran (5/1), and 7.6 ml of 2.5 M n-butyllithium was slowly added dropwise at −78° C., and then, the mixture was stirred at room temperature for 3 hours. Copper cyanide (0.03 g, 0.36 mmol) was introduced therein at room temperature, and the mixture was stirred for 30 minutes, and then, the reactant of P5-1 was introduced. And then, the mixture was stirred at room temperature overnight, and worked-up with water and dried to prepare a compound P5-2 (5.4 g, 44%, MS: $[M+1-1]^+$ =674.4).

(Preparation of Compound 5)

Under argon atmosphere, P5-2 (5 g, 7.42 mmol) was dissolved in 14 ml of toluene/diethylether (2/1), and 3.1 ml of 2.5 M n-butyllithium was slowly added dropwise at-78° C., and then, the mixture was stirred at room temperature for 5 hours. And then, zirconium chloride(IV) (1.73 g, 7.42 mmol) slurry in 44 ml of toluene was introduced, and then, the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried. The obtained solid was introduced in pentane and the mixture was stirred for 12 hours, and then, remaining solid was filtered to prepare a compound 5 (3.04 g, 49%).

$^1$H NMR (500 MHz, $CDCl_3$): rac/meso mix δ 8.31 (dd, 1H), 8.26 (dd, 1H), 8.19 (m, 1H), 8.15 (m, 1H), 8.03 (d, 1H), 7.97 (d, 1H), 7.90-7.80 (m, 10H), 7.66-7.62 (m, 2H), 7.60-7.56 (m, 2H), 7.50-7.35 (m, 3H), 7.45-7.32 (m, 7H), 7.12 (d, 1H), 7.06 (d, 1H), 6.59 (d, 1H), 6.56 (d, 1H), 6.41-6.36 (m, 4H), 3.79 (s, 3H), 3.74 (s, 3H), 3.36 (t, 2H), 3.32 (t, 2H), 1.82 (s, 3H), 1.78 (s, 3H), 1.51-1.25 (m, 16H), 1.17 (s, 9H), 1.09 (s, 9H), 0.62 (m, 2H), 0.57 (m, 2H), 0.24 (s, 3H), 0.17 (s, 3H)

Preparation Example 6: Preparation of Compound 6

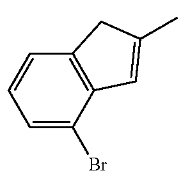

S1-1

+

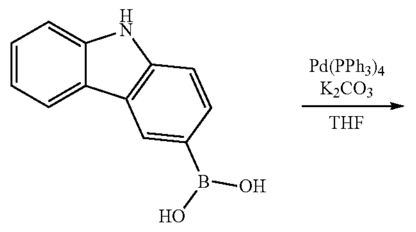

S6-1

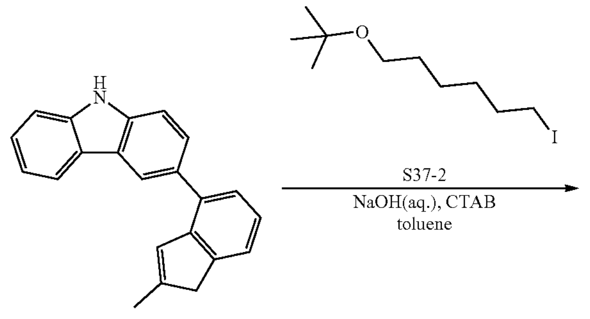

P6-1

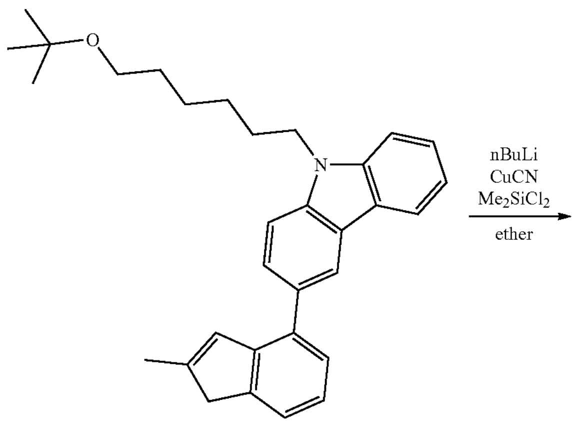

P6-2

-continued

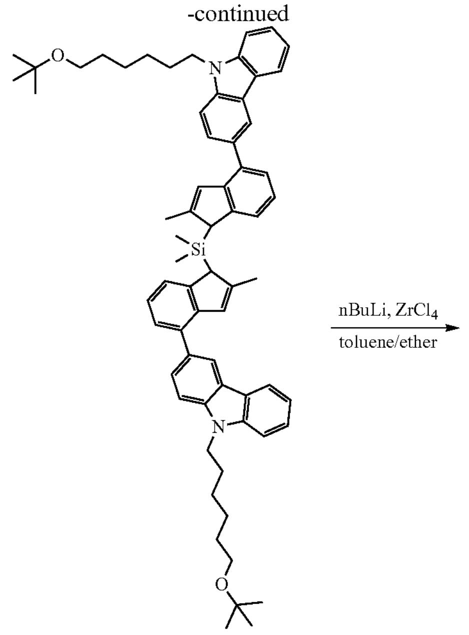

P6-3

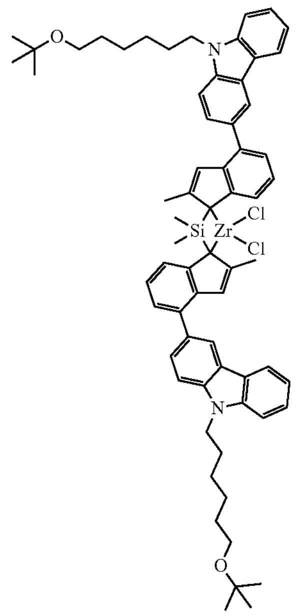

Compound 6

(Preparation of P6-1)

Under nitrogen atmosphere, S1-1 (5 g, 23.9 mmol) and S6-1 (5 g, 23.9 mmol) were introduced in 100 ml of tetrahydrofuran, and the mixture was stirred and refluxed. And then, potassium carbonate (9.9 g, 71.7 mmol) dissolved in 10 ml of water was introduced, and the mixture was sufficiently stirred, and then, tetrakistriphenyl-phosphinopalladium (0.8 g, 0.7 mmol) was introduced. After reaction for 3 hours, the temperature was decreased to room temperature, and an organic layer and an aqueous layer were separated, and then, the organic layer was distilled. It was introduced in hexane (20 times, 141 mL) again and dissolved, and washed with water twice, and then, an organic layer was separated, and magnesium sulfate anhydrous was introduced, it was stirred and then filtered, and the filtrate was decompression distilled. The concentrated compound was purified through silica column using hexane and ethyl acetate to obtain a light yellow solid compound P6-1 (5.7 g, 80%, MS: [M+1-1]+=296.4).

(Preparation of P6-2)

Under nitrogen atmosphere, P6-1 (5 g, 16.9 mmol), S6-2 (4.8 g, 16.9 mmol), CTAB (0.12 g, 0.34 mmol), and sodium hydroxide (2 g, 50.8 mmol) were introduced in 50 ml of water and dissolved, and then, the solution was introduced in 100 ml of toluene, and stirred and refluxed. After reaction for 12 hours, it was cooled to room temperature, and then, introduced in ethyl acetate (30 times, 229 mL) and dissolved, washed with water twice, and then, an organic layer was separated, magnesium sulfate anhydrous was introduced, it was stirred and filtered, and the filtrate was decompression distilled. The concentrated compound was purified through silica column using hexane and ethyl acetate to obtain a compound P6-2 in the form of yellow oil (6 g, 79%, MS: $[M+H]^+$=452.7).

(Preparation of P6-3)

Under argon atmosphere, P6-2 (5 g, 11.07 mmol) was dissolved in 22 ml of toluene/diethylether (10/1), and 4.6 ml of 2.5 M n-butyllithium was slowly added dropwise at −78° C., and then, the mixture was stirred at room temperature for 3 hours. Copper cyanide (0.02 g, 0.22 mmol) was added thereto at room temperature, and the mixture was stirred for 2 hours, and then, dimethyldichlorosilane (0.72 g, 5.54 mmol) was added. And then, the mixture was stirred at room temperature overnight, and washed with water twice, and then, an organic layer was separated and magnesium sulfate anhydrous was introduced, it was stirred and then filtered, and the filtrate was decompression distilled. The concentrated compound was purified through silica column using hexane and ethyl acetate to obtain compound P6-3 (6.8 g, 64%, MS: $[M+H]^+$=959.6).

(Preparation of Compound 6)

Under argon atmosphere, P6-3 (4 g, 4.17 mmol) was dissolved in 8 ml of toluene/diethylether (2/1), and 1.8 ml of 2.5 M n-butyllithium was slowly added dropwise at −78° C., and then, the mixture was stirred at room temperature for 5 hours. And then, zirconium chloride(IV) (0.97 g, 4.17 mmol) slurry in 25 ml of toluene was introduced, and then, the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried to prepare a compound 6 (3.2 g, 69%).

$^1$H NMR (500 MHz, $CDCl_3$): rac/meso mix δ 8.39-8.28 (m, 6H), 8.26 (m, 2H), 8.19 (dd, 1H), 8.12 (dd, 1H), 8.05-8.03 (m, 4H), 7.79-7.66 (m, 7H), 7.73-7.62 (m, 3H), 7.52-7.45 (m, 6H), 7.46-7.41 (m, 6H), 7.27-7.23 (m, 2H), 7.18 (m, 2H), 6.4 (s, 2H), 6.33 (s, 1H), 6.30 (s, 1H), 4.19 (m, 4H), 4.14 (m, 4H), 3.39 (m, 4H), 3.31 (m, 4H), 1.80-1.76 (m, 12H), 1.73-1.71 (m, 8H), 1.51-1.27 (m, 12H), 1.15 (s, 9H), 1.10 (s, 9H), 0.12 (s, 3H), 0.09 (s, 6H), 0.04 (s, 3H)

Preparation Example 7: Preparation of Compound 7

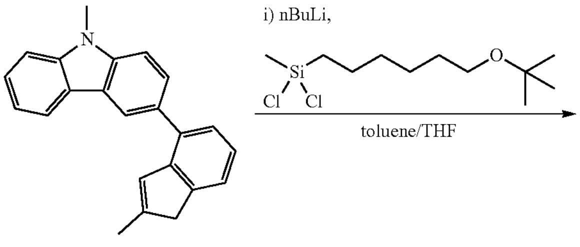

P1-1

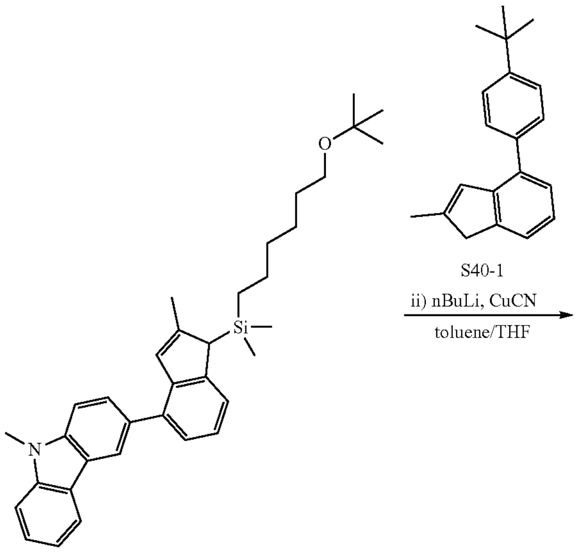

S40-1

P7-1

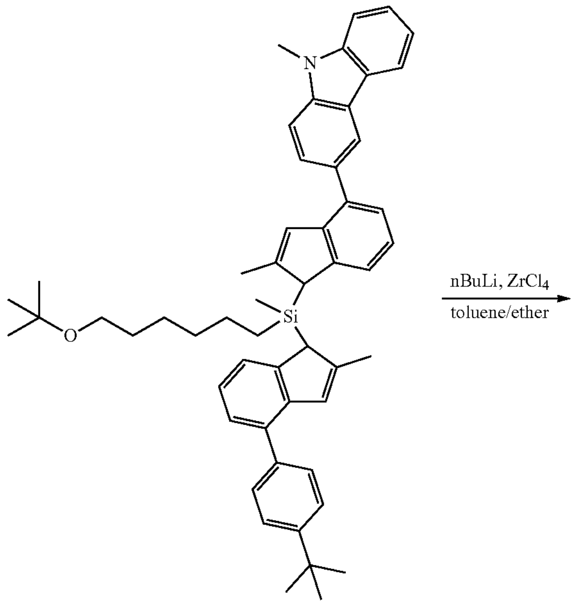

P7-2

-continued

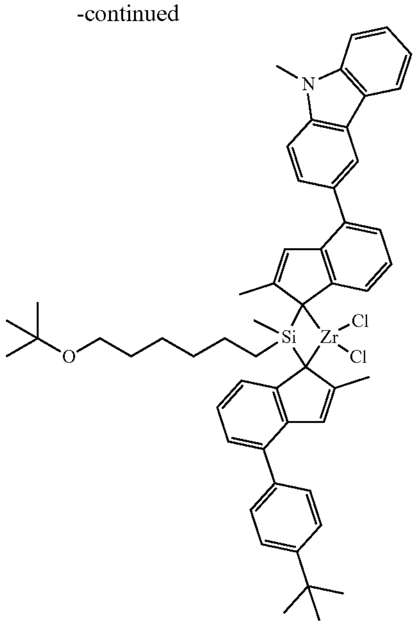

Compound 7

(Preparation of P7-2)

Under argon atmosphere, P1-1 (3 g, 9.7 mmol) was dissolved in 19 ml of toluene/tetrahydrofuran (10/1), and 4.1 ml of 2.5 M n-butyllithium was slowly added dropwise at −78° C., and then, the mixture was stirred at room temperature for 3 hours. And then, dichloro methyl(6-(tert-butoxy) hexyl) silane (2.80 ml, 10.18 mmol) was introduced at −10° C., and the mixture was stirred at room temperature overnight. In another reactor, S7-1 (2.54 g, 9.7 mmol) was introduced and dissolved in 15 ml of toluene/tetrahydrofuran (5/1), and 4.1 ml of 2.5 M n-butyllithium was slowly added dropwise at −78° C., and then, the mixture was stirred at room temperature for 3 hours. Copper cyanide (0.02 g, 0.19 mmol) was introduced therein at room temperature, and the mixture was stirred for 30 minutes, and then, the reactant of P7-1 was introduced. And then, the mixture was stirred at room temperature overnight, and worked-up with water and dried to prepare a compound P7-2 (6.3 g, 84%, MS: $[M+H]^+$= 770.5).

(Preparation of Compound 7)

Under argon atmosphere, P7-2 (3 g, 3.9 mmol) was dissolved in 7 ml of toluene/diethylether (2/1), and 1.6 ml of 2.5 M n-butyllithium was slowly added dropwise at −78° C., and then, the mixture was stirred at room temperature for 5 hours. And then, zirconium chloride(IV) (0.91 g, 3.9 mmol) slurry in 23 ml of toluene 23 ml was introduced, and the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried. The obtained solid was recrystallized using pentane and dichloromethane, and then, the produced solid was filtered to prepare a compound 7 (2.5 g, 69%).

$^1H$ NMR (500 MHz, $CDCl_3$): rac/meso mix δ 8.31 (dd, 2H), 8.27 (dd, 2H), 8.20 (m, 1H), 8.16 (m, 1H), 8.01 (d, 1H), 7.96 (d, 1H), 7.9 (s, 1H), 7.85 (s, 1H), 7.81 (d, 1H), 7.75 (d, 1H), 7.63 (m, 2H), 7.53-7.33 (m, 12H), 7.26-7.23 (m, 8H), 6.40 (s, 2H), 6.32 (s, 2H), 3.81 (s, 3H), 3.73 (s, 3H), 3.36 (t, 2H), 3.34 (t, 2H), 1.82 (s, 6H), 1.76 (s, 6H), 1.54-1.25 (m, 23H), 1.46-1.21 (m, 11H), 1.17 (s, 9H), 1.10 (s, 9H), 0.62 (m, 2H), 0.56 (m, 2H), 0.25 (s, 3H), 0.19 (s, 3H)

Preparation Example 8: Preparation of Compound 8

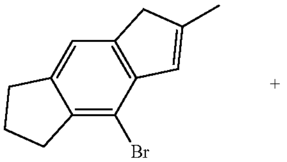

+

S8-1

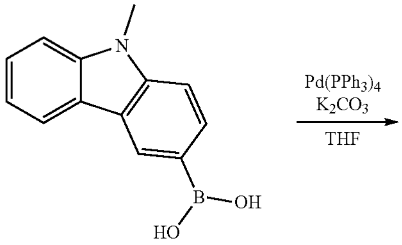

S1-2

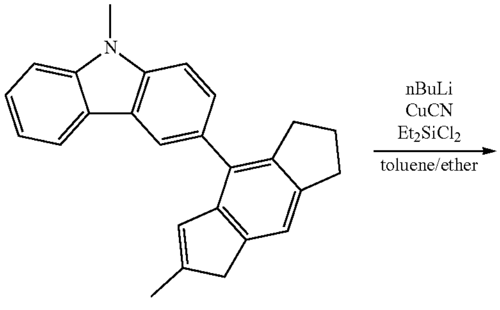

P8-1

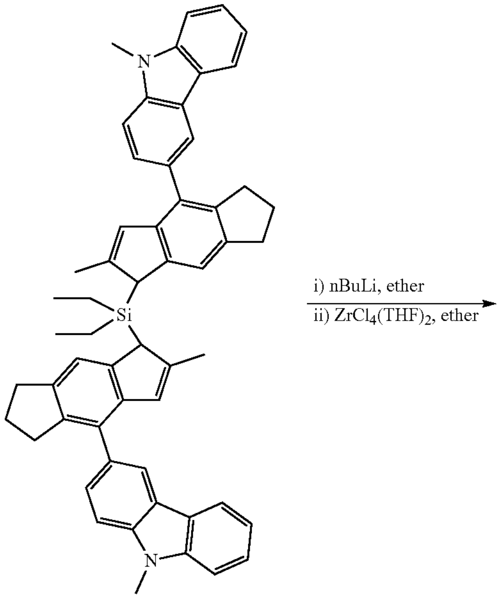

P8-2

-continued

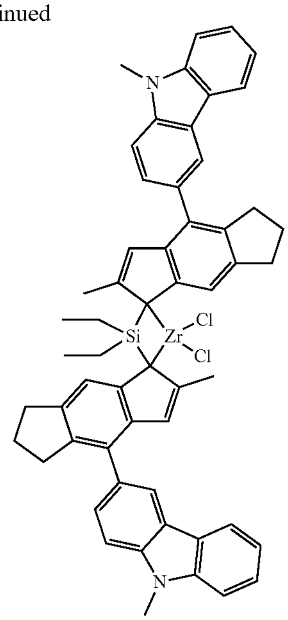

Compound 8

(Preparation of P8-1)

Under nitrogen atmosphere, S8-1 (7 g, 28.1 mmol) and S1-2 (6.3 g, 28.1 mmol) were introduced in 140 ml of tetrahydrofuran, and the mixture was stirred and refluxed. And then, potassium carbonate (11.6 g, 84.3 mmol) dissolved in 12 ml of water was introduced, and the mixture was sufficiently stirred, and then, tetrakistriphenyl-phosphinopalladium (1 g, 0.8 mmol) was introduced. After reaction for 1 hour, the temperature was decreased to room temperature, and an organic layer and an aqueous layer were separated, and then, the organic layer was distilled. It was introduced in chloroform (12 times, 118 mL) and dissolved again, and washed with water twice, and then, an organic layer was separated and magnesium sulfate anhydrous was introduced, and it was stirred and filtered, and the filtrate was decompression distilled. The concentrated compound was recrystallized with chloroform and ethyl acetate to prepare a light yellow solid compound P8-1 (6.8 g, 69%, MS: $[M+1-1]^+=350.5$).

(Preparation of P8-2)

Under argon atmosphere, P8-1 (6.5 g, 18.6 mmol) was dissolved in 37 ml of toluene/diethylether (10/1), and 7.8 ml of 2.5 M n-butyllithium was slowly added dropwise at −78° C., and then, the mixture was stirred at room temperature for 3 hours. Copper cyanide (0.03 g, 0.37 mmol) was introduced therein at room temperature and the mixture was stirred for 2 hours, and then, diethyldichlorosilane (1.46 g, 9.3 mmol) was introduced. And then, the mixture was stirred at room temperature overnight and washed with water twice, and then, an organic layer was separated and magnesium sulfate anhydrous was introduced, it was stirred and filtered, and the filtrate was decompression distilled. The concentrated compound was purified through silica column using hexane and ethyl acetate to prepare a compound P8-2 (10.9 g, 75%, MS: $[M+H]^+=783.4$).

(Preparation of Compound 8)

Under argon atmosphere, P8-2 (5 g, 6.38 mmol) was dissolved in 12 ml of diethylether, and 2.7 ml of 2.5 M n-butyllithium was slowly added dropwise at −78° C., and then, the mixture was stirred at room temperature for 5 hours. And then, zirconium chloride(IV) (1.49 g, 6.38 mmol) slurry in 38 ml of diethylether was introduced, and the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried. The obtained solid was introduced in pentane, and the mixture was stirred for 12 hours, and then, remaining solid was filtered to prepare a compound 8 (4.9 g, 81%).

$^1H$ NMR (500 MHz, $CDCl_3$): rac/meso mix δ 8.37 (m, 1H), 8.32 (m, 1H), 8.16 (m, 2H), 8.04 (m, 2H), 8.00 (m, 2H), 7.74-7.63 (m, 10H), 7.49-7.34 (m, 8H), 7.27 (m, 2H), 7.19 (m, 2H), 6.38 (s, 1H), 6.35 (s, 2H), 6.33 (s, 1H), 3.81 (s, 6H), 3.75 (s, 6H), 2.87-2.84 (m, 6H), 2.82-2.76 (m, 10H), 1.96 (m, 4H), 1.93 (m, 4H), 1.83 (s, 6H), 1.75 (s, 6H), 0.97 (t, 6H), 0.93 (t, 6H), 0.67 (q, 4H), 0.65 (q, 4H)

Preparation Example 9: Preparation of Compound 9

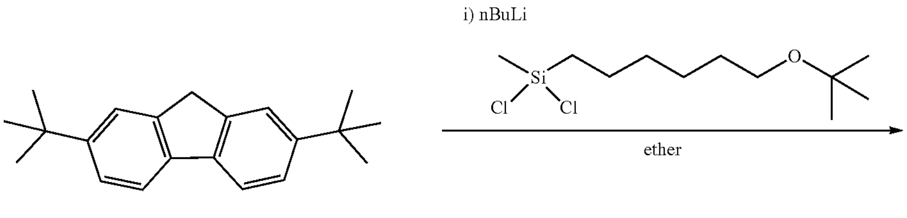

S9-1

-continued
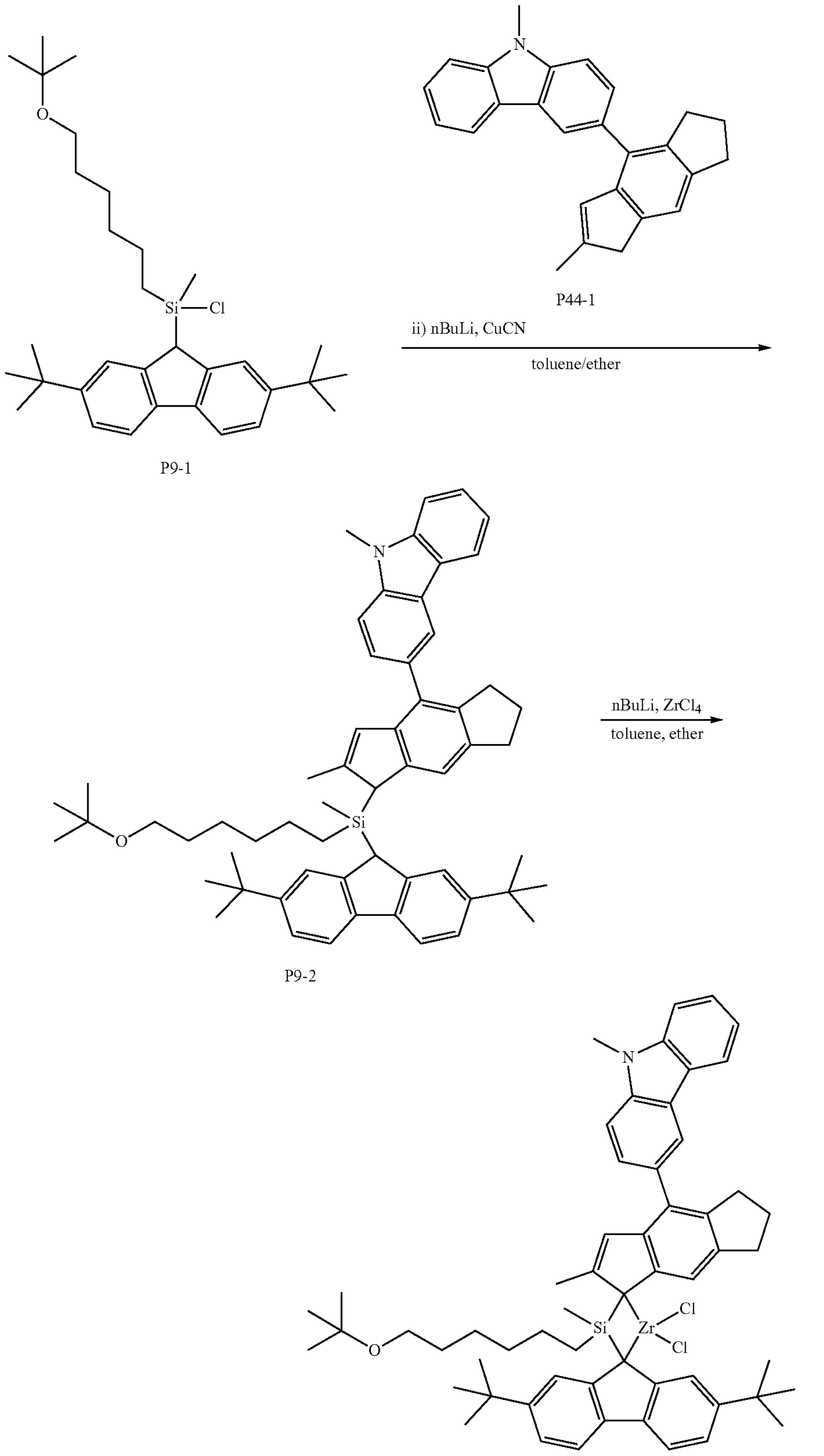
Compound 9

(Preparation of P9-2)

Under argon atmosphere, S9-1 (5 g, 17.96 mmol) was dissolved in 36 ml of diethylether, and 7.5 ml of 2.5 M n-butyllithium was slowly added dropwise at 78° C., and then, the mixture was stirred at room temperature for 3 hours. And then, dichloro methyl(6-(tert-butoxy)hexyl) silane (5.19 ml, 18.86 mmol) was introduced at −10° C., and the mixture was stirred at room temperature overnight. In another reactor, P9-1 (6.28 g, 17.96 mmol) was introduced and dissolved in 31 ml of toluene/diethylether (5/1), and 7.5 ml of 2.5 M n-butyllithium was slowly added dropwise at 78° C., and then, the mixture was stirred at room temperature for 3 hours. Copper cyanide (0.03 g, 0.36 mmol) was introduced therein at room temperature, and the mixture was stirred for 30 minutes, and then, the reactant of S9-1 was introduced. And then, the mixture was stirred at room temperature overnight, and worked-up with water and dried to prepare a compound P9-2 (11.5 g, 78%, MS: $[M+H]^+$ =826.5).

(Preparation of Compound 9)

Under argon atmosphere, P9-2 (5 g, 6.05 mmol) was dissolved in 11 ml of toluene/diethylether (2/1), and 2.5 ml of 2.5 M n-butyllithium was slowly added dropwise at 78° C., and then, the mixture was stirred at room temperature for 5 hours. And then, zirconium chloride(IV) (1.41 g, 6.05 mmol) slurry in 36 ml of toluene was introduced, and the mixture was stirred at room temperature overnight. After confirming the completion of reaction by NMR, solvents were vacuum dried, tetrahydrofuran was introduced again, and LiCl was removed by filtration with glass frit under nitrogen condition, and then, the filtrate was vacuum dried. The obtained solid was recrystallized using hexane and dichloromethane, and then, the produced solid was filtered to prepare a compound 9 (2.8 g, 47%).

$^1H$ NMR (500 MHz, $CDCl_3$): δ 8.16 (m, 1H), 7.95 (d, 1H), 7.86 (s, 1H), 7.81-7.76 (m, 3H), 7.55 (s, 2H), 7.41 (m, 3H), 7.32 (m, 1H), 6.34 (s, 1H), 3.75 (s, 3H), 3.31 (t, 2H), 2.82-2.77 (m, 4H), 1.93 (m, 2H), 1.77 (s, 3H), 1.46-1.27 (m, 26H), 1.11 (s, 9H), 0.57 (m, 2H), 0.18 (s, 3H)

Preparation Example 10: Preparation of Compound 10

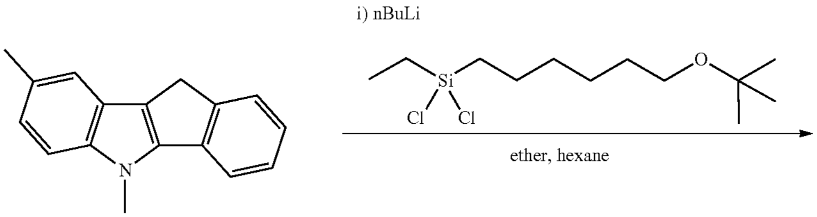

S10-1

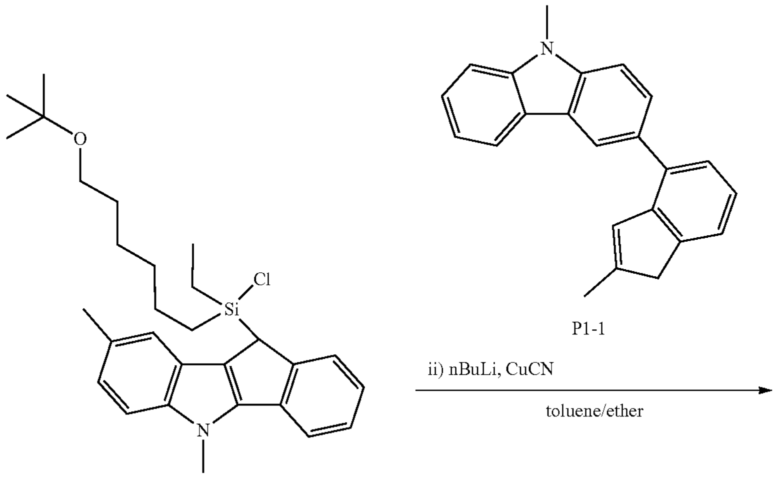

P1-1

P10-1

-continued

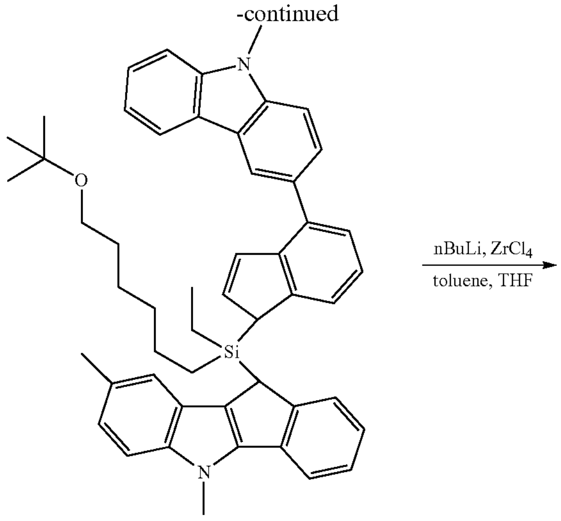

P10-2

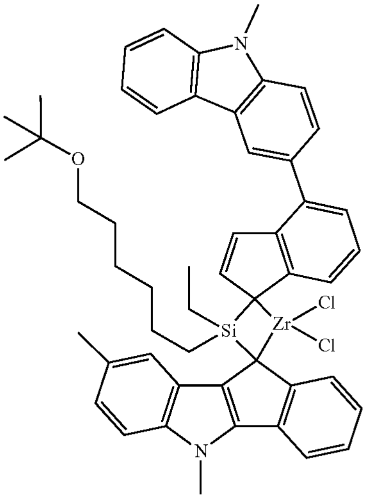

Compound 10

(Preparation of P10-2)

Under argon atmosphere, S10-1 (5 g, 21.43 mmol) was dissolved in 43 ml of diethylether, and 9 ml of 2.5 M n-butyllithium was slowly added dropwise at 78° C., and then, the mixture was stirred at room temperature for 3 hours. And then, dichloro ethyl(6-(tert-butoxy)hexyl) silane (6.42 g, 22.5 mmol) was dissolved in 14 ml of hexane and introduced at −10° C., and then, the mixture was stirred at room temperature overnight. In another reactor, P1-1 (6.63 g, 21.43 mmol) was introduced and dissolved in 31 ml of toluene/diethylether (10/1), and 9 ml of 2.5 M n-butyllithium was slowly added dropwise at 78° C., and then, the mixture was stirred at room temperature for 3 hours. Copper cyanide (0.04 g, 0.43 mmol) was introduced at room temperature and the mixture was stirred for 30 minutes, and then, the reactant of P10-1 was introduced. And then, the mixture was stirred at room temperature overnight and worked-up with water and dried to prepare a compound P10-2 (10.9 g, 69%, MS: $[M+H]^+$=741.4).

(Preparation of Compound 10)

Under argon atmosphere, P10-2 (5 g, 6.75 mmol) was dissolved in 13 ml of toluene/tetrahydrofuran (2/1), and 2.8 ml of 2.5 M n-butyllithium was slowly added dropwise at 78° C., and then, the mixture was stirred at room temperature for 5 hours. And then, zirconium chloride(IV) (1.57 g, 6.75 mmol) slurry in 40 ml of toluene was introduced, and the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried to prepare a compound 10 (3.6 g, 59%).

$^1$H NMR (500 MHz, $CDCl_3$): δ 8.39 (s, 1H), 8.25 (dd, 1H), 8.15 (dd, 1H), 7.96 (d, 1H), 7.88 (s, 1H), 7.75 (d, 1H), 7.63-7.59 (m, 3H), 7.47-7.23 (m, 8H), 6.57 (d, 1H), 6.38 (d, 1H), 3.79 (s, 3H), 3.73 (s, 3H), 3.34 (t, 2H), 2.41 (s, 3H), 1.49-1.22 (m, 8H), 1.11 (s, 9H), 0.93 (t, 3H), 0.65 (q, 2H)

Preparation Example 11: Preparation of Compound 11

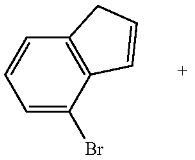

S11-2

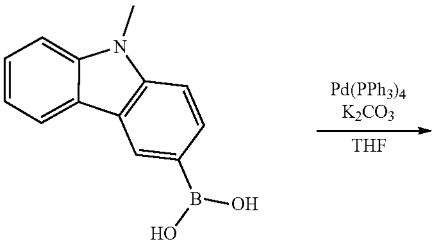

S1-2

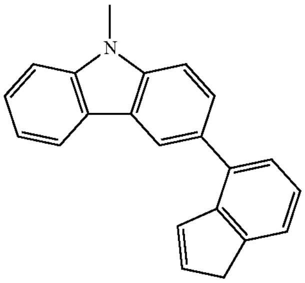

P11-1

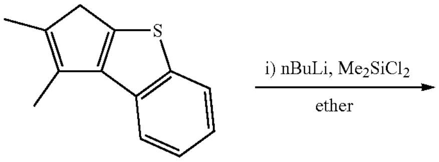

S11-1

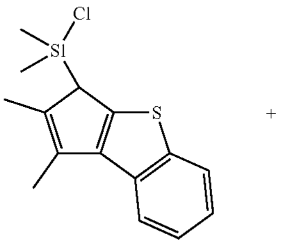

P11-2

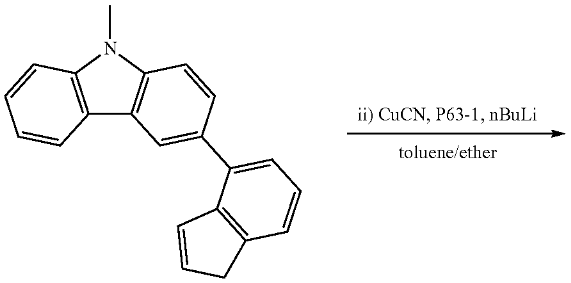

P11-1

-continued

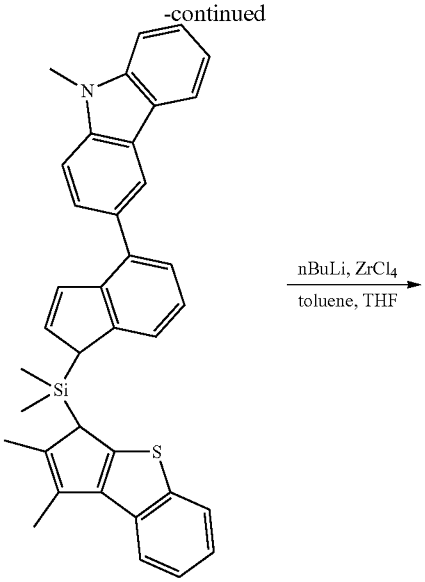

P11-3

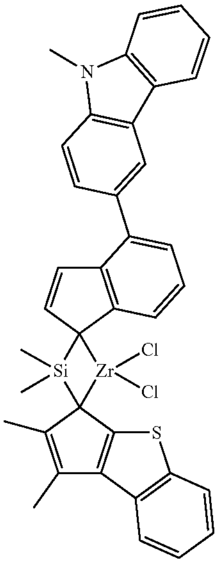

Compound 11

(Preparation of P11-1)

Under nitrogen atmosphere, S11-2 (20 g, 102.5 mmol) and S1-2 (23.1 g, 102.5 mmol) were introduced in 400 ml of tetrahydrofuran, and the mixture was stirred and refluxed. And then, potassium carbonate (42.5 g, 307.6 mmol) dissolved in 43 ml of water was introduced, and the mixture was sufficiently stirred, and then, tetrakistriphenyl-phosphinopalladium (3.6 g, 3.1 mmol) was introduced. After reaction for 3 hours, the temperature was decreased to room temperature, and an organic layer and an aqueous layer were separated, and then, the organic layer was distilled. It was introduced in chloroform (10 times, 303 mL) and dissolved again, and washed with water twice, and then, an organic layer was separated and magnesium sulfate anhydrous was introduced, it was stirred and filtered, and the filtrate was decompression distilled. The concentrate compound was purified through silica column using chloroform and ethyl acetate to prepare a yellow solid compound P11-1 (15.7 g, 52%, MS: $[M+H]^+=296.4$).

(Preparation of P11-3)

Under argon atmosphere, S11-1 (5 g, 24.96 mmol) was dissolved in 50 ml of diethylether, and 10.5 ml of 2.5 M n-butyllithium was slowly added dropwise at −78° C., and then, the mixture was stirred at room temperature for 3 hours. And then, dimethyldichlorosilane (3.19 ml, 26.21 mmol) was introduced at −10° C., and the mixture was stirred at room temperature overnight. In another reactor, P11-1 (7.37 g, 24.96 mmol) was put and dissolved in 37 ml of toluene/diethylether (5/1) 37 ml, and 10.5 ml of 2.5 M n-butyllithium was slowly added dropwise at −78° C., and then, the mixture was stirred at room temperature for 3 hours. Copper cyanide (0.04 g, 0.5 mmol) was introduced therein at room temperature and the mixture was stirred for 30 minutes, and then, the reactant of S11-1 was introduced. And then, the mixture was stirred at room temperature overnight, and worked-up with water and dried to prepare a, compound P11-3 (10.7 g, 78%, MS: $[M+H]^+$=552.2).

(Preparation of Compound 11)

Under argon atmosphere, P11-3 (5 g, 9.06 mmol) was dissolved in 17 ml of toluene/tetrahydrofuran (2/1), and 3.8 ml of 2.5 M n-butyllithium was slowly added dropwise at −78° C., and then, the mixture was stirred at room temperature for 5 hours. And then, zirconium chloride(IV) (2.11 g, 9.06 mmol) slurry in 53 ml of toluene was introduced, and the mixture was stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried. The obtained solid was recrystallized using hexane and dichloromethane, and then, the produced solid was filtered to prepare a compound 11 (4.1 g, 64%).

$^1$H NMR (500 MHz, $CDCl_3$): rac/meso mix δ 8.3 (dd, 1H), 8.26 (dd, 1H), 8.2 (dd, 1H), 8.15 (dd, 1H), 8.08-7.87 (m, 8H), 7.78 (d, 1H), 7.73 (d, 1H), 7.6 (m, 1H), 7.58 (m, 1H), 7.51-7.32 (m, 12H), 6.59 (d, 1H), 6.56 (m, 1H), 6.41 (m, 2H), 3.81 (s, 3H), 3.76 (s, 3H), 2.13 (m, 6H), 1.8 (s, 3H), 1.76 (s, 3H), 0.24 (s, 3H), 0.22 (s, 3H), 0.16 (s, 6H)

Preparation Example 12: Preparation of Compound 12

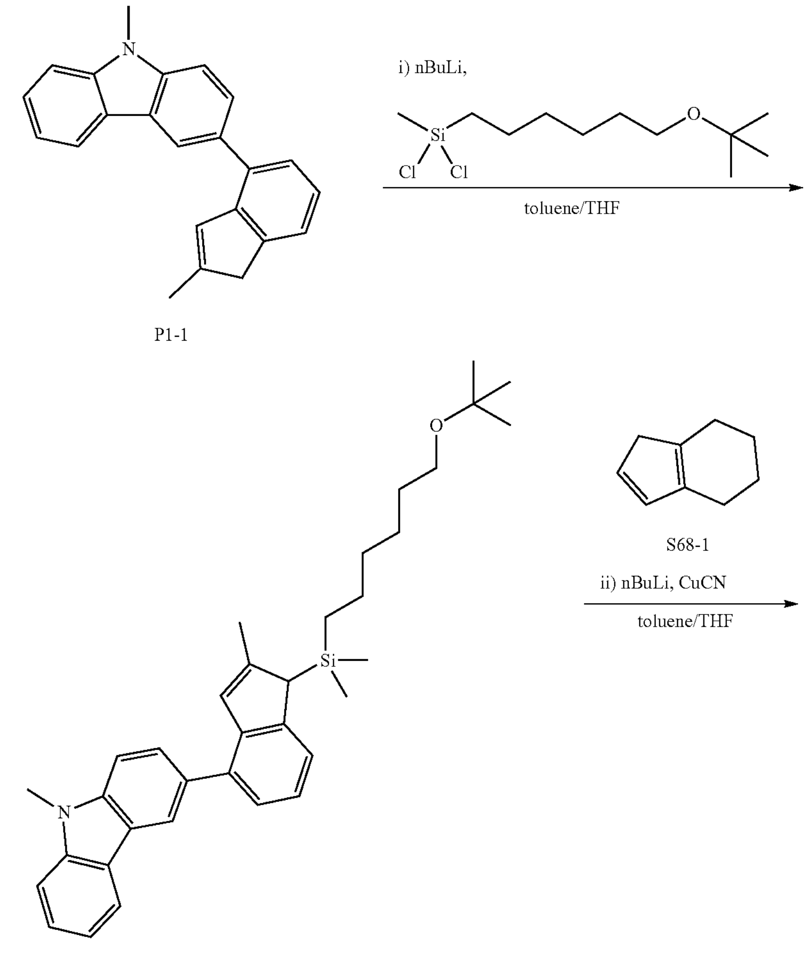

P1-1

S68-1

P7-1

-continued

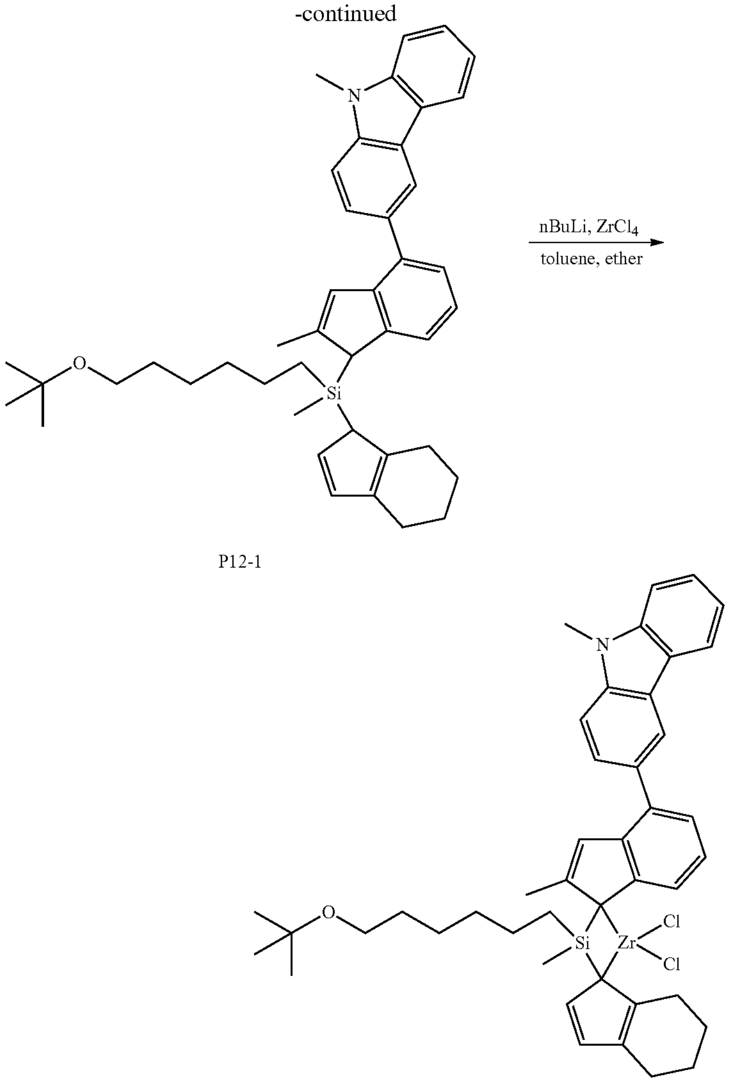

P12-1

Compound 12

(Preparation of P12-1)

Under argon atmosphere, P1-1 (5 g, 16.16 mmol) was dissolved in 32 ml of toluene/tetrahydrofuran (10/1), and 6.8 ml of 2.5 M n-butyllithium was slowly added dropwise at −78° C., and then, the mixture was stirred at room temperature for 3 hours. And then, dichloro methyl(6-(tert-butoxy) hexyl) silane (4.67 ml, 16.97 mmol) was introduced at −10° C., and the mixture was stirred at room temperature overnight. In another reactor, S12-1 (1.94 g, 16.16 mmol) was put and dissolved in 24 ml of toluene/tetrahydrofuran (10/1), and then, 6.8 ml of 2.5 M n-butyllithium was slowly added dropwise at −78° C., and then, the mixture was stirred at room temperature for 3 hours. Copper cyanide (0.03 g, 0.32 mmol) was introduced therein at room temperature and the mixture was stirred for 30 minutes, and then, the reactant of P1-1 was introduced. And then, the mixture was stirred at room temperature overnight and worked-up with water and dried to prepare a compound P12-1 (6.8 g, 67%, MS: $[M+H]^+=628.4$).

(Preparation of Compound 12)

Under argon atmosphere, P12-1 (5 g, 7.96 mmol) was dissolved in 16 ml of toluene/tetrahydrofuran (3/1), and 3.3 ml of 2.5 M n-butyllithium was slowly added dropwise at −78° C., and then, the mixture was stirred at room temperature for 5 hours. And then, zirconium chloride(IV) (1.85 g, 7.96 mmol) slurry in 47 ml of toluene was introduced, and the mixture was stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried. The obtained solid was recrystallized using hexane and dichloromethane, and then, the produced solid was filtered to prepare a compound 12 (4.3 g, 69%).

$^1H$ NMR (500 MHz, $CDCl_3$): rac/meso mix δ 8.33 (dd, 1H), 8.28 (dd, 1H), 8.21 (dd, 1H), 8.15 (dd, 1H), 8.02 (d, 1H), 7.96 (d, 1H), 7.93 (s, 1H), 7.87 (s, 1H), 7.79 (d, 1H), 7.76 (d, 1H), 7.6 (m, 2H), 7.51-7.4 (m, 6H), 7.36 (m, 1H), 7.29 (m, 1H), 6.53 (m, 2H), 6.41-6.32 (m, 4H), 3.81 (s, 3H), 3.74 (m, 3H), 3.36 (t, 2H), 3.34 (t, 2H), 1.98-1.93 (m, 8H), 1.83-1.61 (m, 14H), 1.48-1.26 (m, 16H), 1.16 (s, 9H), 1.12 (s, 9H), 0.62 (t, 2H), 0.59 (t, 2H), 0.24 (s, 3H), 0.18 (s, 3H)

Preparation Example 13: Preparation of Compound 13

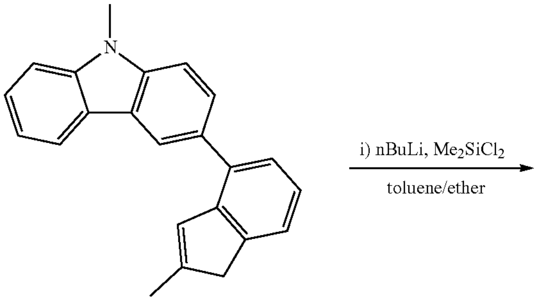

P1-1

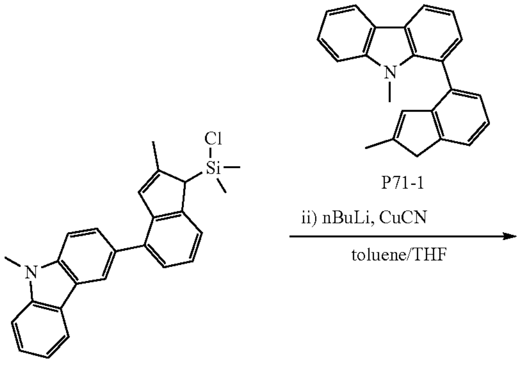

P71-1

P13-2

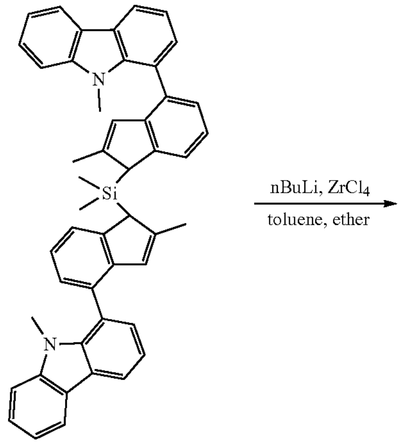

P13-3

-continued

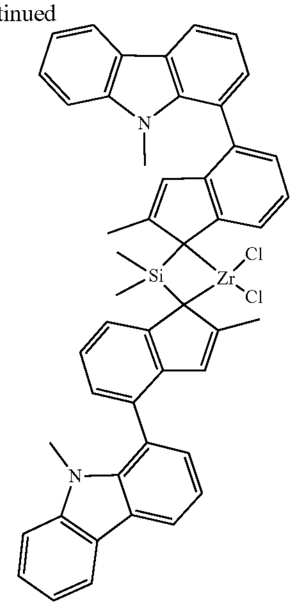

Compound 13

(Preparation of P13-1)

P13-1 was prepared by the same method as (Preparation of P1-1), except that (9-methyl-9H-carbazol-1-yl)boronic acid was used instead of S1-2.

(Preparation of P13-3)

Under argon atmosphere, P1-1 (5 g, 16.16 mmol) was dissolved in 32 ml of toluene/diethylether (10/1), and 6.8 ml of 2.5 M n-butyllithium was slowly added dropwise at −78° C., and then, the mixture was stirred at room temperature for 3 hours. And then, dimethyldichlorosilane (2.07 ml, 16.97 mmol) was introduced at −10° C., and the mixture was stirred at room temperature overnight. In another reactor, P13-1 (5 g, 16.16 mmol) was put and dissolved in 24 ml of toluene/diethylether (5/1), and 6.8 ml of 2.5 M n-butyllithium was slowly added dropwise at −78° C., and then, the mixture was stirred at room temperature for 3 hours. Copper cyanide (0.03 g, 0.32 mmol) was introduced therein at room temperature, and the mixture was stirred for 30 minutes, and then, the reactant of P13-2 was introduced. And then, the mixture was stirred at room temperature overnight and worked-up with water and dried to prepare a compound P13-3 (10.7 g, 98%, MS: $[M+H]^+=675.3$).

(Preparation of Compound 13)

Under argon atmosphere, P13-3 (5 g, 7.41 mmol) was dissolved in 15 ml of toluene/tetrahydrofuran (2/1), 3.1 ml of 2.5 M n-butyllithium was slowly added dropwise at −78° C., and then, the mixture was stirred at room temperature for 5 hours. And then, zirconium chloride(IV) (1.73 g, 7.41 mmol) slurry in 44 ml of toluene was introduced, and the mixture was stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried. The obtained solid was recrystallized using hexane and dichloromethane, and then, the produced solid was filtered to prepare a compound 13 (4.3 g, 70%).

$^1H$ NMR (500 MHz, $CDCl_3$): rac/meso mix δ 8.47 (m, 2H), 8.45 (m, 2H), 8.40-8.30 (m, 6H), 8.17-8.10 (m, 6H), 7.72-7.67 (m, 4H), 7.59-7.41 (m, 16H), 7.26-7.23 (m, 4H), 6.37 (s, 2H), 6.34 (s, 1H), 6.32 (s, 1H), 3.84 (s, 6H), 3.78 (s, 6H), 1.82 (s, 3H), 1.77 (s, 6H), 1.75 (s, 3H), 0.17 (s, 3H), 0.15 (s, 6H), 0.13 (s, 3H)

Preparation Example 14: Preparation of Compound 14

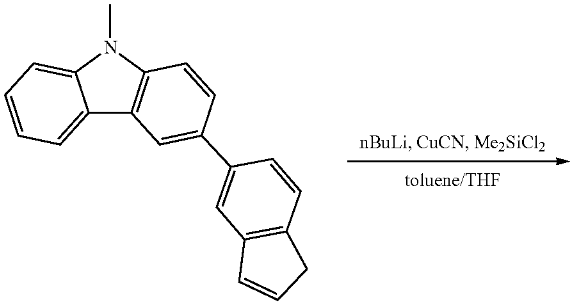

P14-1

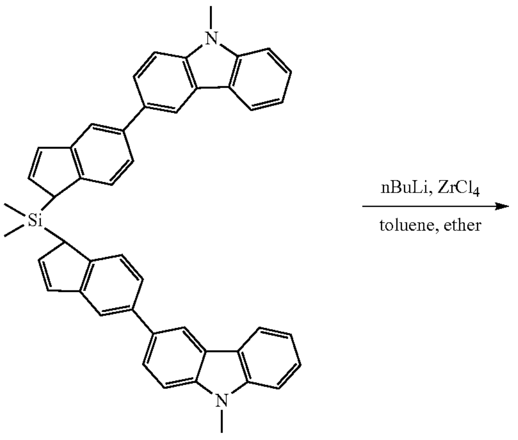

P14-2

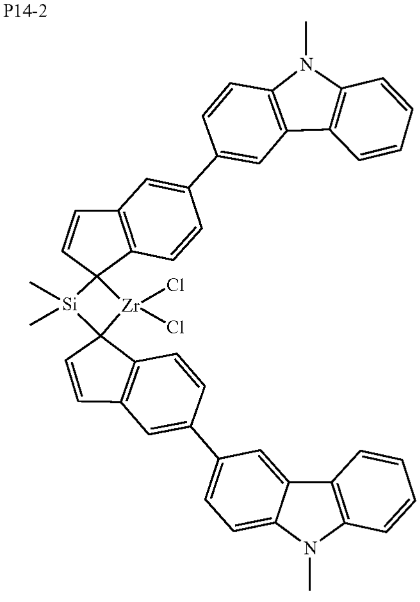

Compound 14

(Preparation of P14-1)

P14-1 was prepared by the same method as (Preparation of P1-1), except that 5-bromo-1H-indene was used instead of S1-1.

(Preparation of P14-2)

Under argon atmosphere, P14-1 (5 g, 16.93 mmol) was dissolved in 56 ml of toluene/tetrahydrofuran (10/1), and 7.1 ml of 2.5 M n-butyllithium was slowly added dropwise at −78° C., and then, the mixture was stirred at room temperature for 3 hours. Copper cyanide (0.03 g, 0.34 mmol) was introduced therein at room temperature and the mixture was stirred for 2 hours, and then, dimethyldichlorosilane (1.09 g, 8.46 mmol) was introduced. And then, the mixture was stirred at room temperature overnight and worked-up with water and dried to prepare a compound P14-2 (6.2 g, 57%, MS: [M+H]$^{30}$=647.3).

(Preparation of Compound 14)

Under argon atmosphere, P14-2 (4.5 g, 6.96 mmol) was dissolved in 14 ml of toluene/tetrahydrofuran (2/1), and 2.9 ml of 2.5 M n-butyllithium was slowly added dropwise at −78° C., and then, the mixture was stirred at room temperature for 5 hours. And then, zirconium chloride(IV) (1.62 g, 6.96 mmol) slurry in 41 ml of toluene was introduced, and the mixture was stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried. The obtained solid was recrystallized using hexane and dichloromethane, and then, the produced solid was filtered to prepare a compound 14 (3.8 g, 68%).

$^1$H NMR (500 MHz, $CDCl_3$): rac/meso mix δ 8.36-8.31 (m, 4H), 8.16 (m, 1H), 8.13 (m, 1H), 8.05-7.95 (m, 8H), 7.72-7.56 (m, 14H), 7.45-7.36 (m, 4H), 7.25-7.19 (m, 8H), 6.83 (d, 2H), 6.76 (d, 2H), 6.42 (d, 2H), 6.38 (d, 2H), 3.79 (s, 6H), 3.73 (s, 6H), 0.22 (s, 3H), 0.19 (s, 6H), 0.17 (s, 3H)

Preparation Example 15: Preparation of Compound 15

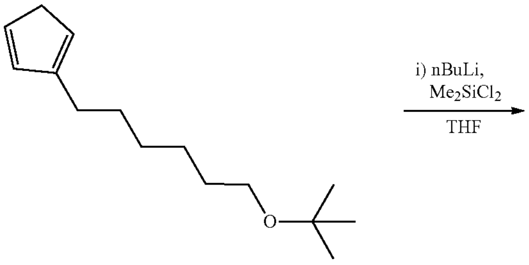

S15-1

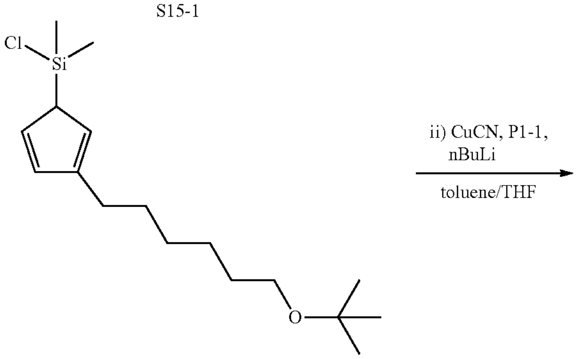

P15-1

-continued

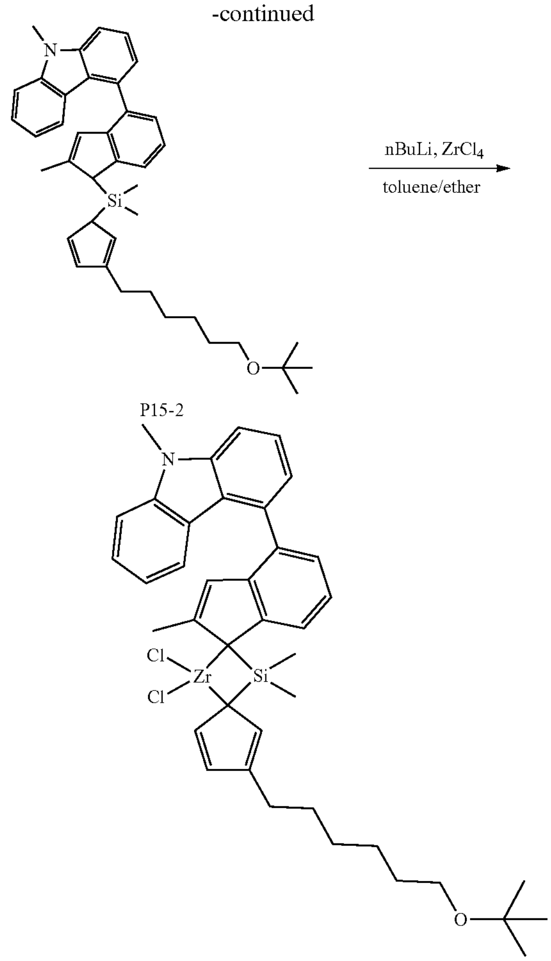

P15-2

Compound 15

(Preparation of P15-2)

Under argon atmosphere, S15-1 (5 g, 22.49 mmol) was dissolved in 45 ml of toluene/diethylether (10/1), and 9.4 ml of 2.5 M n-butyllithium was slowly added dropwise at −78° C., and then, the mixture was stirred at room temperature for 3 hours. And then, dimethyldichlorosilane (2.87 ml, 23.61 mmol) was introduced at −10° C., and the mixture was stirred at room temperature overnight. In another reactor, P1-1 (6.96 g, 22.49 mmol) was put and dissolved in 34 ml of toluene/diethylether (5/1), and 9.4 ml of 2.5 M n-butyllithium was slowly added dropwise at −78° C., and then, the mixture was stirred at room temperature for 3 hours. Copper cyanide (0.04 g, 0.45 mmol) was introduced at room temperature and the mixture was stirred for 30 minutes, and then, the reactant of P15-1 was introduced. And then, the mixture was stirred at room temperature overnight and worked-up with water and dried to prepare a compound P15-2 (10.7 g, 81%, MS: $[M+1-1]^+=588.4$).

(Preparation of Compound 15)

Under argon atmosphere, P15-2 (6 g, 9.27 mmol) was dissolved in 19 ml of tetrahydrofuran, and 3.9 ml of 2.5 M n-butyllithium was slowly added dropwise at −78° C., and then, the mixture was stirred at room temperature for 5 hours. And then, zirconium chloride(IV) (2.16 g, 9.27 mmol) slurry in 55 ml of toluene was introduced, and the mixture was stirred at room temperature overnight. After confirming the completion of reaction by NMR, solvents were vacuum dried, dichloromethane was introduced again, and LiCl was removed by filtration through glass frit under nitrogen condition, and then, the filtrate was vacuum dried to prepare a compound 15 (5.2 g, 75%).

$^1H$ NMR (500 MHz, $CDCl_3$): δ 8.36 (dd, 1H), 8.27 (dd, 1H), 8.15 (m, 1H), 7.75 (m, 1H), 7.66 (dd, 1H), 7.57 (dd, 1H), 7.47-7.4 (m, 3H), 7.17 (m, 1H), 6.49 (m, 1H), 6.39-6.32 (m, 2H), 6.15 (s, 1H), 3.86 (s, 3H), 3.33 (t, 2H), 1.92 (t, 2H), 1.75 (s, 3H), 1.48-1.25 (m, 8H), 1.11 (s, 9H), 0.21 (s, 6H)

Preparation Example 16: Preparation of Compound 16

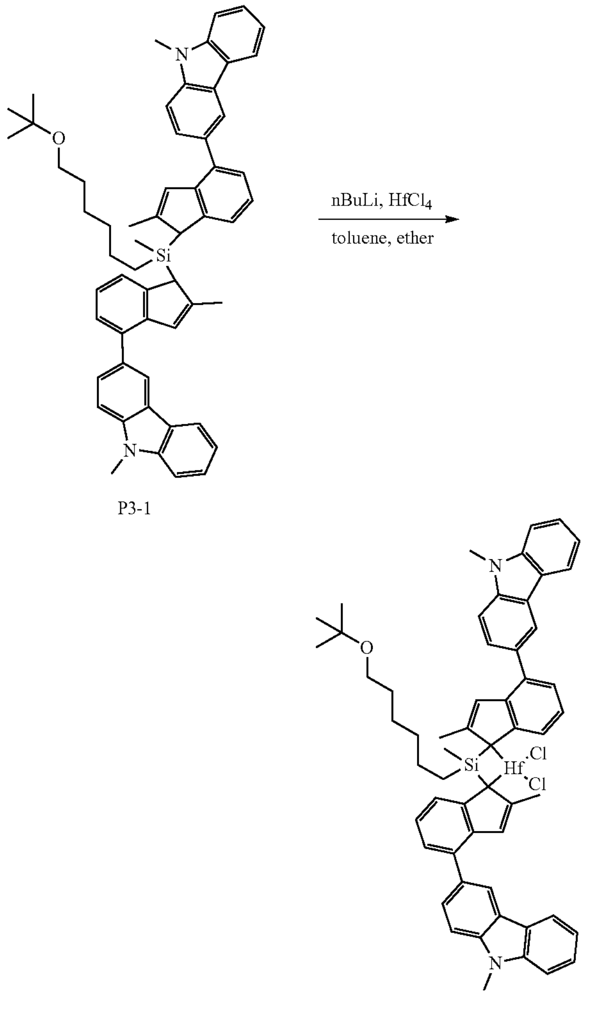

P3-1

Compound 16

(Preparation of Compound 16)

Under argon atmosphere, P3-1 (3 g, 3.67 mmol) was dissolved in 7 ml of toluene/tetrahydrofuran (2/1), and 1.5 ml of 2.5 M n-butyllithium was slowly added dropwise at −78° C., and then, the mixture was stirred at room temperature for 5 hours. And then, hafnium chloride(IV) (1.18 g, 3.67 mmol) slurry in 22 ml of toluene was introduced, and the mixture was stirred at room temperature overnight. After confirming the completion of reaction by NMR, solvents were vacuum dried dichloromethane was introduced again, and LiCl was removed by filtration through glass frit under nitrogen condition, and then, the filtrate was vacuum dried to prepare a compound 16 (3.1 g, 80%).

$^1$H NMR (500 MHz, $CDCl_3$): rac/meso mix δ 8.38-8.26 (m, 8H), 8.17 (dd, 1H), 8.14 (dd, 1H), 8.05-8.02 (m, 4H), 7.69-7.64 (m, 10H), 7.48-7.36 (m, 12H), 7.26-7.21 (m, 4H), 6.39 (s, 2H), 6.32 (s, 2H), 3.74 (d, 12H), 3.37 (t, 2H), 3.33 (t, 2H), 1.81 (s, 6H), 1.75 (s, 6H), 1.52-1.43 (m, 8H), 1.31-1.24 (m, 8H), 1.17 (s, 9H), 1.14 (s, 9H), 0.6 (t, 2H), 0.57 (t, 2H), 0.2 (d, 6H)
Preparation Example 17: Preparation of Compound 17
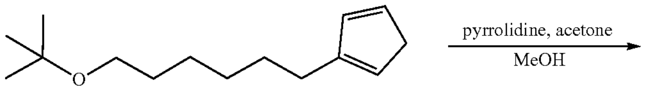
S15-1
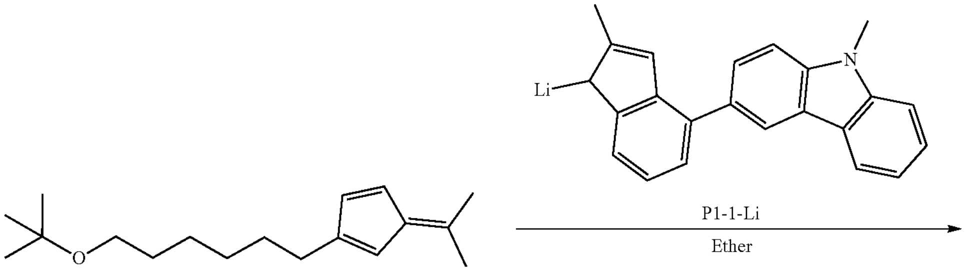
P17-1
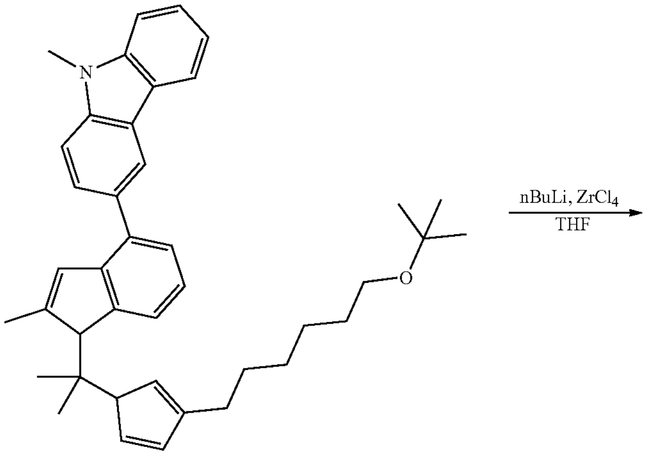
P17-2

-continued

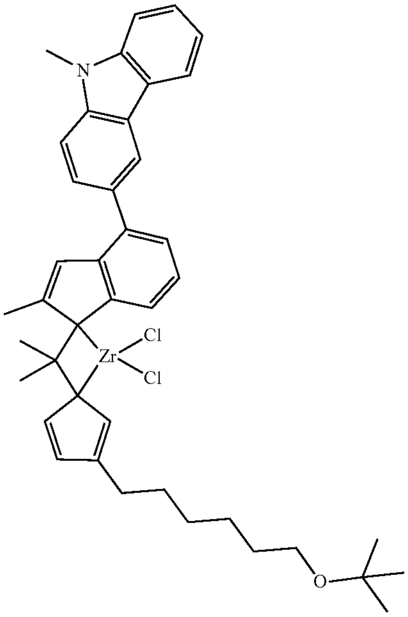

Compound 17

(Preparation of P17-1)

In a dried schlenk flask, S15-1 (5 g, 22.49 mmol) was put, and 45 ml of methyl alcohol and acetone (4.2 ml, 56.21 mmol) were put, and then, the mixture was cooled to 0° C. Pyrrolidine (2.8 ml, 33.73 mmol) was slowly added dropwise, and then, the temperature was slowly raised to room temperature, and the mixture was stirred for 7 hours. After confirming the completion of reaction, a small amount of water was introduced to quench, the mixture was extracted with ethyl acetate and water, and organic layers were combined and dried with magnesium sulfate anhydrous, and then, vacuum dried to prepare a compound P17-1 (5.7 g, 97%, MS: $[M+H]^+$=263.2).

(Preparation of P17-2)

In a dried schlenk flask, P1-1 (1.77 g, 5.72 mmol) was put, and the flask was filled with argon, and then, 11 ml of ethyl acetate was introduced to dissolve, and then, the mixture was cooled to −78° C. 2 ml of 2.5 M n-butyllithium 2 ml was slowly added dropwise, and the temperature was raised to room temperature, and then, the mixture was stirred for 4 hours. P89-1 (3 g, 11.43 mmol) was dissolved in 16 ml of ethyl acetate, and the mixture was cooled to −78° C., and then, the lithiated P1-1 was slowly added dropwise and the mixture was stirred at room temperature overnight. After confirming the completion of reaction, a small amount of water was introduced to quench, the mixture was extracted twice with ethyl acetate and water, and organic layers were combined and dried with magnesium sulfate anhydrous and then decompression dried. The concentrated compound was purified through silica column using hexane and ethyl acetate to prepare a compound P17-2 (6.5 g, 70%, MS: $[M+H]^+$=572.4).

(Preparation of Compound 17)

In a dried schlenk flask, P17-2 (6 g, 10.49 mmol) was put, the flask was filled with argon, and then, 107 ml of toluene/tetrahydrofuran 10/1) was introduced to dissolve, and then, the mixture was cooled to −78° C. 8.8 ml of 2.5 M n-butyllithium 2 ml was slowly added dropwise, and the temperature was raised to room temperature, and then, the mixture was stirred for 12 hours. And then, zirconium chloride(IV) (2.49 g, 10.7 mmol) slurry in 15 ml of toluene was introduced, and the mixture was stirred at room temperature overnight. After confirming the completion of reaction by NMR, solvents were vacuum dried, hexane was introduced again, and LiCl was removed by filtration through glass frit under nitrogen condition, and then, the filtrate was vacuum dried. Hexane was introduced in the obtained solid and stirred, and then, remaining solid was filtered to prepare a compound 17 (5 g, 65%).

$^1$H NMR (500 MHz, $CDCl_3$): δ8.32 (dd, 1H), 8.20 (m, 1H), 8.01 (d, 1H), 7.9 (s, 1H), 7.81 (d, 1H), 7.61 (dd, 1H), 7.50-7.37 (m, 4H), 6.51 (d, 1H), 6.43-6.37 (m, 3H), 6.22 (s, 1H), 3.8 (s, 3H), 3.39 (t, 2H), 1.82 (s, 3H), 1.52-1.30 (m, 8H), 1.15 (s, 9H), 0.95 (s, 6H)

Preparation Example 18: Preparation of Compound 18

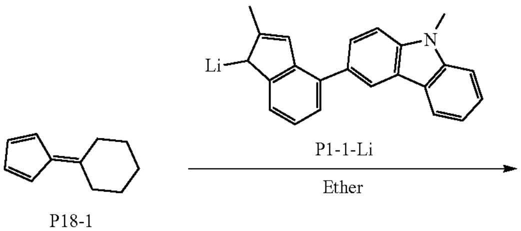

P18-1

-continued

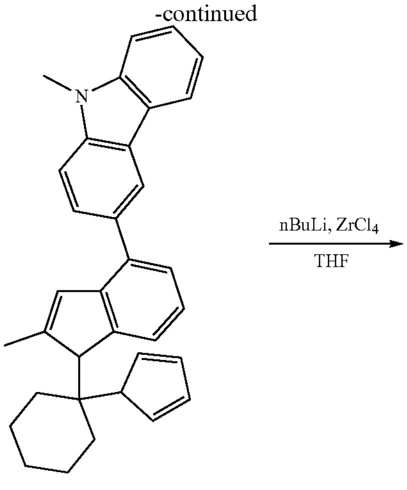

P18-2

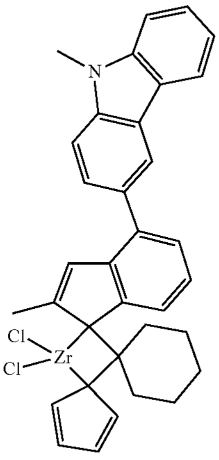

Compound 18

(Preparation of P18-2)

In a dried schlenk flask, P1-1 (4.23 g, 13.68 mmol) was put, and the flask was filled with argon, and then, 46 ml of diethylether was introduced to dissolve, and the mixture was cooled to −78° C. 6 ml of 2.5 M n-butyllithium was slowly added dropwise, and the temperature was raised to room temperature, and then, the mixture was stirred for 4 hours. P18-1 (4 g, 27.35 mmol) was dissolved in 39 ml of diethylether, and the mixture was cooled to −78° C., and then, the lithiated P1-1 was slowly added dropwise, and the mixture was stirred at room temperature overnight. After confirming the completion of reaction, a small amount of water was introduced to quench, the mixture was extracted twice with diethylether and water, and organic layers were combined and dried with magnesium sulfate anhydrous and then decompression dried. The concentrated compound was purified through silica column using hexane and ethyl acetate to obtain a compound P18-2 (12.5 g, 63%, MS: $[M+H]^+$ =456.3).

(Preparation of Compound 18)

In a dried schlenk flask, P18-2 (4 g, 8.78 mmol) was put, and the flask was filled with argon, and then, 90 ml of tetrahydrofuran was introduced to dissolve, and the mixture was cooled to −78° C. 7.4 ml of 2.5 M n-butyllithium was slowly added dropwise, and the temperature was raised to room temperature, and then, the mixture was stirred for 12 hours. And then, zirconium chloride(IV) (2.09 g, 8.95 mmol) slurry in 13 ml of tetrahydrofuran was introduced, and the mixture was stirred at room temperature overnight. After confirming the completion of reaction by NMR, solvents were vacuum dried, hexane was introduced again, LiCl was removed by filtration through glass frit under nitrogen condition, and then, the filtrate was vacuum dried. The obtained solid was recrystallized using hexane and dichloromethane, and then, the produced solid was filtered to prepare a compound 18 (3.5 g, 65%).

$^1H$ NMR (500 MHz, $CDCl_3$): δ 8.26 (dd, 1H), 8.13 (m, 1H), 7.98 (d, 1H), 7.85 (s, 1H), 7.74 (d, 1H), 7.58 (dd, 1H), 7.47-7.29 (m, 4H), 6.48 (m, 2H), 6.36-6.35 (m, 3H), 3.76 (s, 3H), 1.78 (s, 3H), 1.49-1.40 (m, 10H)

Preparation Example 19: Preparation of Compound 19

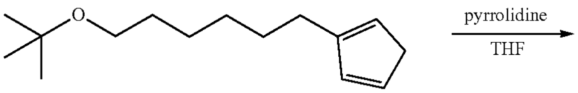

S15-1

-continued
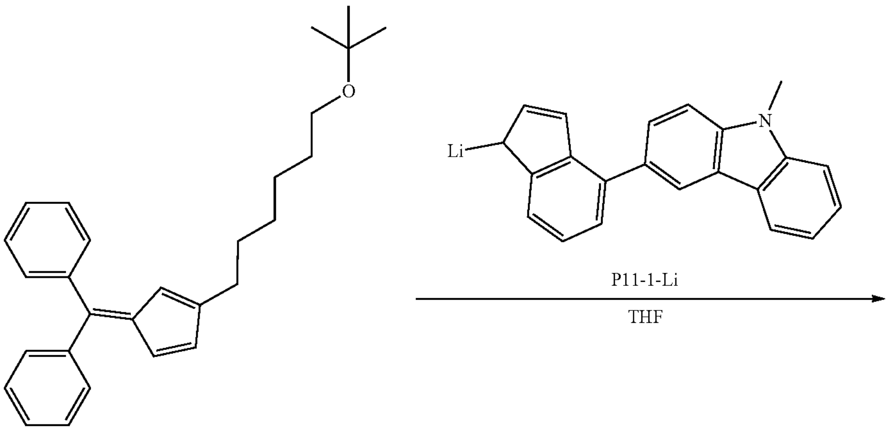
P19-1
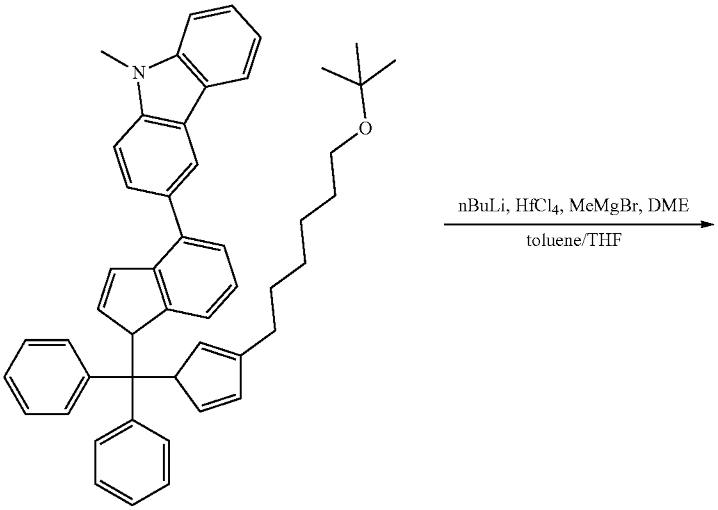
P19-2
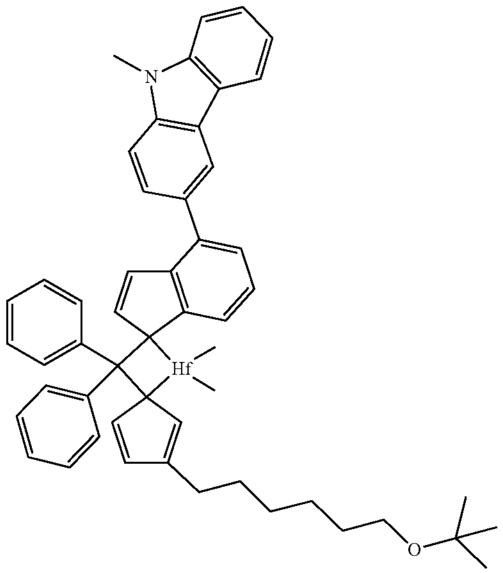
Compound 19

(Preparation of P19-1)

In a dried schlenk flask, S15-1 (10 g, 44.97 mmol) was put and dissolved in 90 ml of tetrahydrofuran 90 ml, and then, the mixture was cooled to −78° C. 2.5 M n-butyllithium (18.9 ml, 47.22 mmol) was slowly added dropwise, and the temperature of the mixture was slowly raised to room temperature, and the mixture was stirred for 5 hours. And, benzophenone (6.6 ml, 40.47 mmol) dissolved in 58 ml of tetrahydrofuran was added introduced therein at 0° C., and then, the mixture was stirred overnight. After confirming the completion of reaction, a small amount of water was introduced to quench, the mixture was extracted twice with ethyl acetate and water, and organic layers were combined and dried with magnesium sulfate anhydrous and then decompression dried to prepare a compound P19-1 (10.8 g, yield: 62%, MS: $[M+H]^+$=387.3).

(Preparation of P19-2)

In a dried schlenk flask, P11-1 (3.05 g, 10.35 mmol) was put, and the flask was filled with argon, and then, 34 ml of tetrahydrofuran was introduced to dissolve, and the mixture was cooled to −78° C. 4 ml of 2.5 M n-butyllithium was slowly added dropwise, and the temperature was raised to room temperature, and then, the mixture was stirred for 4 hours. P19-1 (8 g, 20.69 mmol) was dissolved in 30 ml of tetrahydrofuran, and the mixture was cooled to −78° C., and then, the lithiated P11-1 was slowly added dropwise, and the mixture was stirred at room temperature overnight. After confirming the completion of reaction, a small amount of water was introduced to quench, the mixture was extracted twice with ethyl acetate and water, and organic layers were combined and dried with magnesium sulfate anhydrous and then decompression dried. The concentrated compound was purified through silica column using hexane and ethyl acetate to obtain a compound P19-2 (14.1 g, 64%, MS: $[M+H]^{30}$=682.4).

(Preparation of Compound 19)

In a dried schlenk flask, P19-2 (8 g, 11.73 mmol) was put, and the flask was filled with argon, and then, 120 ml of tetrahydrofuran was introduced to dissolve, and the mixture was cooled to −78° C. 9.9 ml of 2.5 M n-butyllithium was slowly added dropwise, and the temperature was raised to room temperature, and then, the mixture was stirred for 12 hours. And then, hafnium chloride(IV) (3.83 g, 11.97 mmol) slurry in 17 ml of tetrahydrofuran was introduced, and the mixture was stirred 60° C. overnight. After confirming the completion of reaction by NMR, the temperature was decreased to −78° C., and methylmagnesium bromide solution, 3.0M in diethylether (9.78 ml, 29.33 mmol) was slowly added dropwise. The temperature of the mixture was raised to room temperature, and the mixture was stirred overnight. After confirming the completion of reaction by NMR, solvents were vacuum dried, hexane was introduced again, and then, 1,2-dimethoxyethane (3.66 ml, 35.19 mmol) was introduced, and the mixture was stirred at room temperature overnight. Inorganic substances were removed by filtration under nitrogen condition, and then, the filtrate was vacuum dried to prepare a compound 19 (8.3 g, yield: 80%).

$^1$H NMR (500 MHz, $CDCl_3$): δ 8.33 (dd, 1H), 8.21 (dd, 1H), 8.04 (dd, 1H), 7.91 (d, 1H), 7.79 (d, 1H), 7.64 (dd, 1H), 7.52-7.44 (m, 3H), 7.36-7.24 (m, 11H), 6.62 (t, 1H), 6.53 (dd, 1H), 6.45 (m, 2H), 6.26 (s, 1H), 3.85 (s, 3H), 3.38 (t, 2H), 2.00 (m, 2H), 1.55-1.33 (m, 8H), 1.16 (s, 9H), −1.95 (s, 6H)

Preparation Example 20: Preparation of Compound 20

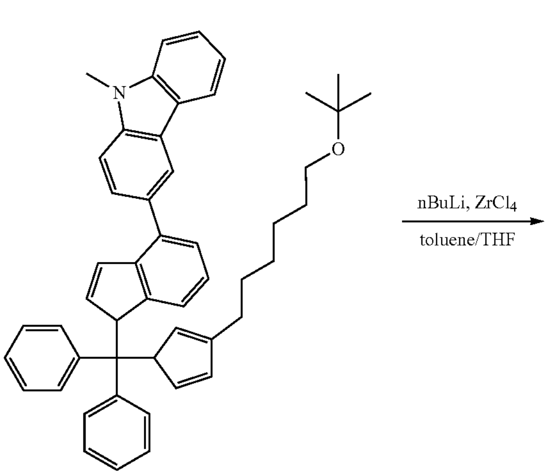

P19-2

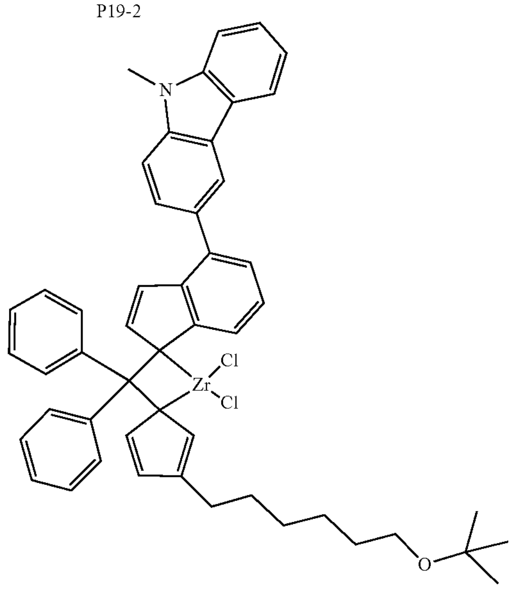

Compound 20

(Preparation of compound 20)

In a dried schlenk flask, P19-2 (3 g, 4.4 mmol) was put, and the flask was filled with argon, and then, 45 ml of toluene/tetrahydrofuran 10/1) was introduced to dissolve, and the mixture was cooled to −78° C. 3.7 ml of 2.5 M n-butyllithium was slowly added dropwise, and the temperature was raised to room temperature, and then, the mixture was stirred for 12 hours. And then, zirconium chloride(IV) (1.05 g, 4.49 mmol) slurry in 6 ml of toluene was introduced, and the mixture was stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried to prepare a compound 20 (2.4 g, yield: 65%).

$^1$H NMR (500 MHz, $CDCl_3$): δ 8.32 (dd, 1H), 8.19 (dd, 1H), 8.03 (dd, 1H), 7.92 (d, 1H), 7.78 (d, 1H), 7.62 (dd, 1H), 7.51-7.44 (m, 3H), 7.36-7.24 (m, 11H), 6.61 (t, 1H), 6.51 (dd, 1H), 6.42 (m, 2H), 6.22 (s, 1H), 3.81 (s, 3H), 3.36 (t, 2H), 1.97 (m, 2H), 1.53-1.30 (m, 8H), 1.14 (s, 9H)

Preparation Example 21: Preparation of Compound 21
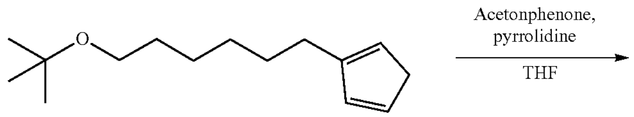
S15-1
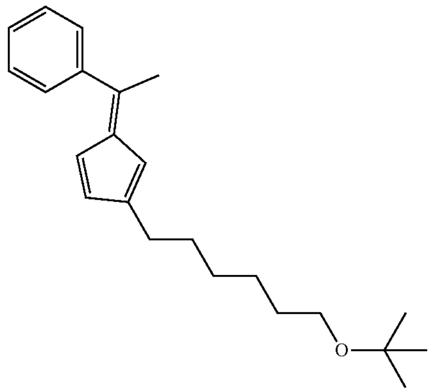
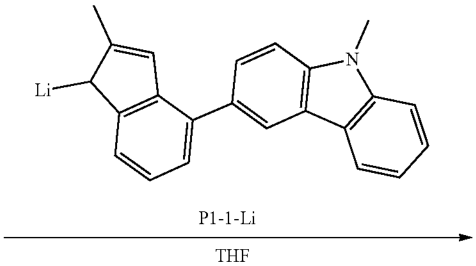
P21-1
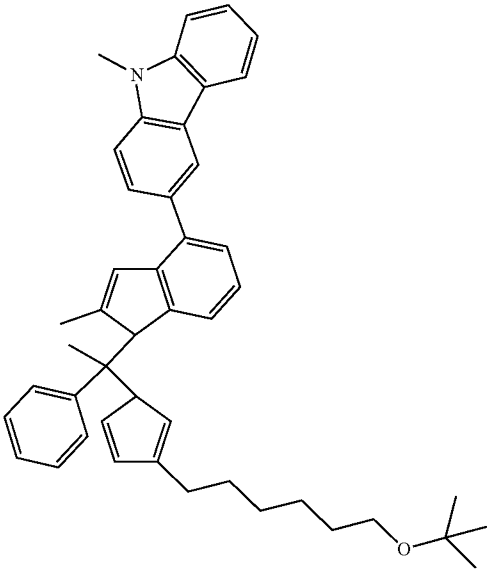
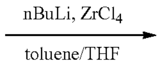
P21-2

-continued

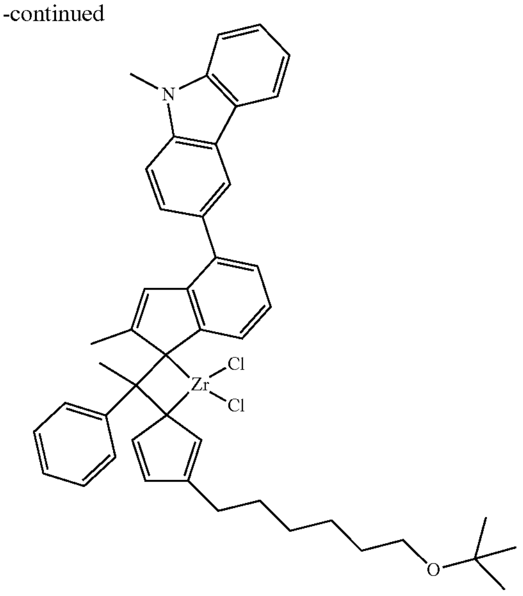

Compound 21

(Preparation of P21-1)

In a dried schlenk flask, S15-1 (8 g, 35.98 mmol) was put, and 72 ml of tetrahydrofuran and acetophenone (10.5 ml, 89.94 mmol) were put, and then, the mixture was cooled to 0° C. And, pyrrolidine (4.4 ml, 53.96 mmol) was slowly added dropwise, and then, the temperature of the mixture was slowly raised to room temperature, and the mixture was stirred for 7 hours. After confirming the completion of reaction, a small amount of water was introduced to quench, the mixture was extracted twice with ethyl acetate and water, and organic layers were combined and dried with magnesium sulfate anhydrous and then decompression dried. The concentrated compound was purified through silica column using hexane and ethyl acetate to prepare a compound P21-1 (6.8 g, 58%, MS: $[M+1-1]^+=325.3$).

(Preparation of P21-2)

In a dried schlenk flask, P21-1 (2.86 g, 9.24 mmol) was put, and the flask was filled with argon, and then, 31 ml of tetrahydrofuran was introduced to dissolve, and the mixture was cooled to −78° C. 4 ml of 2.5 M n-butyllithium was slowly added dropwise, and the temperature was raised to room temperature, and then, the mixture was stirred for 4 hours. P95-1 (6 g, 18.49 mmol) was dissolved in 26 ml of tetrahydrofuran, and the mixture was cooled to −78° C., and then, the lithiated P1-1 was slowly added dropwise, and the mixture was stirred at room temperature overnight. After confirming the completion of reaction, a small amount of water was introduced to quench, the mixture was extracted twice with ethyl acetate and water, and organic layers were combined and dried with magnesium sulfate anhydrous and then decompression dried. The concentrated compound was purified through silica column using hexane and ethyl acetate to prepare a compound P21-2 (11.7 g, 65%, MS: $[M+H]^+=634.4$).

(Preparation of Compound 21)

In a dried schlenk flask, P21-2 (4 g, 6.31 mmol) was put, and the flask was filled with argon, and then, 64 ml of toluene/tetrahydrofuran 10/1) was introduced to dissolve, and the mixture was cooled to −78° C. 5.3 ml of 2.5 M n-butyllithium was slowly added dropwise, and the temperature was raised to room temperature, and then, the mixture was stirred for 12 hours. And then, zirconium chloride(IV) (1.5 g, 6.44 mmol) slurry in 9 ml of toluene was introduced, and the mixture as stirred at room temperature overnight. After confirming the completion of reaction by NMR, solvents were vacuum dried, dichloromethane was introduced again, LiCl was removed by filtration through glass frit under nitrogen condition, and then, the filtrate was vacuum dried to prepare a compound 21 (3.6 g, yield: 71%).

$^1$H NMR (500 MHz, $CDCl_3$): δ 8.31 (d, 1H), 8.21 (d, 1H), 8.01 (d, 1H), 7.92 (s, 1H), 7.78 (d, 1H), 7.60 (dd, 1H), 7.52-7.35 (m, 8H), 7.25 (m, 1H), 6.51 (d, 1H), 6.43-6.40 (m, 2H), 6.19 (s, 1H), 3.81 (s, 3H), 3.39 (t, 2H), 1.96 (t, 2H), 1.82 (s, 3H), 1.53-1.31 (m, 8H), 1.15 (s, 9H), 0.89 (m, 3H)

Preparation Example 22: Preparation of Compound 22

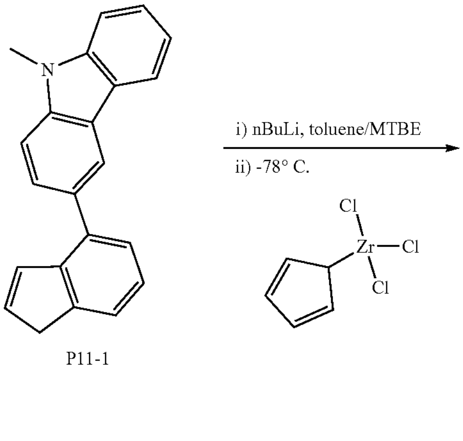

P11-1

-continued

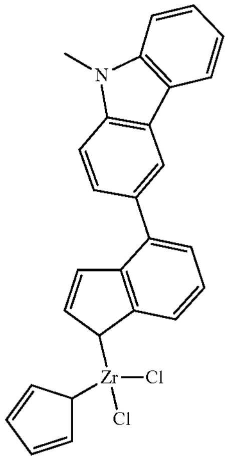

Compound 22

(Preparation of Compound 22)

In a dried schlenk flask, P11-1 (5 g, 15.41 mmol) was put, and the flask was filled with argon, and then, 51 ml of toluene/methyl tert-butylether (15/1) was introduced to dissolve, and the mixture was cooled to −78° C. 6 ml of 2.5 M n-butyllithium was slowly added dropwise, and the temperature was raised to room temperature, and then, the mixture was stirred overnight. The mixture was cooled to −78° C., and then, cyclopentadienylzirconium(IV) trichloride solution (3.42 g, 13 mmol) dissolved in 22 ml of toluene was slowly added dropwise, and the mixture was stirred at room temperature overnight. After confirming the completion of reaction, the solvents in the mixture were dried through vacuum decompression to 1/10 volume ratio, and hexane was introduced again as much as the solvents removed. The hexane slurry was filtered under argon, and the obtained filtrate was vacuum dried to prepare a compound 22 (5.2 g, yield: 53%).

$^1$H NMR (500 MHz, $CDCl_3$): δ 8.25 (dd, 1H), 8.16 (dd, 1H), 7.95 (dd, 1H), 7.85 (d, 1H), 7.73 (d, 1H), 7.55 (dd, 1H), 7.47-7.30 (m, 4H), 6.55-6.36 (m, 6H), 3.49 (dd, 1H), 2.89 (m, 1H)

Preparation Example 23: Preparation of Compound 23

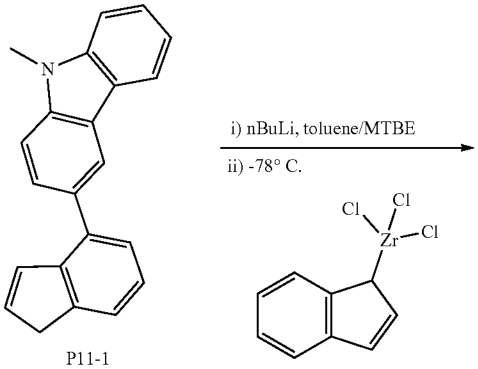

P11-1

-continued

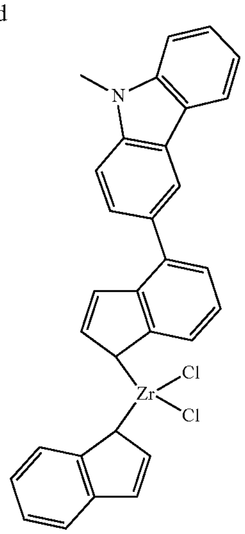

Compound 23

(Preparation of Compound 23)

In a dried schlenk flask, P11-1 (5 g, 15.41 mmol) was put, and the flask was filled with argon, and then, 51 ml of toluene/methyl tert-butylether (15/1) was introduced to dissolve, and the mixture was cooled to −78° C. 6 ml of 2.5 M n-butyllithium was slowly added dropwise, and the temperature was raised to room temperature, and then, the mixture was stirred overnight. The mixture was cooled to −78° C., and then, indenylzirconium(IV) trichloride solution (3.85 g, 12.33 mmol) dissolved in 18 ml of toluene was slowly added dropwise, and the mixture was stirred at room temperature overnight. After confirming the completion of reaction, the solvents in the mixture were dried through vacuum decompression to 1/10 volume ratio, and hexane was introduced again as much as the solvents removed. The hexane slurry was filtered under argon, and the obtained filtrate was vacuum dried to prepare a compound 23 (4.7 g, yield: 53%).

$^1$H NMR (500 MHz, $CDCl_3$): δ 8.26 (dd, 1H), 8.15 (dd, 1H), 7.98 (dd, 1H), 7.87 (d, 1H), 7.76 (d, 1H), 7.58 (dd, 1H), 7.45-7.30 (m, 7H), 7.16 (td, 1H), 6.56 (d, 2H), 6.37 (dd, 2H), 3.73 (s, 3H), 3.48 (dd, 2H)

<Preparation of Catalyst Composition and Preparation of an Olefin Polymer Using the Same>

Example 1

1) Preparation of Catalyst Composition (Silica Supported Metallocene Catalyst in the Form of Solid Particles)

In a Pico reactor, 50 mL of toluene was introduced, and then, 7 g of silica (952×) was transferred. 10 mmol of methylaluminoxane (MAO) was introduced and reacted at 95° C. for 24 hours. After precipitation, the upper part was removed, and the remainder was washed with toluene one time. 60 μmol of the metallocene catalyst precursor compound 1 of Preparation Example 1 was dissolved in toluene, and then, reacted at 80° C. for 2 hours. After the reaction was completed and precipitation was ended, the upper part solution was removed, and the remaining reaction product was washed with toluene. It was washed with hexane again, and then, under hexane, 2 wt % of Atmer was introduced and stirred for 10 minutes. After precipitation, the upper part was removed, and the remainder was vacuum dried to obtain a silica supported metallocene catalyst in the form of solid particles.

2) Olefin Polymerization

A 600 mL stainless reactor was vacuum dried at 120° C. and then cooled, and 1 g of TMA was introduced in 250 g of hexane at room temperature, and the mixture was stirred for 10 minutes. All the reacted hexane was removed, and then, 250 g of hexane and 0.5 g of TiBAL were introduced, and the mixture was stirred for 5 minutes. 7 mg of the silica supported metallocene catalyst prepared in 1) was introduced, and then, while raising the temperature to 70° C., the mixture was stirred. After stirring was stopped at 70° C., 10 mL of 1-hexene was introduced, and $C_2$ was filled to 30 bar, and then, stirring began. After polymerization for 30 minutes, unreacted $C_2$ was vented.

Examples 2 to 23

Catalyst compositions were prepared and olefins were polymerized by the same method as Example 1, except that the compounds prepared in Preparation Examples 2 to 23 were respectively used instead of the metallocene catalyst precursor compound 1 of Preparation Example 1-1, in the 1) preparation step of a catalyst composition of Example 1.

Comparative Examples 1 to 5

Catalyst compositions were prepared and olefins were polymerized by the same method as Example 1, except that the following compounds A to E were respectively used instead of the metallocene catalyst precursor compound 1 of Preparation Example 1-1, in the 1) preparation step of a catalyst composition of Example 1.

Compound A

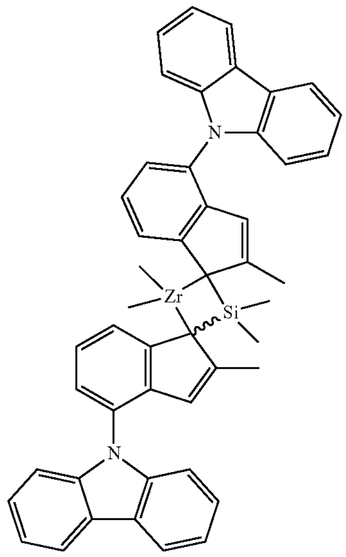

-continued

Compound B

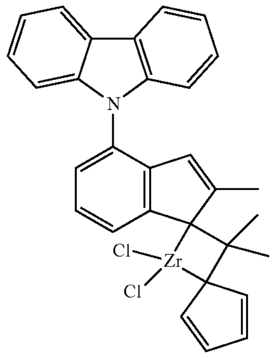

Compound C

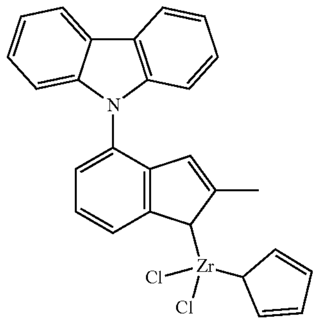

Compound D

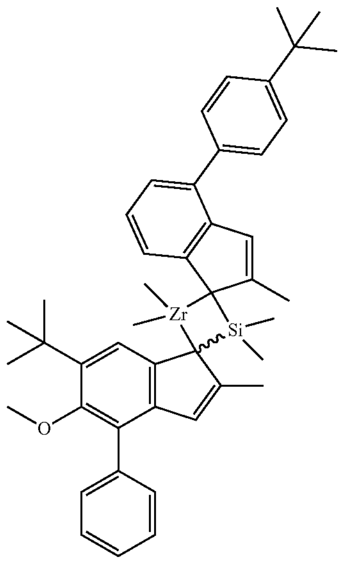

-continued

Compound E

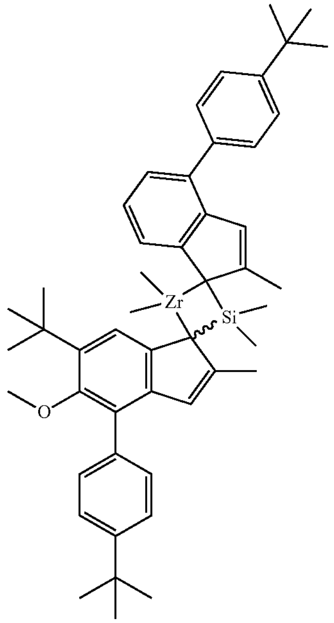

Experimental Example

Polymerization activity of each catalyst composition of Examples and Comparative Examples was measured, and the melting point, weight average molecular weight, molecular weight distribution and SCB of olefin polymer polymerized using the same were measured, and the results were described in the following Table 1.

(1) Polymerization activity (kg/mmol cat hr): calculated as a rate of weight (kg) of produced polymer per weight (g cat) of catalyst used, per unit time (hr).

(2) Melting point (Tm, ° C.)

The temperature of polymer is increased to 200° C. and maintained for 5 minutes, and decreased to 30° C., and then, increased again, and the top of a DSC (Differential Scanning calorimeter, manufactured by TA Corp.) curve is measured as Tm, and the temperature is decreased to 30° C. again, and the top of the curve is measured as Tc.

Wherein, temperature increase and decrease speeds are respectively 10° C./min, and Tm and Tc are the results respectively measured in the second temperature increase and decrease sections.

(2) Weight average molecular weight (Mw, g/mol) and polydispersity index (PDI)

Using GPC (gel permeation chromatography, manufactured by Water), weight average molecular weight (Mw) and number average molecular weight (Mn) of polymer were measured, and polydispersity index (PDI) is measured by dividing the weight average molecular weight was divided by the number average molecular weight. Specifically, as GPC device, Waters PL-GPC220 device was used, and Polymer Laboratories PLgel MIX-B 300 mm length column was used. Wherein, measurement temperature was 160° C., 1,2,4-trichlorobenzene was used as a solvent, and the flow rate was 1 mL/min.

The polymer sample was dissolved in 1,2,4-trichlorobenzene containing 0.0125% BHT at 160° C., for 10 hours and pretreated using GPC analyzer (PL-GP220), and prepared at the concentration of 10 mg/10 mL, and then, supplied in the amount of 200 μL. Using a calibration curve formed using polystyrene standard specimens, Mw and Mn values were derived. As the polystyrene standard specimens, 9 kinds each having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

(3) SCB (Short chain Branch) content (number/$C_{1000}$)

For the prepared polymer, SCB content (number/C1000) was analyzed with $^1$H NMR. Bruker DMX 600 MHz NMR/BBFO (1H/19F/Broad band) probe was used, and the sample was dissolved in a TCE-$d_2$ solvent at high temperature and $^1$H NMR was measured at 100° C. $^1$H NMR spectrum was measured, and the comonomer content of polymer was calculated on the basis of end $CH_3$ peak of 1-hexene appearing at 0.8~1.0 ppm region.

The SCB content means the number of C2-7 branches per 1000 carbon atoms of the main chain.

TABLE 1

| | Catalyst composition | Catalytic activity (kg/g-cat · h) | Tm (° C.) | Mw | PDI | SCB (number/ C1000) |
|---|---|---|---|---|---|---|
| Experimental Example 1 | Example 1 | 3.1 | 125.6 | 612,483 | 8.0 | 4.8 |
| Experimental Example 2 | Example 2 | 4.3 | 126.3 | 740,484 | 10.0 | 5.8 |
| Experimental Example 3 | Example 3 | 3.1 | 126.3 | 623,680 | 11.7 | 5.7 |
| Experimental Example 4 | Example 4 | 7.0 | 126.8 | 592,991 | 11.8 | 4.3 |
| Experimental Example 5 | Example 5 | 6.1 | 126.6 | 757,740 | 10 | 6.0 |
| Experimental Example 6 | Example 6 | 5.2 | 125.9 | 636,766 | 12.2 | 3.0 |
| Experimental Example 7 | Example 7 | 3.6 | 126.2 | 670,790 | 11.3 | 5.1 |
| Experimental Example 8 | Example 8 | 4.2 | 125.7 | 747,395 | 8.4 | 3.8 |
| Experimental Example 9 | Example 9 | 6.6 | 126.0 | 805,443 | 9.8 | 3.4 |
| Experimental Example 10 | Example 10 | 4.2 | 125.5 | 807,983 | 11.9 | 3.7 |
| Experimental Example 11 | Example 11 | 5.6 | 126.1 | 681,377 | 8.2 | 6.0 |

TABLE 1-continued

| | Catalyst composition | Catalytic activity (kg/g-cat · h) | Tm (° C.) | Mw | PDI | SCB (number/ C1000) |
|---|---|---|---|---|---|---|
| Experimental Example 12 | Example 12 | 3.3 | 125.6 | 790,257 | 11.1 | 3.3 |
| Experimental Example 13 | Example 13 | 5.7 | 125.9 | 643,434 | 12 | 3.3 |
| Experimental Example 14 | Example 14 | 3.8 | 126.1 | 614,690 | 12.5 | 3.5 |
| Experimental Example 15 | Example 15 | 5.8 | 126.5 | 589,883 | 10.4 | 3.8 |
| Experimental Example 16 | Example 16 | 6.2 | 126.3 | 965,511 | 8.8 | 3.0 |
| Experimental Example 17 | Example 17 | 6.9 | 125.7 | 585,016 | 9.7 | 3.8 |
| Experimental Example 18 | Example 18 | 4.6 | 126.8 | 599,914 | 10.7 | 5.1 |
| Experimental Example 19 | Example 19 | 3.0 | 125.8 | 609,235 | 10.5 | 7.7 |
| Experimental Example 20 | Example 20 | 6.8 | 125.5 | 591,964 | 10.2 | 6.5 |
| Experimental Example 21 | Example 21 | 4.1 | 126.2 | 859,977 | 11.8 | 6.3 |
| Experimental Example 22 | Example 22 | 3.1 | 125.7 | 356,105 | 5.7 | 3.5 |
| Experimental Example 23 | Example 23 | 6.4 | 125.7 | 278,388 | 5.9 | 4.0 |
| Comparative Experimental Example 1 | Comparative Example 1 | 2.5 | 126.4 | 552,575 | 3.1 | 2.2 |
| Comparative Experimental Example 2 | Comparative Example 2 | 2.9 | 125.6 | 482,895 | 3.2 | 1.8 |
| Comparative Experimental Example 3 | Comparative Example 3 | 2.4 | 125.9 | 219,686 | 3.5 | 1.7 |
| Comparative Experimental Example 4 | Comparative Example 4 | 1.2 | 125.1 | 457,235 | 2.3 | 2.5 |
| Comparative Experimental Example 5 | Comparative Example 5 | 1.5 | 124.9 | 438,673 | 2.2 | 2.1 |

As confirmed by the data of Table 1, the catalyst composition using the metallocene compound of the Chemical Formula 1 of the invention exhibits excellent catalytic activity. Thus, an olefin polymer having wider molecular weight distribution, large weight average molecular weight and high SCB content can be prepared through various forms of bonding, and the finally prepared polymer has excellent durability, and thus, can be easily applied for various products requiring long term durability.

The invention claimed is:

1. A metallocene compound represented by Chemical Formula 1:

[Chemical Formula 1]

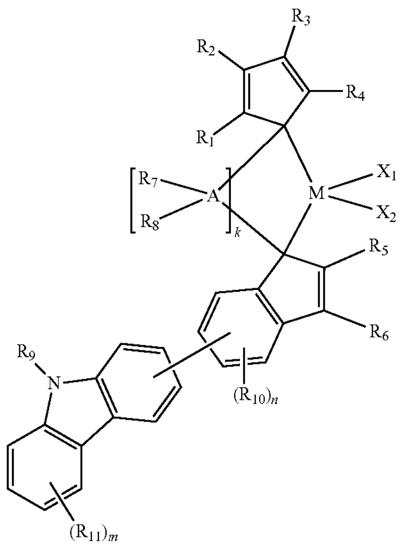

wherein in Chemical Formula 1,

M is Group 4 transition metal,

A is carbon or silicon, $X_1$ and $X_2$ are each independently, hydrogen, halogen, or substituted or unsubstituted $C_{1-30}$ alkyl;

$R_1$ to $R_4$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, substituted or unsubstituted $C_{6-30}$ aryl, or two adjacent $R_1$ to $R_4$ that are bonded to each other to form a substituted or unsubstituted $C_{5-30}$ fused ring;

$R_5$ and $R_6$ are each independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, or substituted or unsubstituted $C_{6-30}$ aryl;

$R_7$ and $R_8$ are each independently, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, substituted or unsubstituted $C_{6-30}$ aryl, or $R_7$ and $R_8$ that are bonded to each other to form a substituted or unsubstituted $C_{5-30}$ spiro ring;

$R_9$ is substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl;

each $R_{10}$ is independently, hydrogen, substituted or unsubstituted $C_{1-30}$ alkyl, substituted or unsubstituted $C_{2-30}$ alkenyl, substituted or unsubstituted $C_{1-30}$ alkoxy, substituted or unsubstituted $C_{2-30}$ alkoxyalkyl, substituted or unsubstituted $C_{6-30}$ aryl, or two adjacent $R_{10}$ that are bonded to each other to form a substituted or unsubstituted $C_{5-30}$ fused ring, $R_{11}$ is hydrogen, substituted or unsubstituted $C_{1-30}$ alkyl, substituted or unsubstituted $C_{2-30}$ alkenyl, $C_{1-30}$ alkoxy, substituted or unsubstituted $C_{2-30}$ alkoxyalkyl, or substituted or unsubstituted $C_{6-30}$ aryl, m is an integer of 1 to 4, n is an integer of 1 to 3, and k is 0 or 1.

2. The metallocene compound according to claim 1, wherein the metallocene compound represented by Chemical Formula 1 is represented by Chemical Formula 1-1 or 1-2:

[Chemical Formula 1-1]

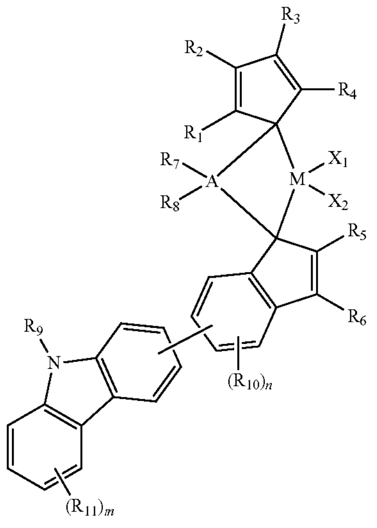

[Chemical Formula 1-2]

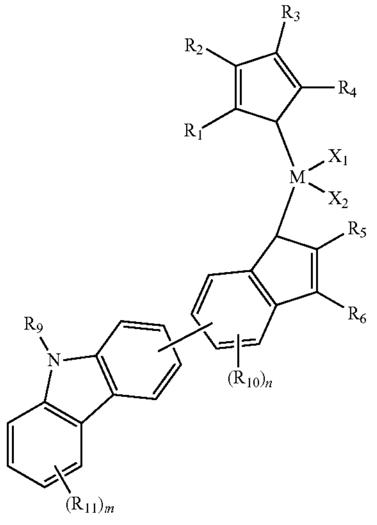

wherein in Formulas 1-1 and 1-2,

M, $X_1$, $X_2$, A, $R_1$ to $R_{11}$, m and n are as defined in claim 1.

3. The metallocene compound according to claim 1, wherein M is zirconium (Zr) or hafnium (Hf).

4. The metallocene compound according to claim 1, wherein $X_1$ and $X_2$ are each independently, chloro (Cl), or $C_{1-5}$ alkyl.

5. The metallocene compound according to claim 1, wherein $R_1$ to $R_4$ are each independently, hydrogen, $C_{1-10}$ alkyl, $C_{2-10}$ alkenyl, $C_{2-10}$ alkoxyalkyl, or two adjacent $R_1$ to $R_4$ together forming a fused ring selected from the group consisting of the following formulae, and if there are two fused rings, they are identical to or different from each other:

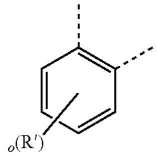
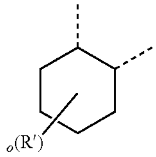
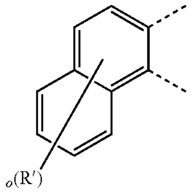
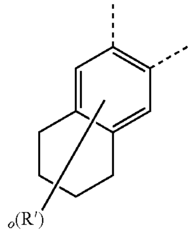
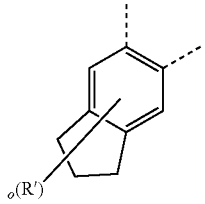
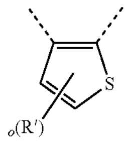
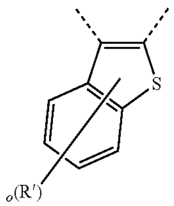
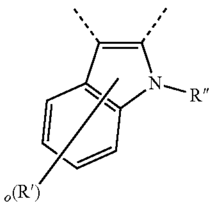

wherein, each R' is independently, $C_{1-10}$ alkyl, substituted or unsubstituted phenyl, 9-($C_{1-10}$ alkyl)-9H-carbazolyl, 9-($C_{2-10}$ alkoxyalkyl)-9H-carbazolyl or 9-phenyl-9H-carbazolyl, R" is $C_{1-10}$ alkyl, and each o is independently an integer of 0 to 4.

6. The metallocene compound according to claim 1, wherein $R_5$ and $R_6$ are each independently, hydrogen, $C_{1-10}$ alkyl, $C_{2-10}$ alkenyl or $C_{2-10}$ alkoxyalkyl.

7. The metallocene compound according to claim 1, wherein $R_7$ and $R_8$ are each independently, $C_{1-10}$ alkyl, $C_{2-10}$ alkenyl, $C_{2-10}$ alkoxyalkyl, phenyl substituted with $C_{2-10}$ alkoxyalkyl or unsubstituted, or spiro $C_{5-10}$ cycloalkane formed by bonding of $R_7$ and $R_8$ with each other.

8. The metallocene compound according to claim 1, wherein $R_9$ is $C_{1-10}$ alkyl or $C_{2-10}$ alkoxyalkyl.

9. The metallocene compound according to claim 1, wherein each $R_{10}$ is independently, hydrogen, $C_{1-10}$ alkyl or $C_{2-10}$ alkoxyalkyl, or two adjacent $R_{10}$ together forming a fused cycloalkane ring.

10. The metallocene compound according to claim 1, wherein each $R_{11}$ is independently, hydrogen, $C_{1-10}$ alkyl or $C_{2-10}$ alkoxyalkyl.

11. The metallocene compound according to claim 1, wherein the metallocene compound represented by Chemical Formula 1 is selected from the group consisting of the following compounds:

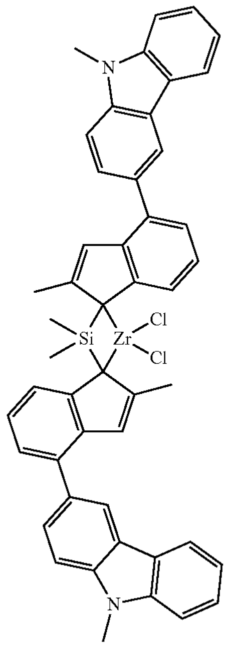
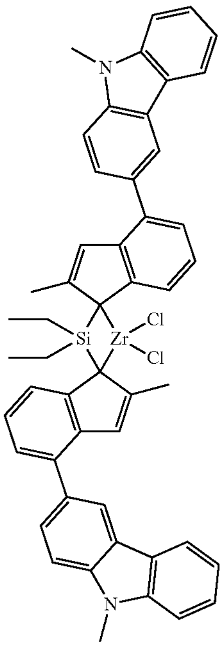
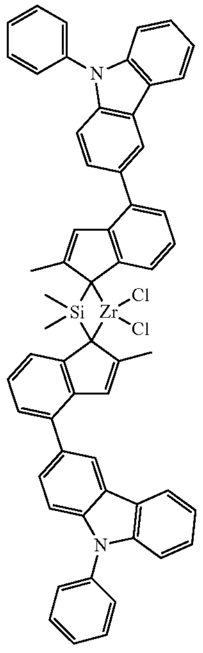
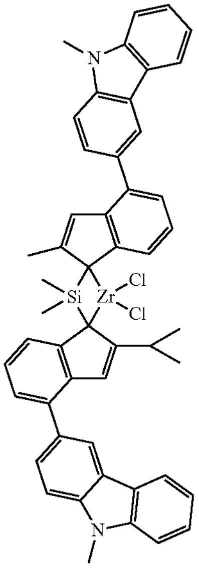

-continued
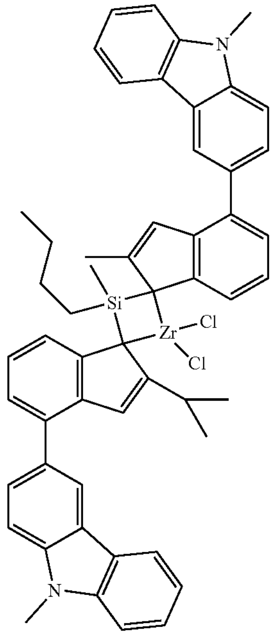
-continued
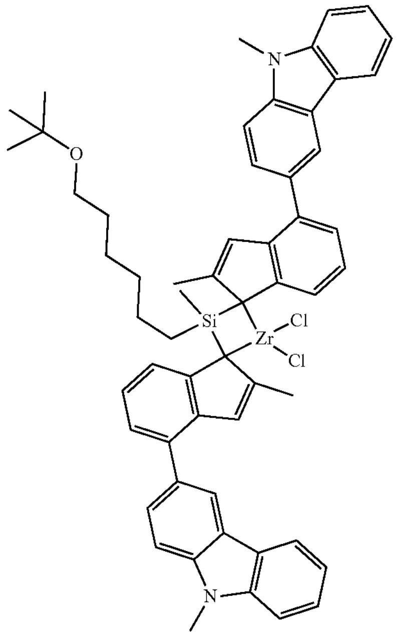
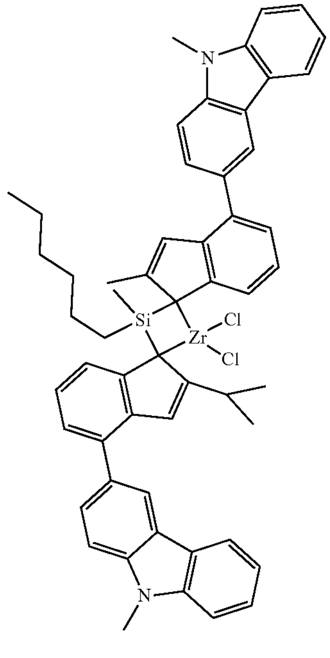
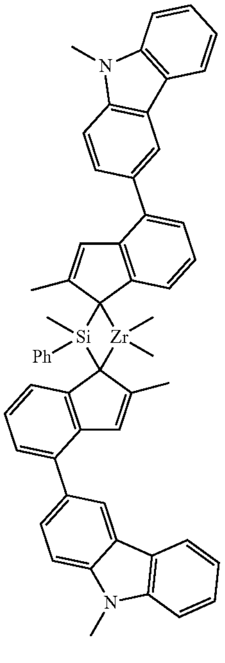

-continued
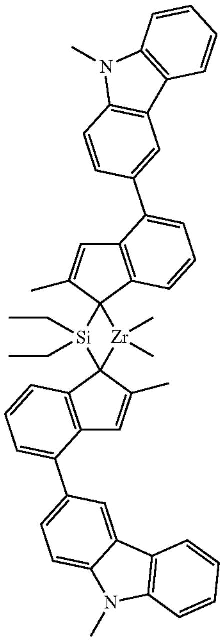
-continued
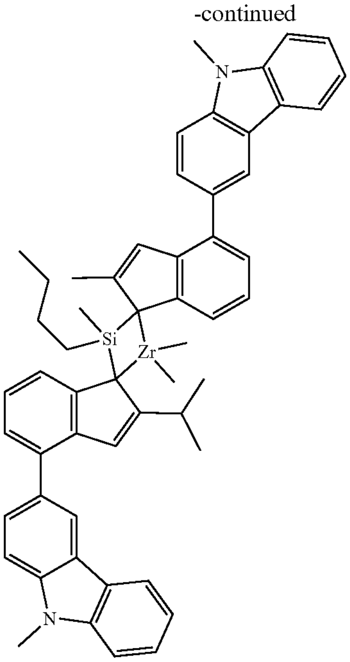
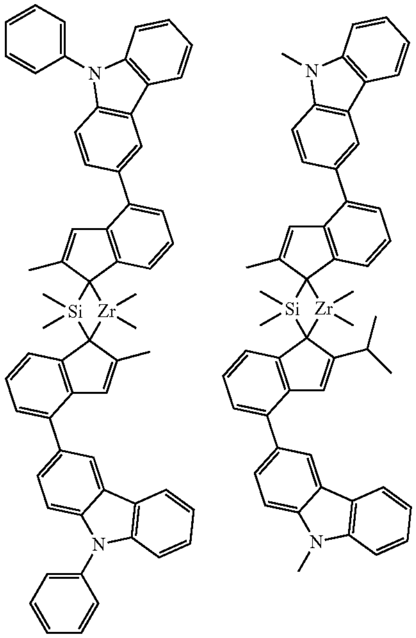
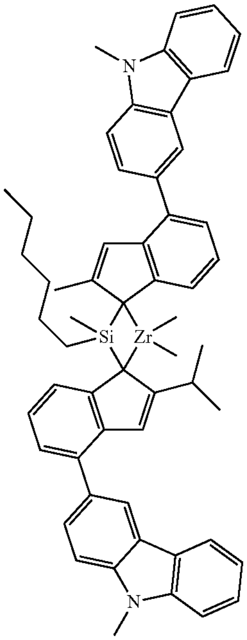

-continued
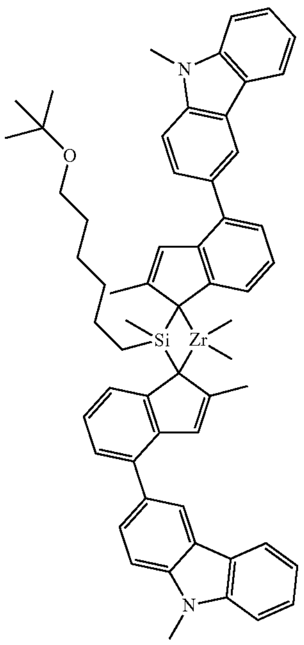
-continued
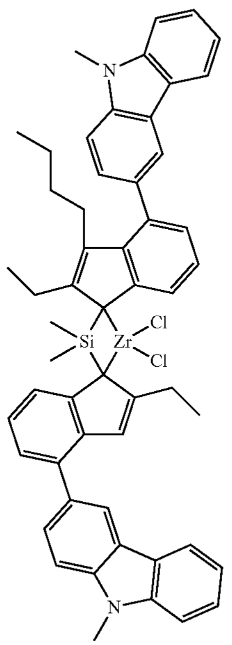
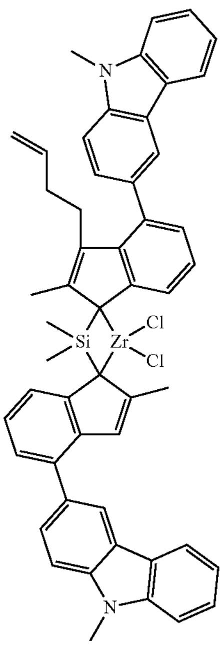
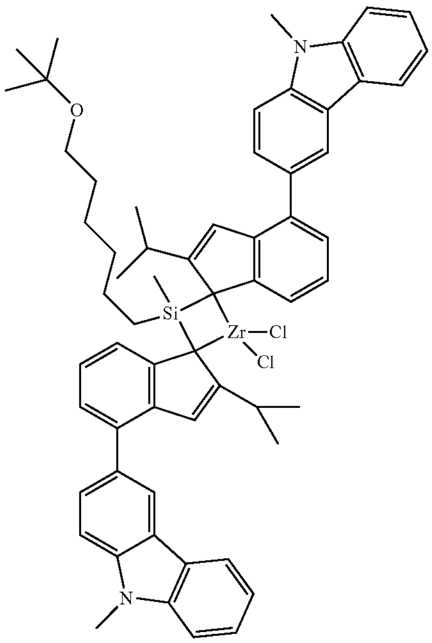
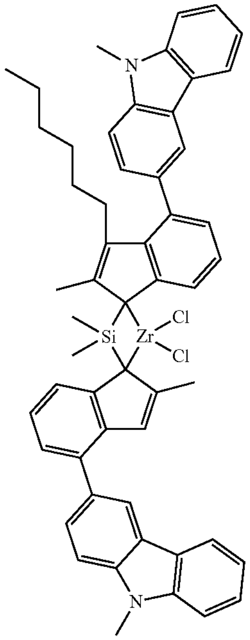

-continued
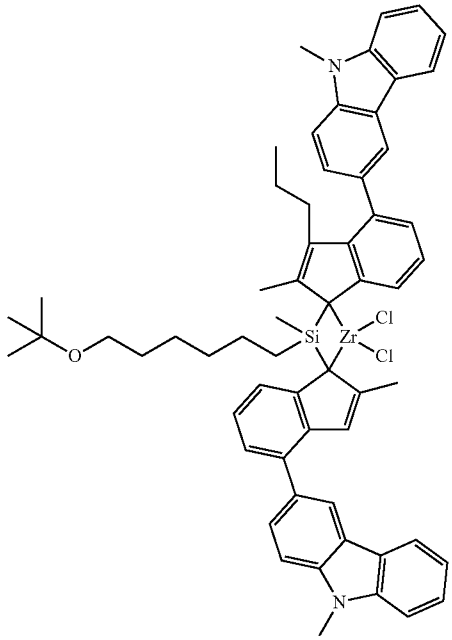
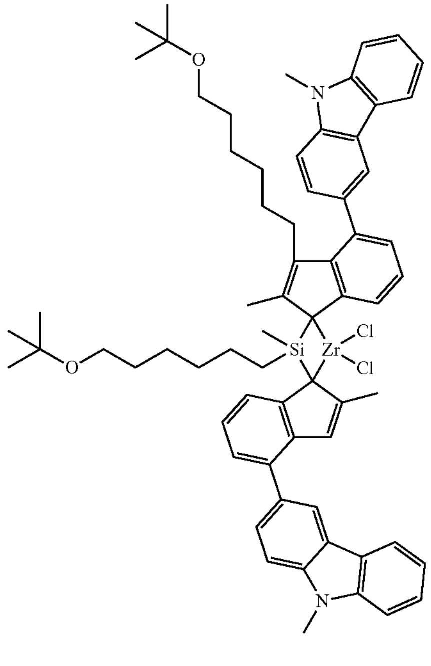
-continued
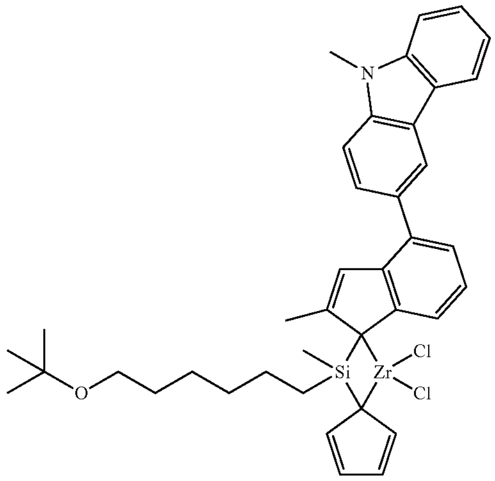
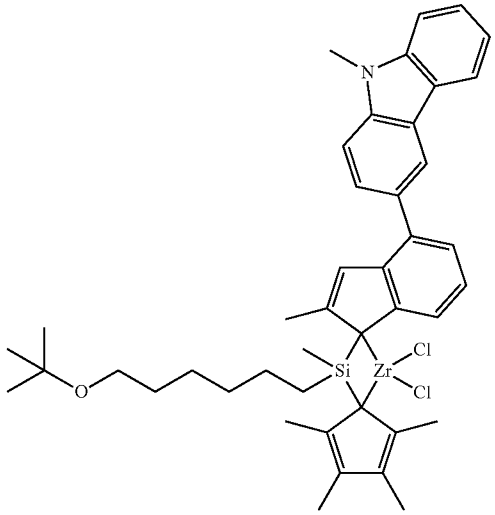
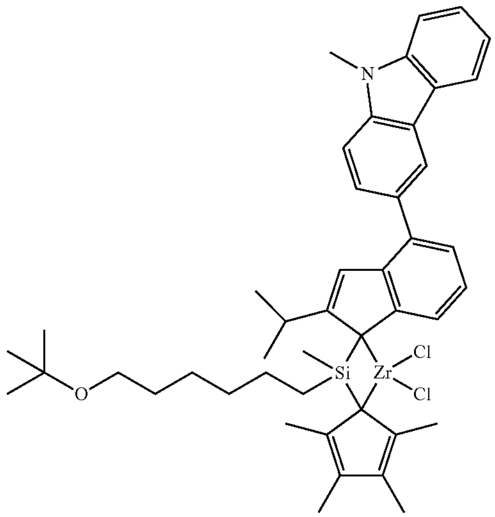

-continued
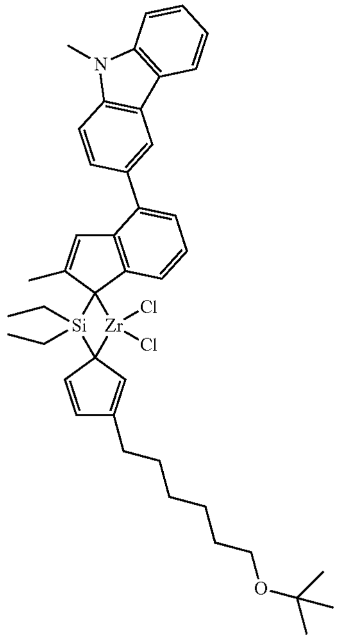
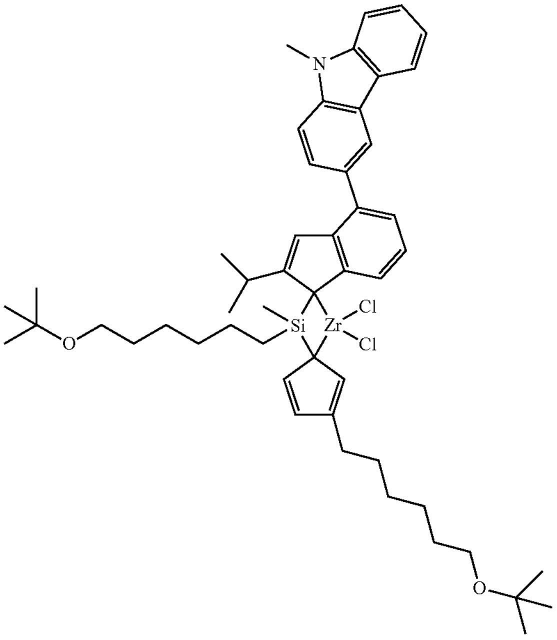
-continued
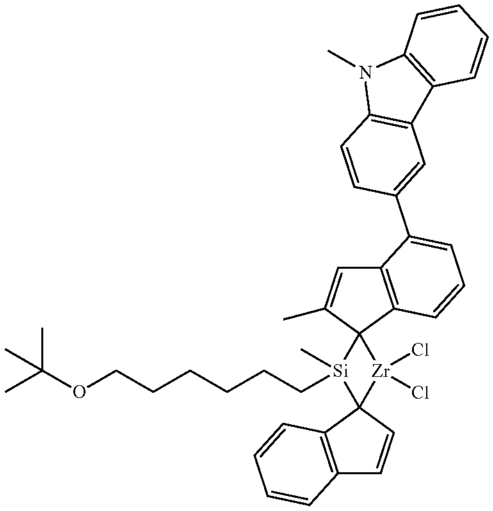
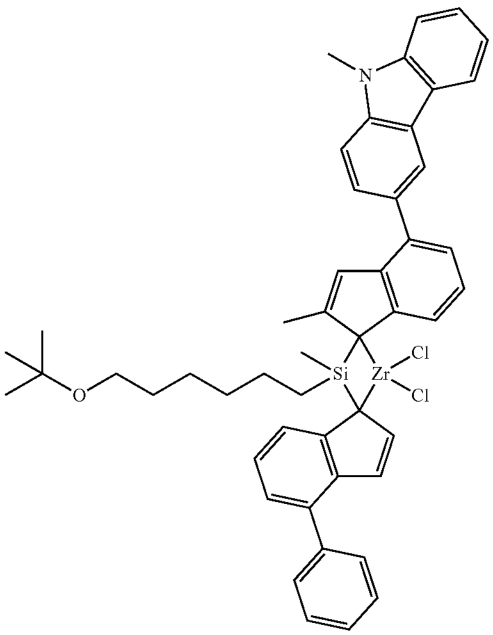
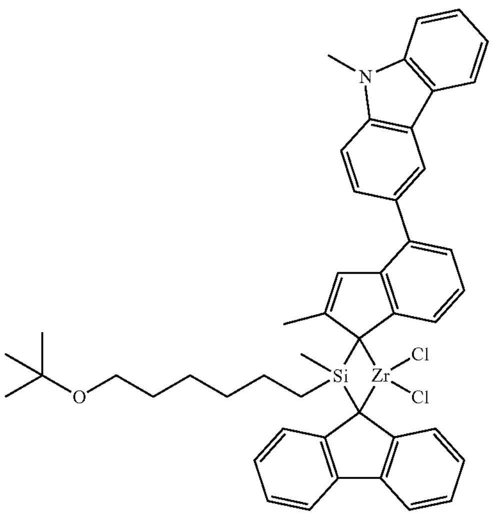

-continued
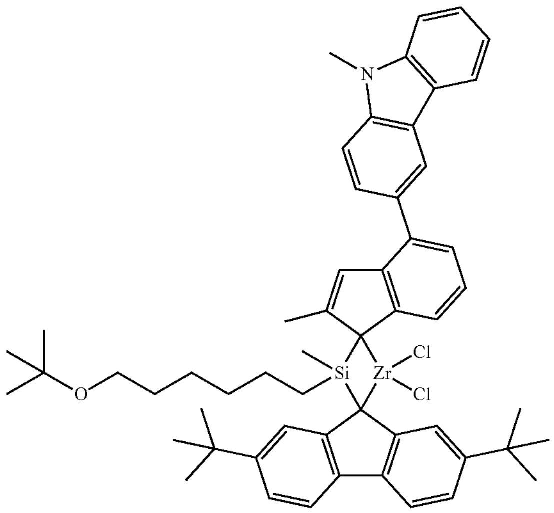
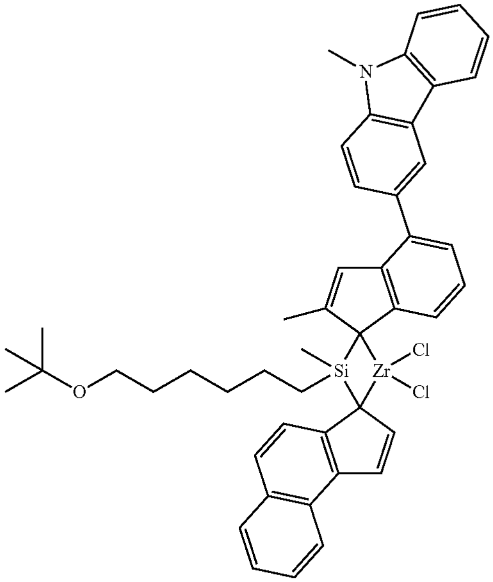
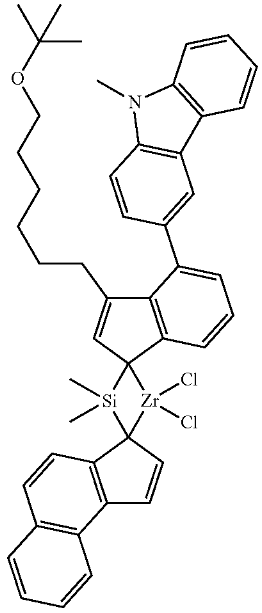
-continued
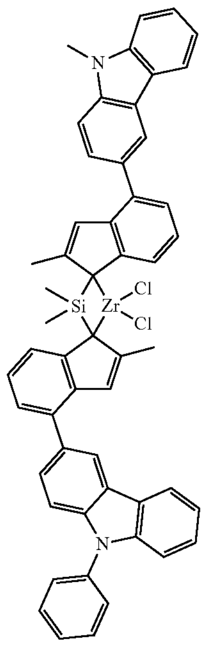
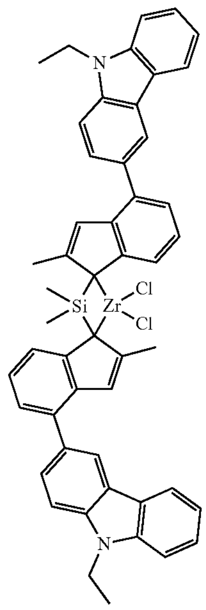
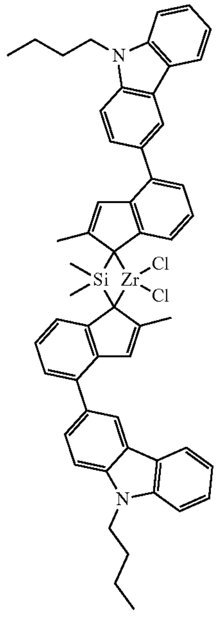
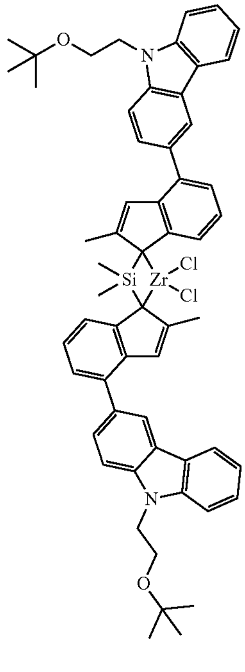

-continued
-continued
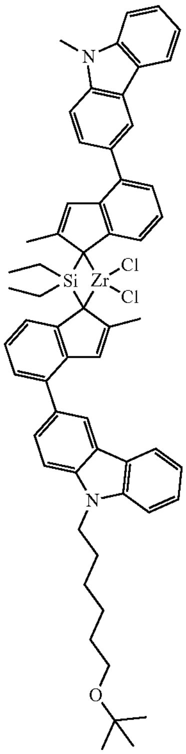
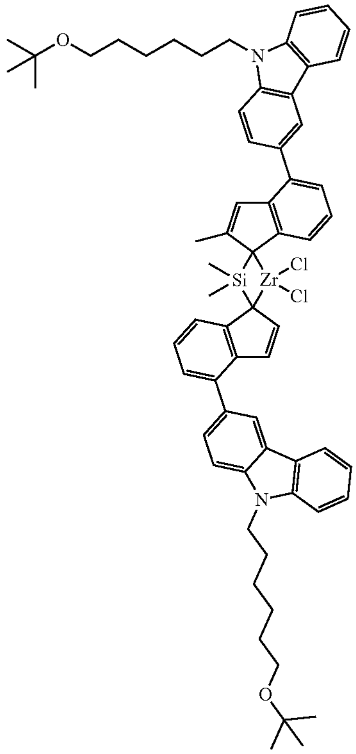
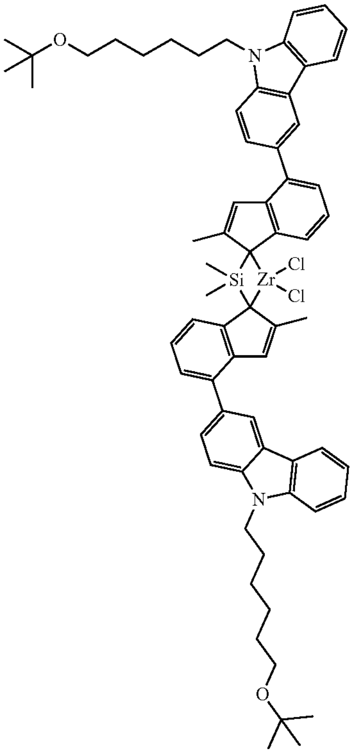
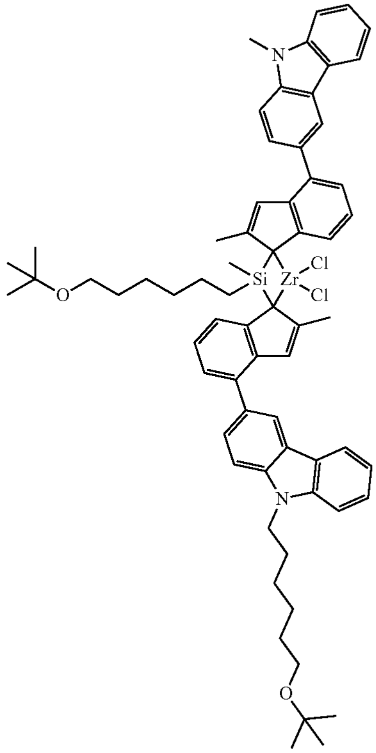

-continued
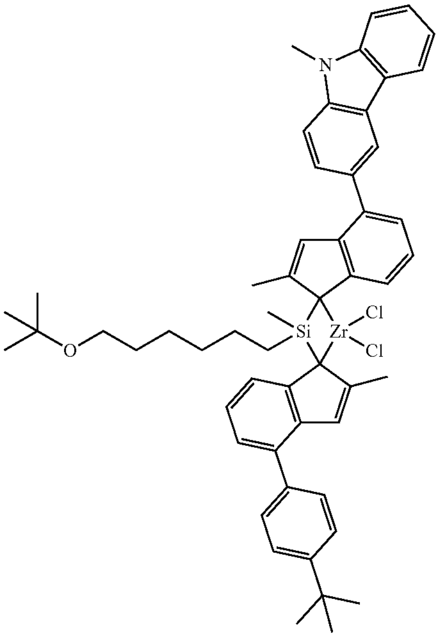
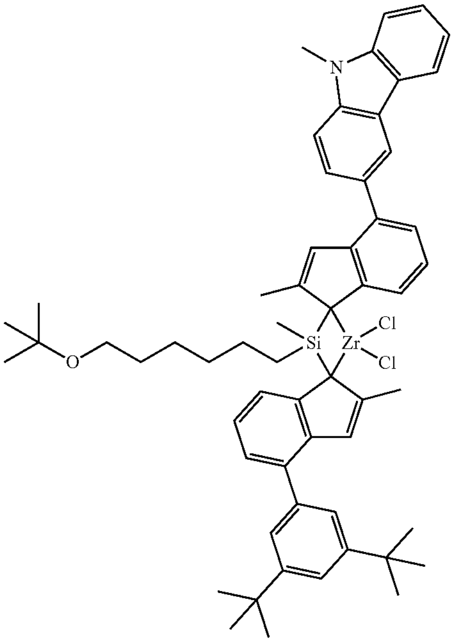
-continued
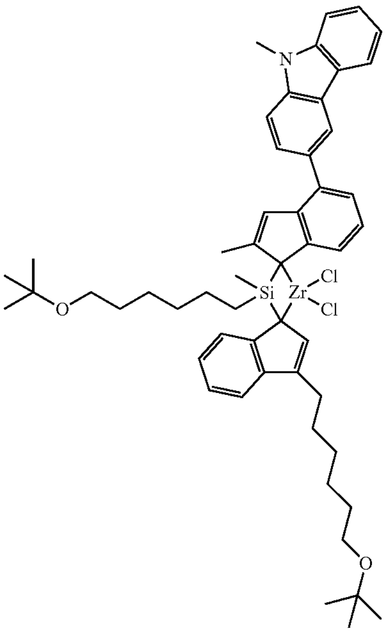
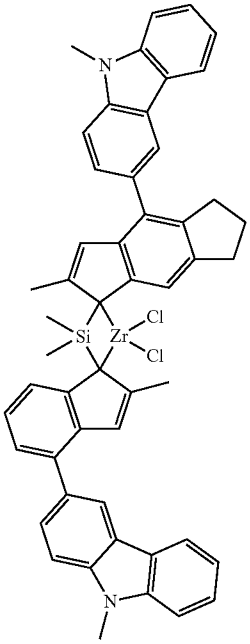

-continued
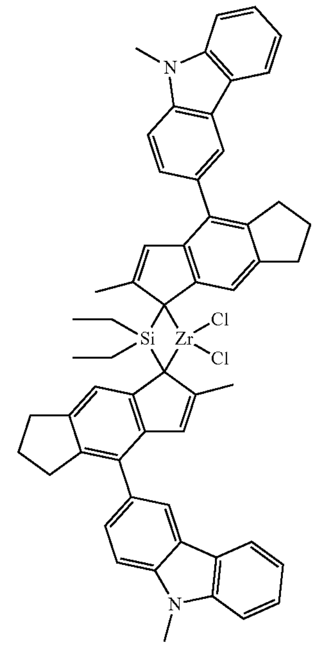
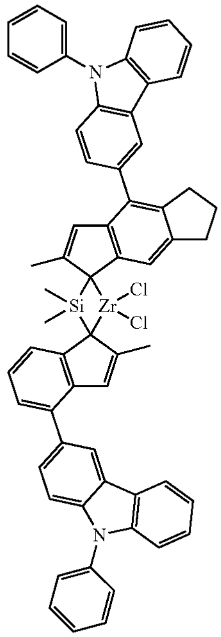
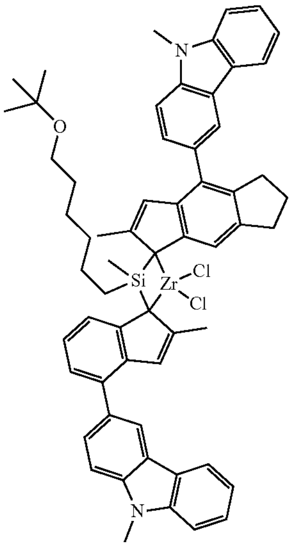
-continued
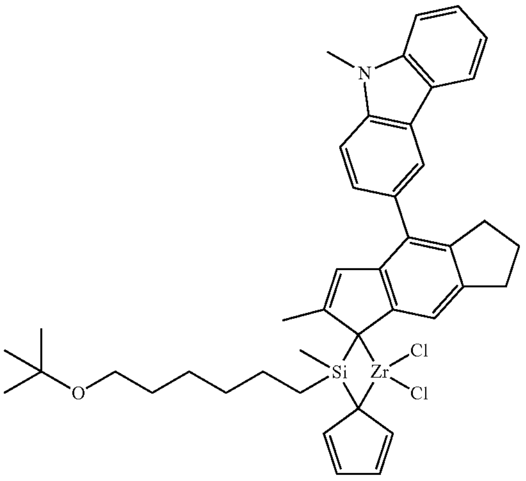
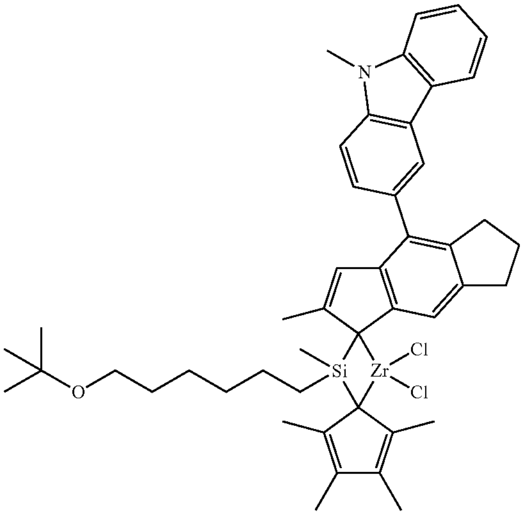
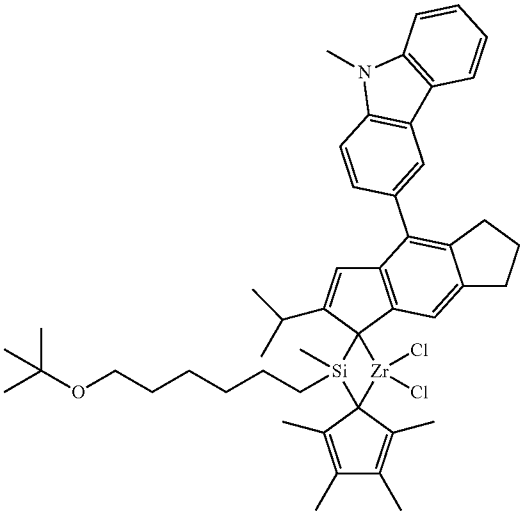

-continued
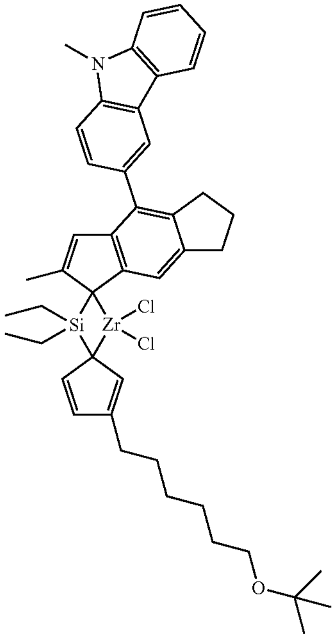
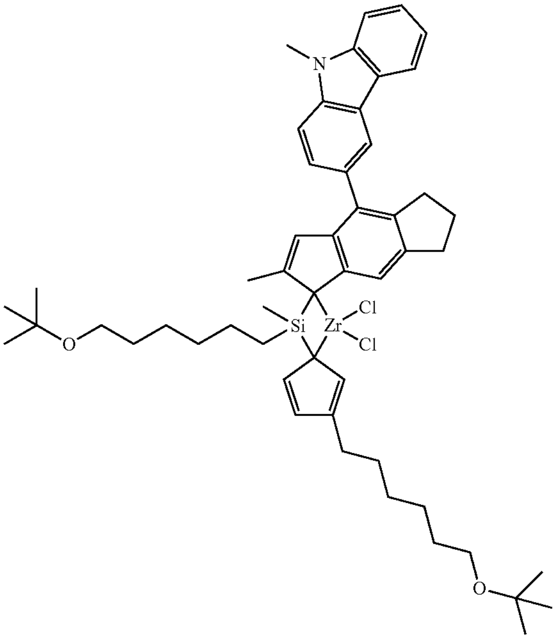
-continued
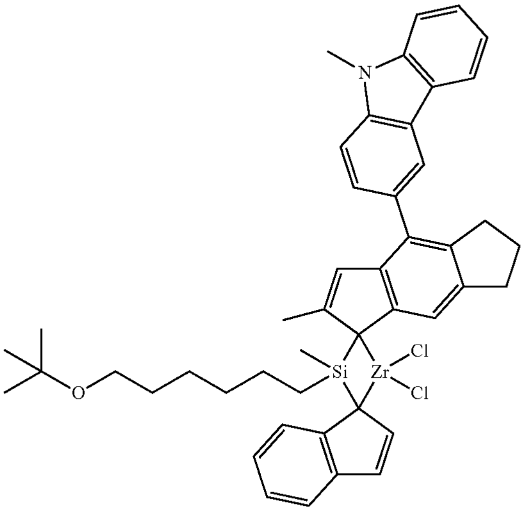
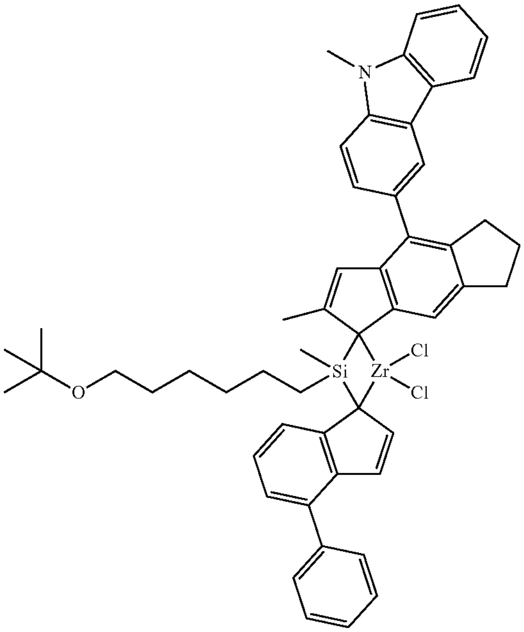
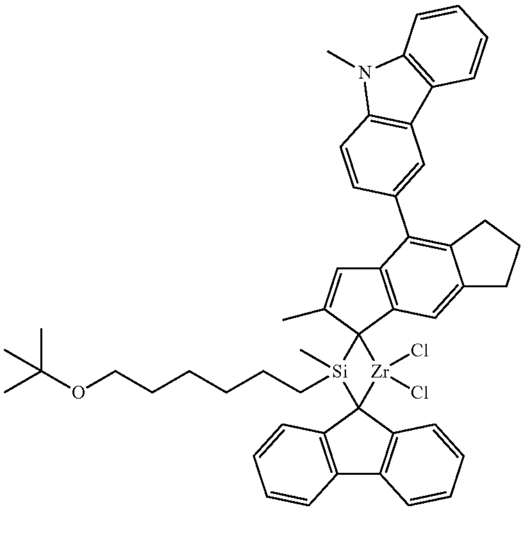

-continued
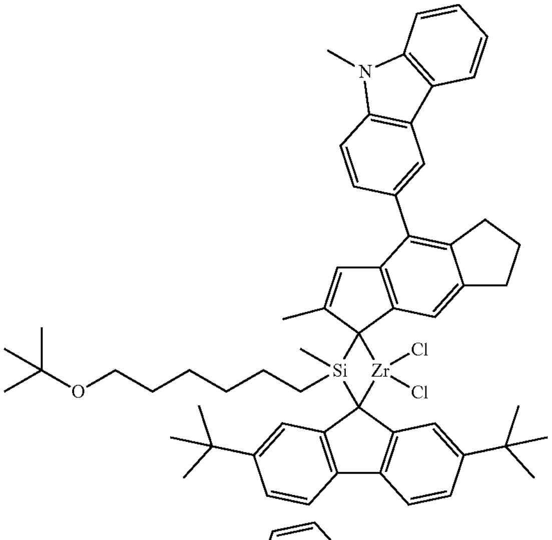
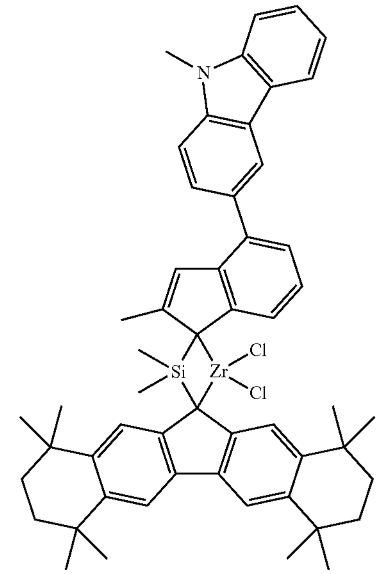
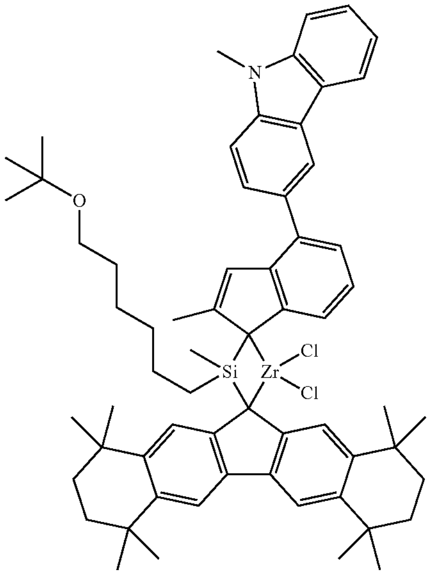
-continued
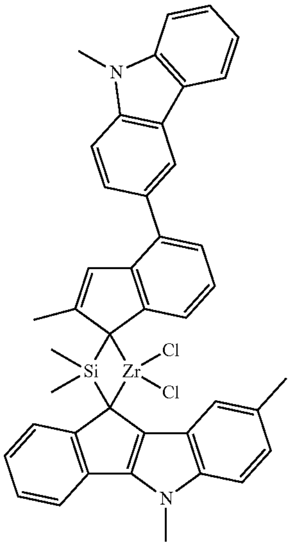
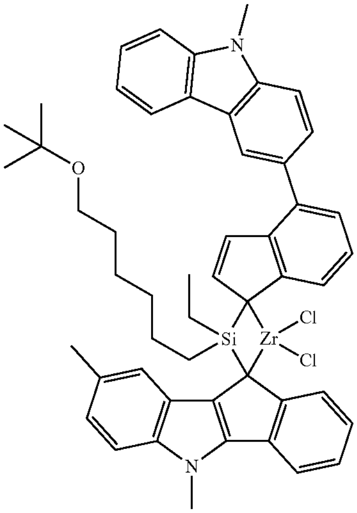
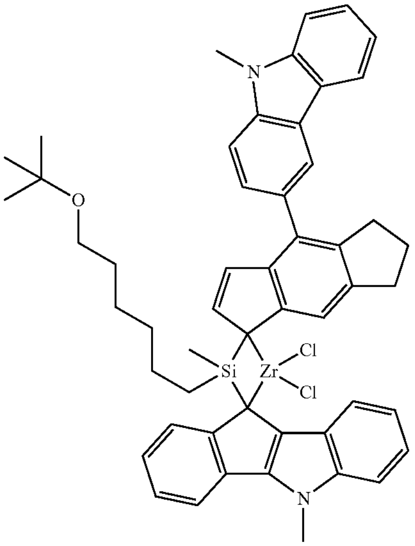

-continued
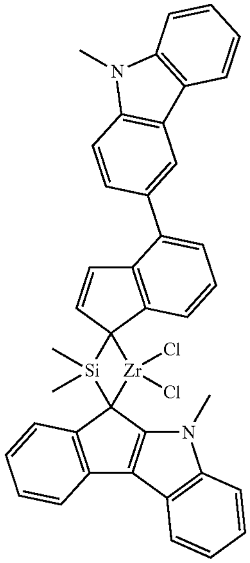
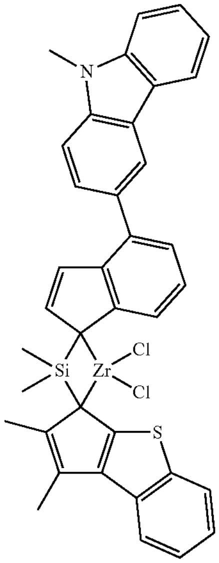
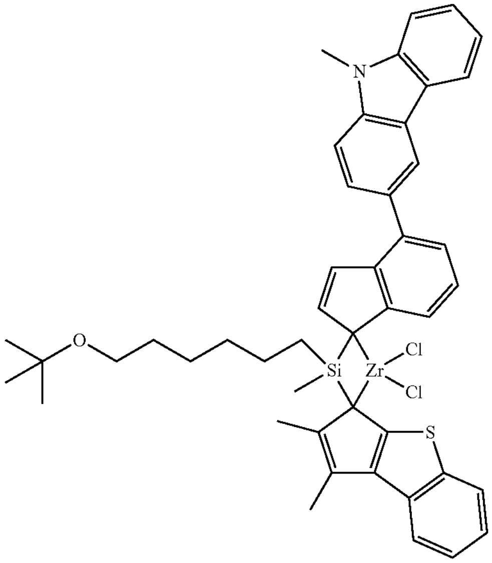
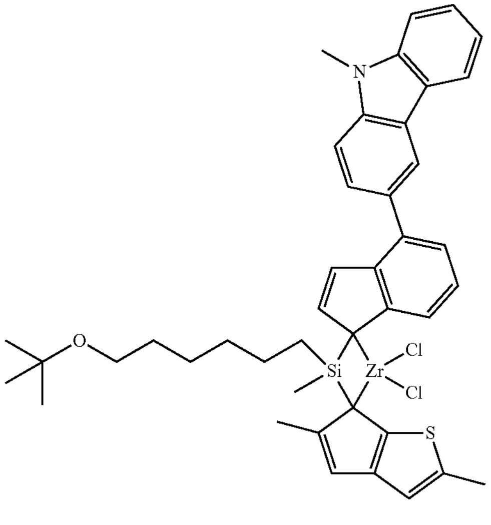
-continued
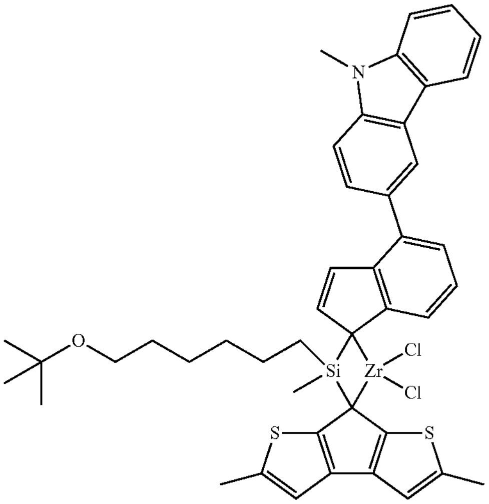
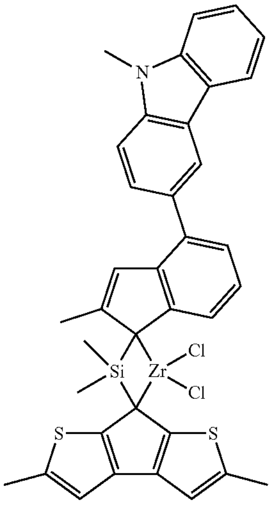
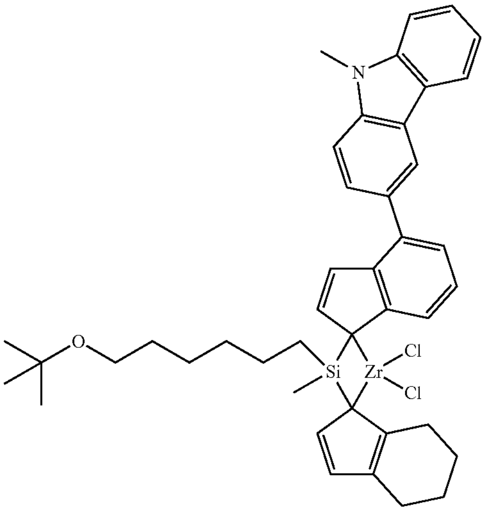

-continued
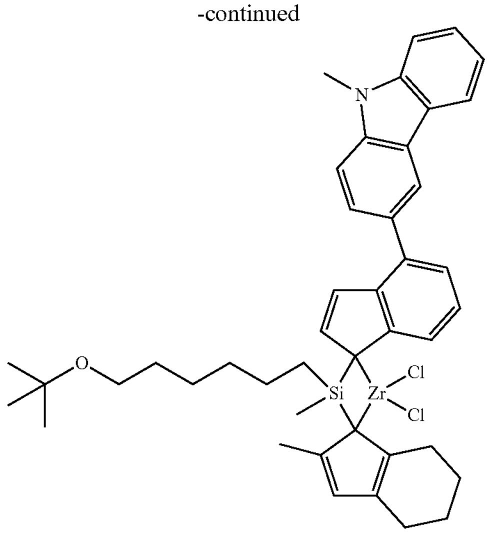
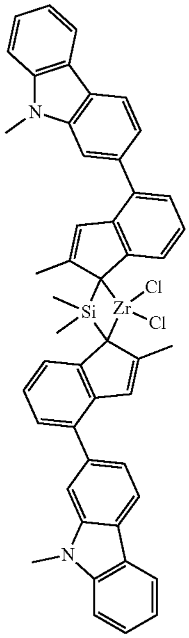
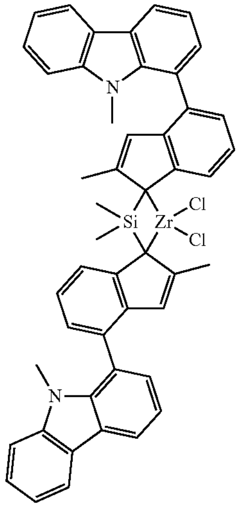
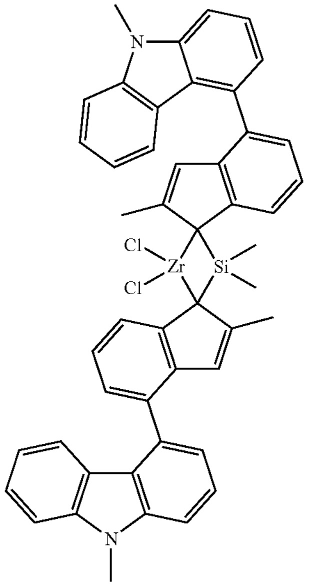
-continued
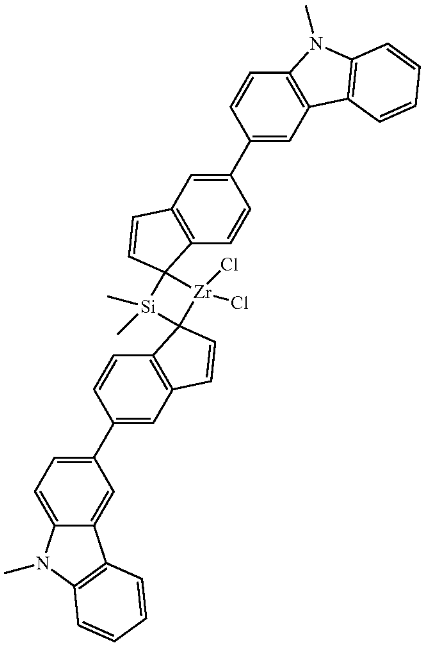
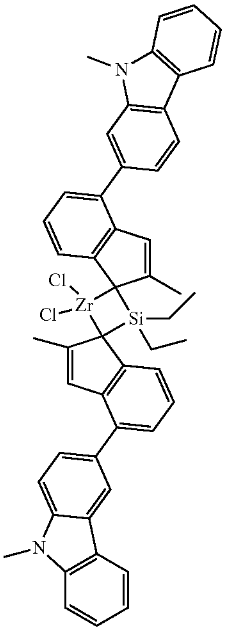
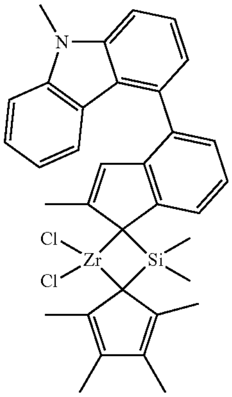

-continued
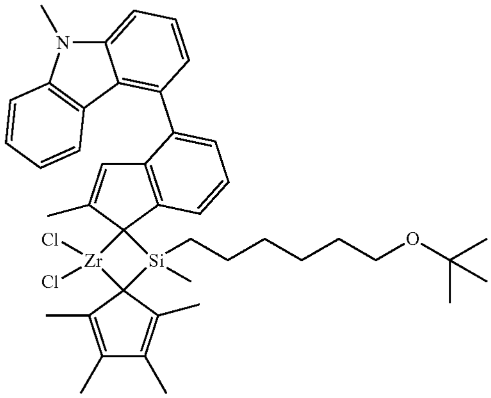
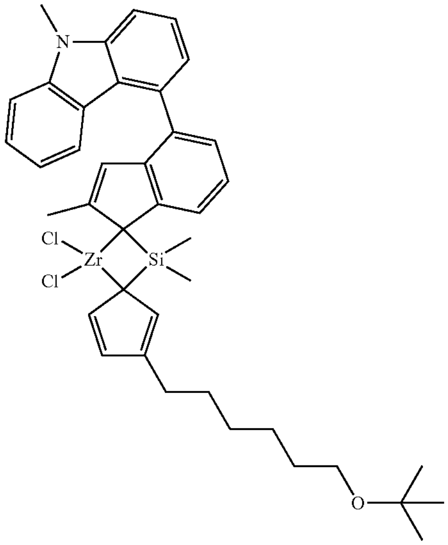
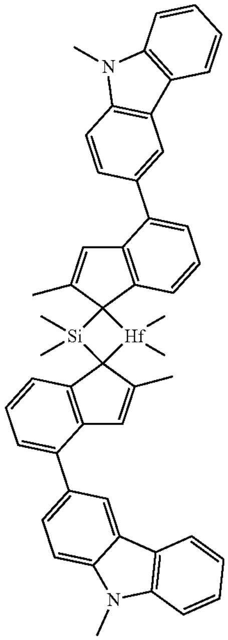
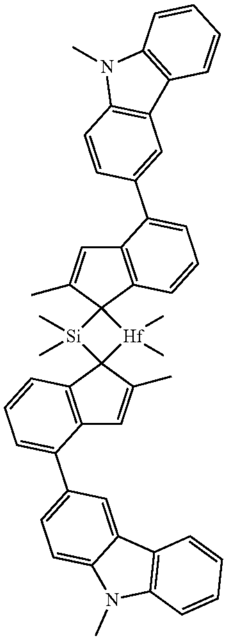
-continued
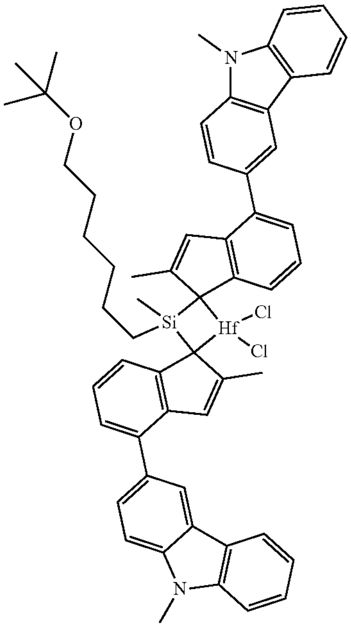
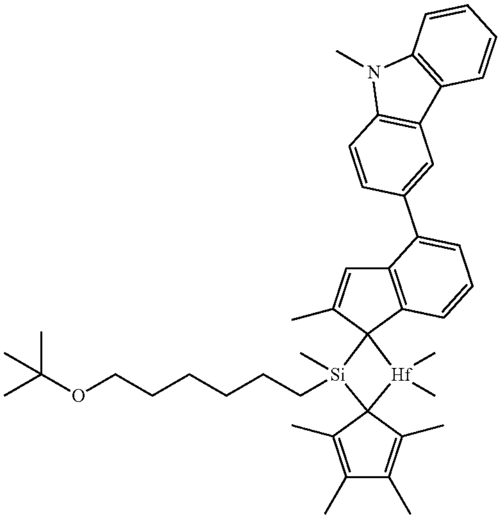

-continued
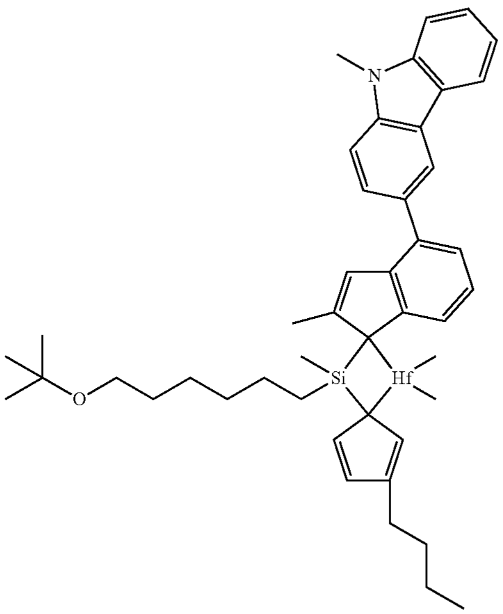
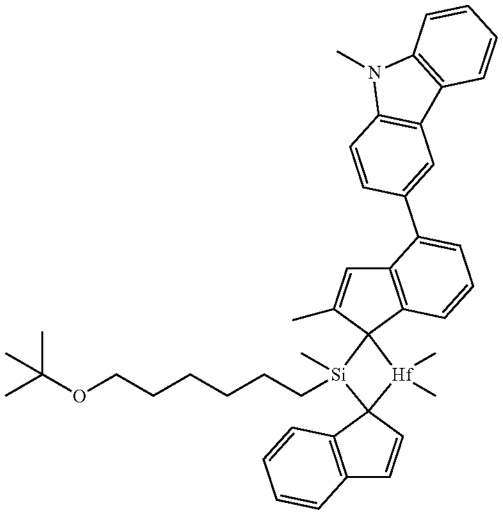
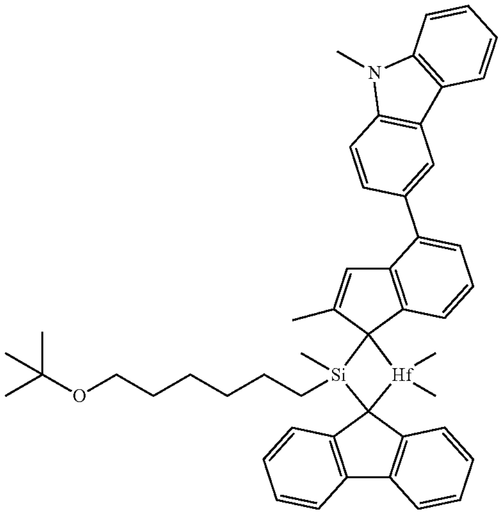
-continued
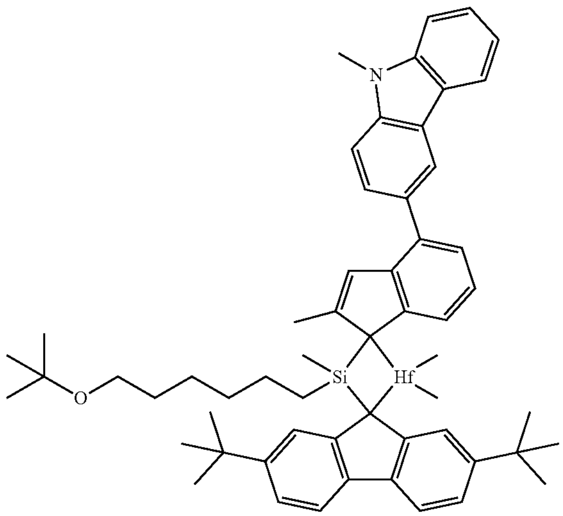
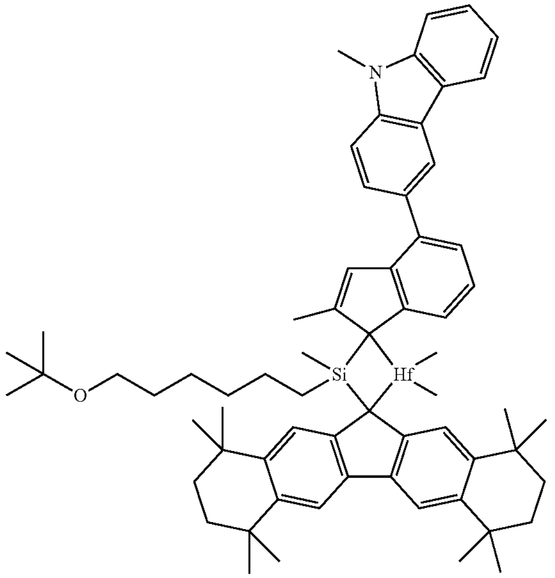
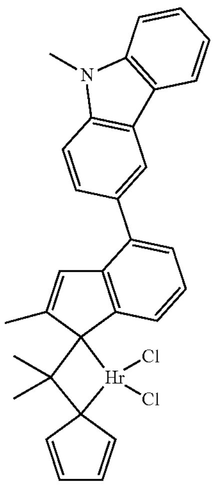

-continued
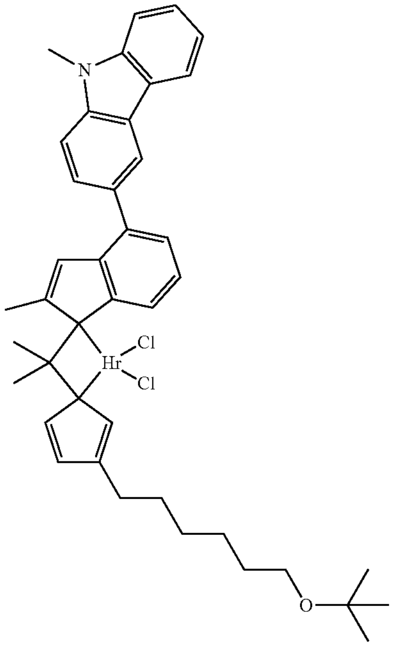
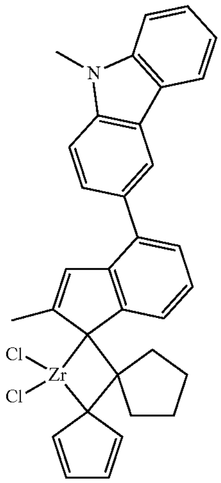
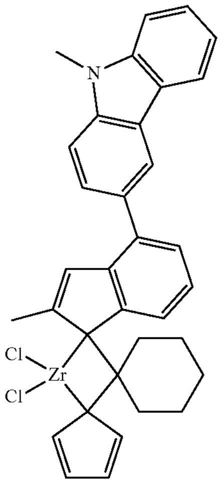
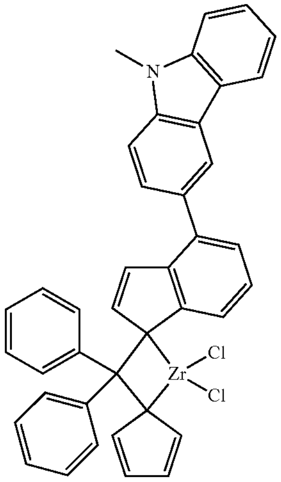
-continued
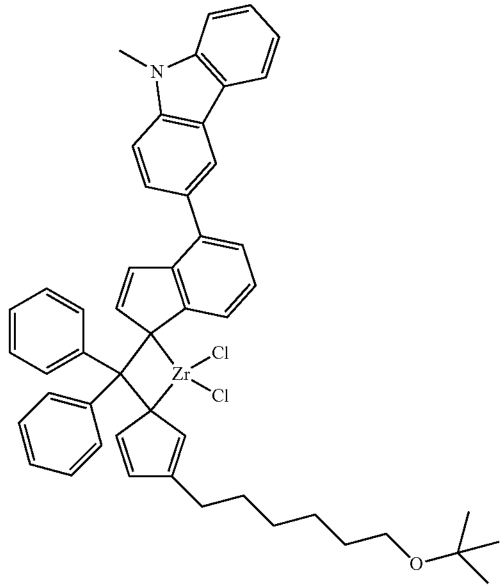
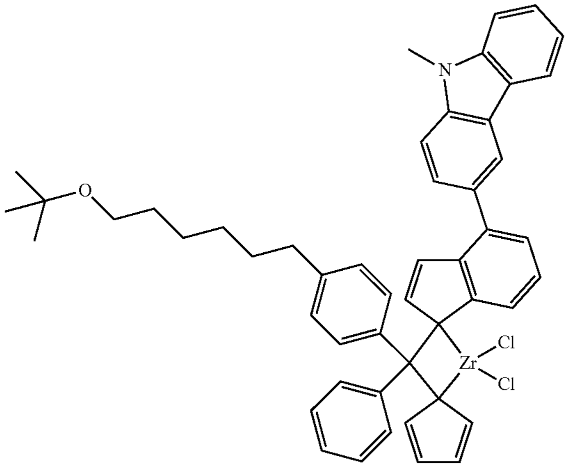
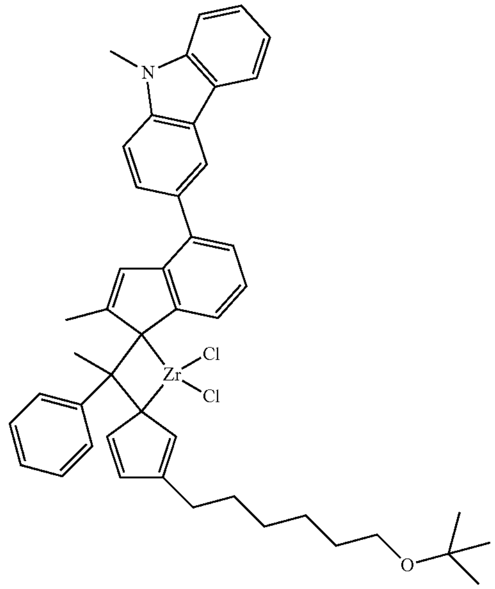

-continued
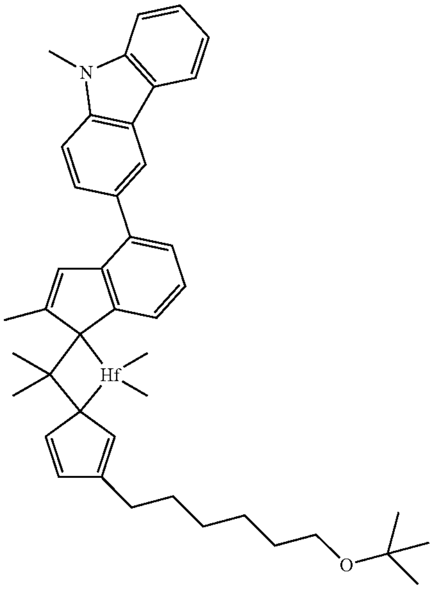
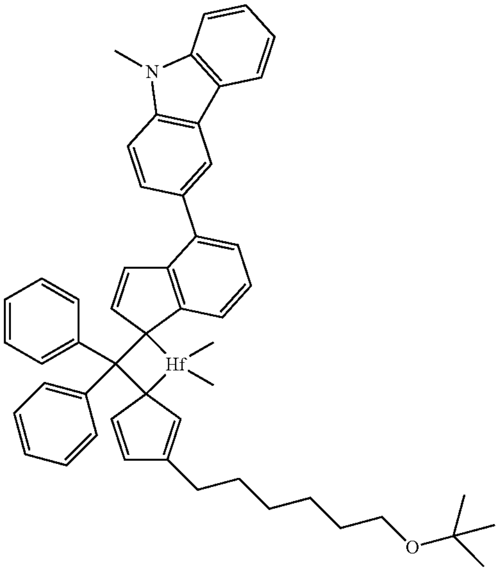
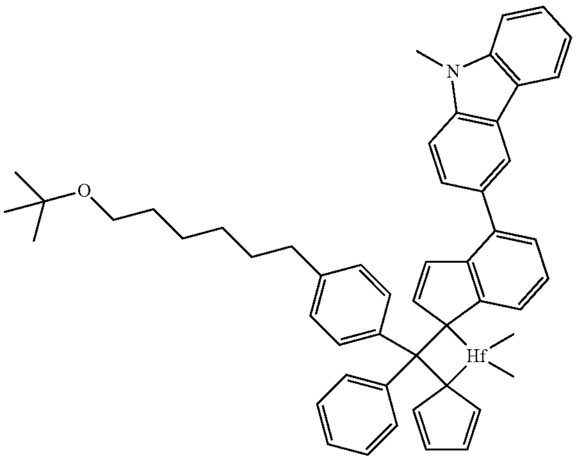
-continued
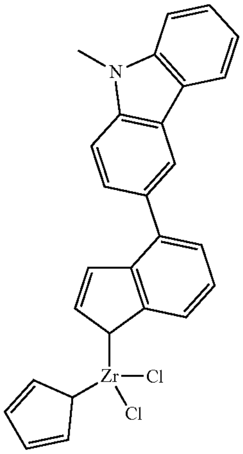
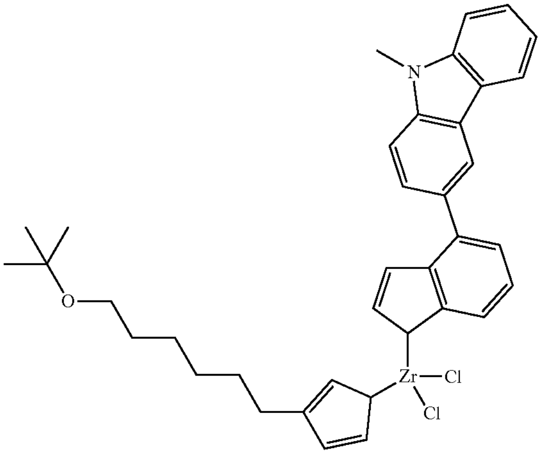
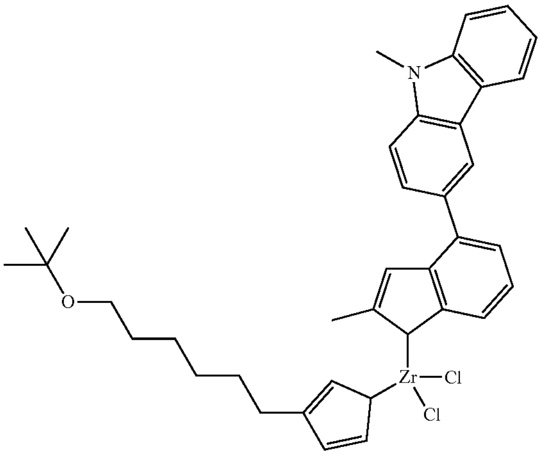

-continued
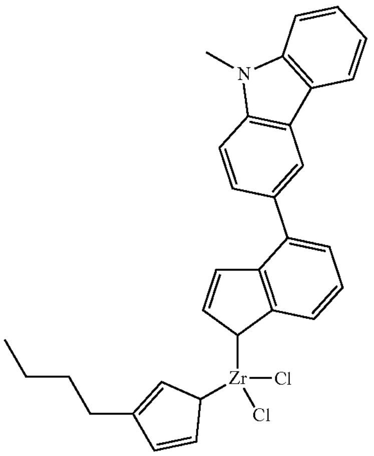
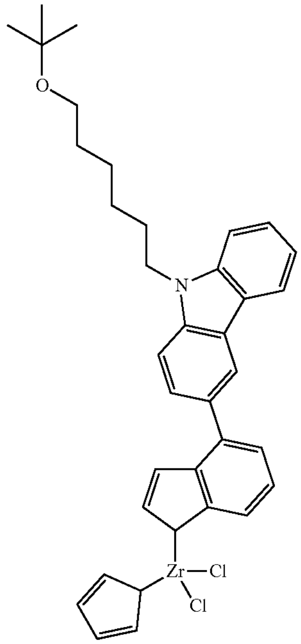
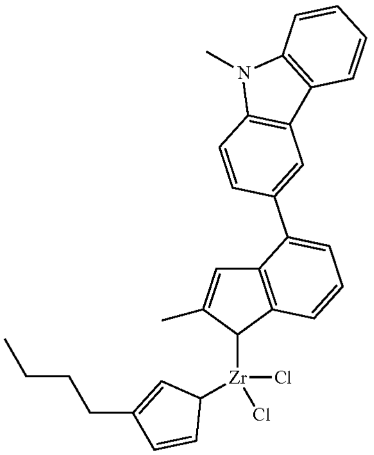
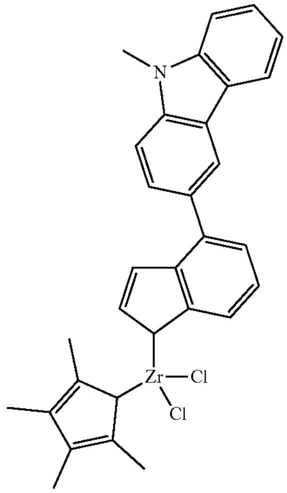
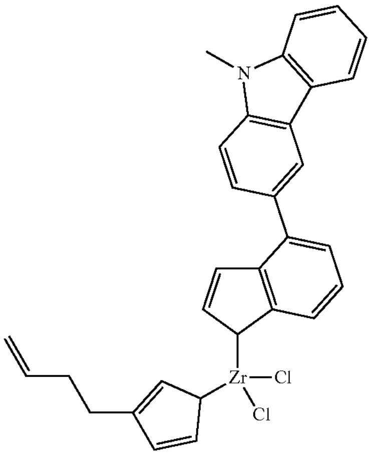
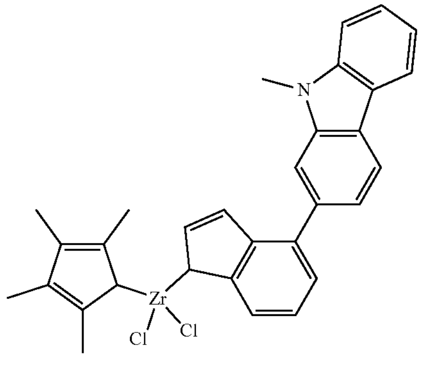

-continued
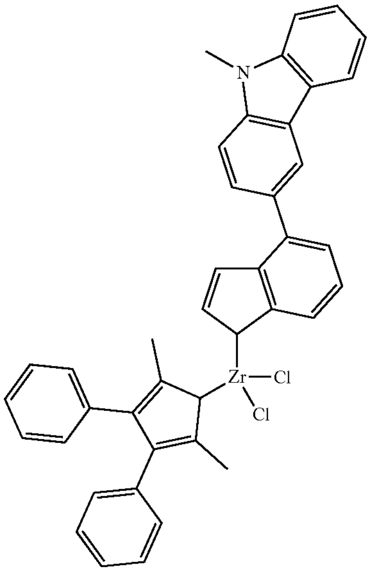
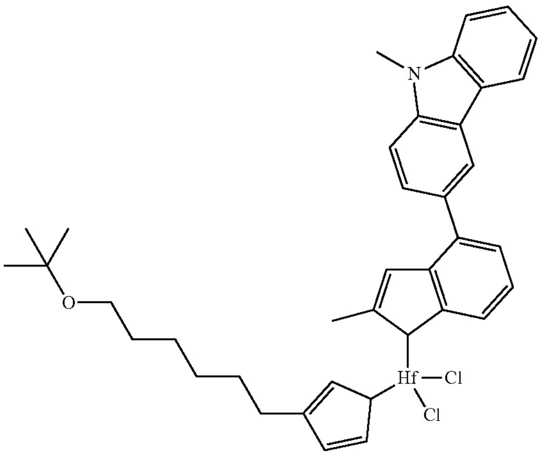
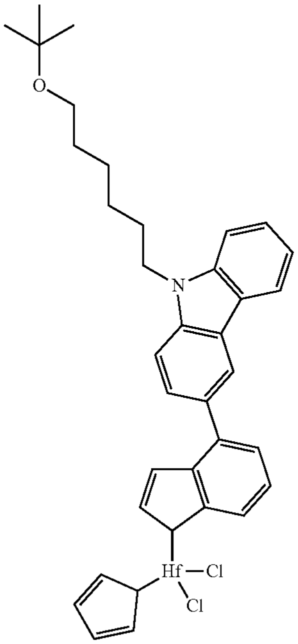
-continued
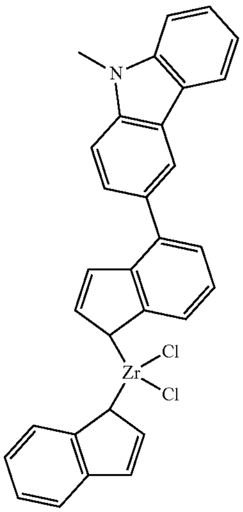
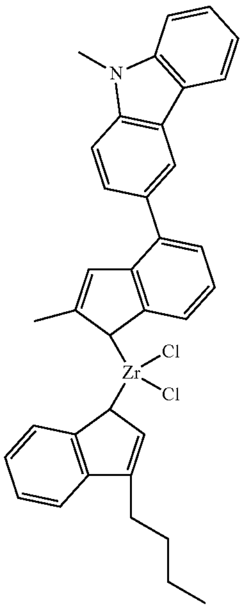
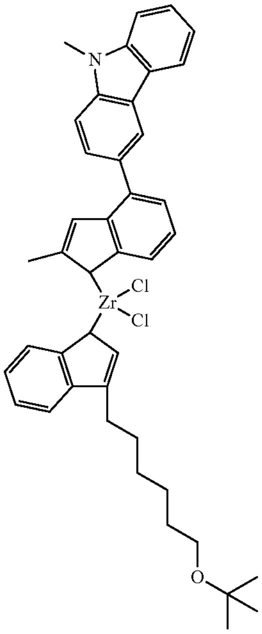

-continued
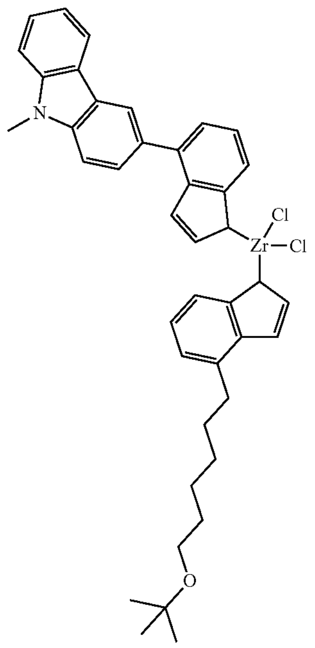
-continued
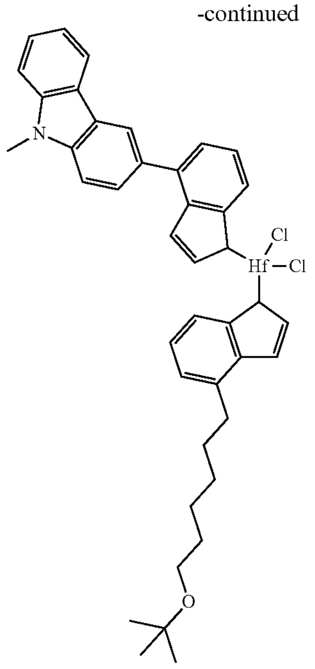
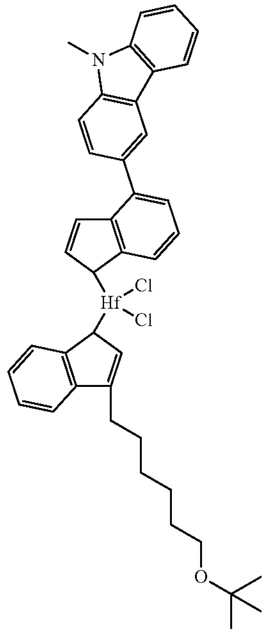
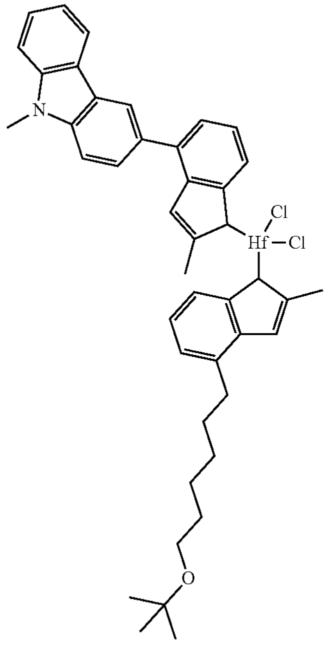

-continued

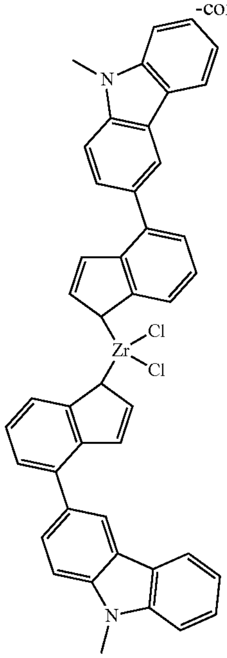

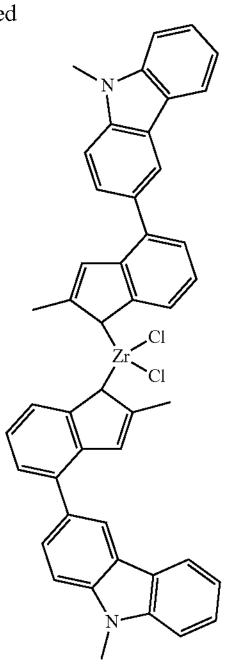

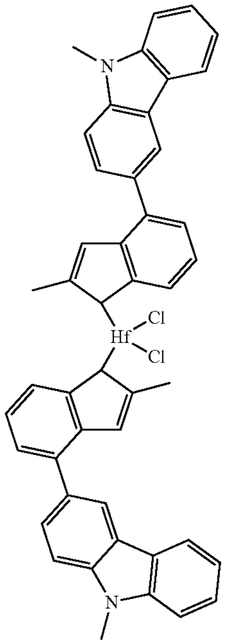

, and

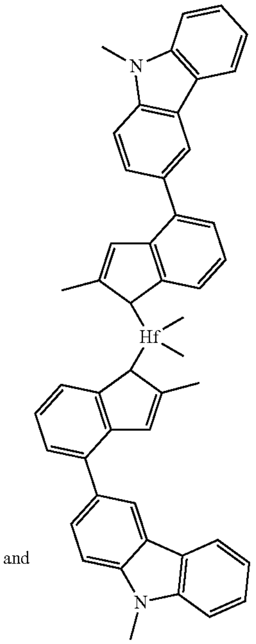

.

12. A catalyst composition comprising:

the metallocene compound according to claim 1;

a carrier; and one or more cocatalyst compounds selected from the group consisting of compounds represented by Chemical Formula 2 or Chemical Formula 3:

$$—[Al(R_{12})—O]_a— \quad \text{[Chemical Formula 2]}$$

wherein in Chemical Formula 2, each $R_{12}$ is independently halogen, $C_{1-20}$ alkyl or $C_{1-20}$ haloalkyl; and a is an integer of 2 or more;

$$J(R_{13})_3 \quad \text{[Chemical Formula 3]}$$

wherein in Chemical Formula 3, each $R_{13}$ is independently, halogen, $C_{1-20}$ alkyl or $C_{1-20}$ haloalkyl; and J is aluminum or boron.

13. A method for preparing an olefin polymer, comprising polymerizing an olefin monomer, in the presence of the catalyst composition of claim 12.

14. The method for preparing an olefin polymer according to claim 13, wherein the olefin monomer comprises one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinylnorbornene, dicyclopentadiene, 1,4-butadiene, 1,5-pentadiene, 1,6-hexadiene, styrene, alpha-methylstyrene, divinylbenzene and 3-chloromethylstyrene.

* * * * *